United States Patent
Deng et al.

(10) Patent No.: US 11,350,098 B2
(45) Date of Patent: May 31, 2022

(54) MOST PROBABLE MODE LIST CONSTRUCTION FOR MATRIX-BASED INTRA PREDICTION

(71) Applicants: Beijing Bytedance Network Technology Co., Ltd., Beijing (CN); Bytedance Inc., Los Angeles, CA (US)

(72) Inventors: Zhipin Deng, Beijing (CN); Kai Zhang, San Diego, CA (US); Li Zhang, San Diego, CA (US); Hongbin Liu, Beijing (CN); Jizheng Xu, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/342,951

(22) Filed: Jun. 9, 2021

(65) Prior Publication Data
US 2021/0321090 A1 Oct. 14, 2021

Related U.S. Application Data

(63) Continuation of application No. PCT/CN2020/084505, filed on Apr. 13, 2020.

(30) Foreign Application Priority Data

Apr. 12, 2019 (WO) ................ PCT/CN2019/082424

(51) Int. Cl.
*H04N 19/159* (2014.01)
*H04N 19/176* (2014.01)
(Continued)

(52) U.S. Cl.
CPC ......... *H04N 19/132* (2014.11); *H04N 19/105* (2014.11); *H04N 19/117* (2014.11);
(Continued)

(58) Field of Classification Search
CPC .... H04N 19/10; H04N 19/132; H04N 19/159; H04N 19/176; H04N 19/70;
(Continued)

(56) References Cited

U.S. PATENT DOCUMENTS 10,142,627 B2   11/2018   Zhao et al.
10,368,107 B2   7/2019    Zhang et al.
(Continued)

FOREIGN PATENT DOCUMENTS

CN   1738434 A   2/2006
CN   1784015 A   6/2006
(Continued)

OTHER PUBLICATIONS

Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH. Mar. 19-27, 2019, document JVET-N1001, 2019.
(Continued)

*Primary Examiner* — Albert Kir
(74) *Attorney, Agent, or Firm* — Perkins Coie LLP

(57) ABSTRACT

Devices, systems, and methods for digital video coding, which includes matrix-based intra prediction methods for video coding, are described. In a representative aspect, a method for video processing includes generating, for a conversion between a current video block of a video and a coded representation of the current video block, a most probable mode (MPM) list based on a rule, where the rule is based on whether a neighboring video block of the current video block is coded with a matrix based intra prediction
(Continued)

US 11,350,098 B2

Page 2

(MIP) mode, and performing the conversion between the current video block and the coded representation of the current video block using the MPM list, where the conversion applies a non-MIP mode to the current video block, and where the non-MIP mode is different from the MIP mode.

20 Claims, 39 Drawing Sheets

(51) Int. Cl.
| | | |
|---|---|---|
| H04N 19/70 | (2014.01) | |
| H04N 19/186 | (2014.01) | |
| H04N 19/132 | (2014.01) | |
| H04N 19/105 | (2014.01) | |
| H04N 19/12 | (2014.01) | |
| H04N 19/60 | (2014.01) | |
| H04N 19/117 | (2014.01) | |
| H04N 19/82 | (2014.01) | |

(52) U.S. Cl.
CPC ........... *H04N 19/12* (2014.11); *H04N 19/159* (2014.11); *H04N 19/176* (2014.11); *H04N 19/186* (2014.11); *H04N 19/60* (2014.11); *H04N 19/70* (2014.11); *H04N 19/82* (2014.11)

(58) Field of Classification Search
CPC .... H04N 19/105; H04N 19/117; H04N 19/12; H04N 19/186; H04N 19/60; H04N 19/82
USPC .......................................... 375/240.02, 240.13
See application file for complete search history.

(56) References Cited

U.S. PATENT DOCUMENTS

| | | | |
|---|---|---|---|
| 10,721,489 B2 | 7/2020 | Chen et al. | |
| 10,841,593 B2 | 11/2020 | Zhao et al. | |
| 11,134,257 B2* | 9/2021 | Zhao | H04N 19/176 |
| 11,197,025 B2 | 12/2021 | Ramasubramonian et al. | |
| 2008/0187044 A1 | 8/2008 | Kim et al. | |
| 2010/0246676 A1 | 9/2010 | Cao et al. | |
| 2012/0057630 A1 | 3/2012 | Saxena et al. | |
| 2012/0069906 A1 | 3/2012 | Sato | |
| 2012/0177112 A1 | 7/2012 | Guo et al. | |
| 2012/0201303 A1 | 8/2012 | Yang et al. | |
| 2012/0236929 A1* | 9/2012 | Liu | H04N 19/46 |
| | | | 375/E7.126 |
| 2013/0279569 A1 | 10/2013 | Gao et al. | |
| 2014/0078250 A1 | 3/2014 | Zhang et al. | |
| 2014/0105283 A1 | 4/2014 | Li et al. | |
| 2015/0043637 A1 | 2/2015 | Morigami et al. | |
| 2015/0103892 A1 | 4/2015 | Zhou et al. | |
| 2015/0110172 A1 | 4/2015 | Ye et al. | |
| 2016/0073107 A1 | 3/2016 | Moon et al. | |
| 2016/0165258 A1 | 6/2016 | Lei | |
| 2016/0182913 A1 | 6/2016 | Joshi et al. | |
| 2016/0261885 A1 | 9/2016 | Li et al. | |
| 2016/0330457 A1 | 11/2016 | Ye et al. | |
| 2016/0373742 A1 | 12/2016 | Zhao et al. | |
| 2016/0373782 A1 | 12/2016 | Zhao et al. | |
| 2016/0373785 A1 | 12/2016 | Said et al. | |
| 2017/0006293 A1 | 1/2017 | Lee et al. | |
| 2017/0094313 A1 | 3/2017 | Zhao et al. | |
| 2017/0272745 A1 | 9/2017 | Liu et al. | |
| 2018/0176601 A1 | 6/2018 | Jeong et al. | |
| 2018/0184082 A1 | 6/2018 | Yoo et al. | |
| 2018/0309984 A1 | 10/2018 | Son et al. | |
| 2019/0104303 A1 | 4/2019 | Xiu et al. | |
| 2019/0116381 A1 | 4/2019 | Lee et al. | |
| 2019/0313130 A1 | 10/2019 | Zhang et al. | |
| 2020/0045322 A1 | 2/2020 | Ye et al. | |
| 2020/0162749 A1 | 5/2020 | Zhang et al. | |
| 2020/0221099 A1 | 7/2020 | Pham Van et al. | |
| 2020/0221138 A1* | 7/2020 | Lee | H04N 19/51 |
| 2020/0322620 A1 | 10/2020 | Zhao et al. | |
| 2020/0344468 A1 | 10/2020 | Lin et al. | |
| 2020/0359033 A1 | 11/2020 | Ramasubramonian et al. | |
| 2020/0359037 A1 | 11/2020 | Ramasubramonian et al. | |
| 2021/0092405 A1* | 3/2021 | Biatek | H04N 19/70 |
| 2021/0105499 A1 | 4/2021 | Lee | |
| 2021/0195176 A1* | 6/2021 | Kim | H04N 19/593 |
| 2021/0211738 A1* | 7/2021 | Yin | H04N 19/136 |
| 2021/0218960 A1 | 7/2021 | Pfaff et al. | |
| 2021/0227213 A1 | 7/2021 | Kim et al. | |
| 2021/0266568 A1* | 8/2021 | Huo | H04N 19/186 |
| 2021/0297661 A1 | 9/2021 | Deng et al. | |
| 2021/0297671 A1 | 9/2021 | Deng et al. | |
| 2021/0297672 A1 | 9/2021 | Deng et al. | |
| 2021/0306654 A1 | 9/2021 | Lee | |
| 2021/0306666 A1 | 9/2021 | Lee | |
| 2021/0314562 A1* | 10/2021 | Kang | H04N 19/159 |
| 2021/0314599 A1 | 10/2021 | Lee | |
| 2021/0314618 A1 | 10/2021 | Pfaff et al. | |
| 2021/0329248 A1 | 10/2021 | Deng et al. | |
| 2021/0344915 A1 | 11/2021 | Wang et al. | |
| 2021/0385438 A1 | 12/2021 | Deng et al. | |
| 2022/0007029 A1 | 1/2022 | Deng et al. | |
| 2022/0014752 A1 | 1/2022 | Deng et al. | |
| 2022/0014783 A1 | 1/2022 | Deng et al. | |
| 2022/0014785 A1 | 1/2022 | Deng et al. | |
| 2022/0038698 A1 | 2/2022 | Koo et al. | |
| 2022/0058239 A1 | 2/2022 | Pfaff et al. | |

FOREIGN PATENT DOCUMENTS

| | | |
|---|---|---|
| CN | 101646081 A | 2/2010 |
| CN | 101977316 A | 2/2011 |
| CN | 102377993 A | 3/2012 |
| CN | 102427530 A | 4/2012 |
| CN | 102823254 A | 12/2012 |
| CN | 103503452 A | 1/2014 |
| CN | 105765979 A | 7/2016 |
| CN | 105830440 A | 8/2016 |
| CN | 107633538 A | 1/2018 |
| CN | 107736027 A | 2/2018 |
| CN | 109479129 A | 3/2019 |
| CN | 110708559 A | 1/2020 |
| KR | 20180136555 A | 12/2018 |
| WO | 2012172779 A1 | 12/2012 |
| WO | 2017019818 A1 | 2/2017 |
| WO | 2018064948 A1 | 4/2018 |
| WO | 2018080135 A1 | 5/2018 |
| WO | 2018208349 A1 | 11/2018 |
| WO | 2018236051 A1 | 12/2018 |
| WO | 2019009540 A1 | 1/2019 |
| WO | 2019172676 A1 | 9/2019 |
| WO | 2020221373 A1 | 11/2020 |
| WO | 2020222484 A1 | 11/2020 |
| WO | 2020233663 A1 | 11/2021 |

OTHER PUBLICATIONS

Bross et al. "Versatile Video Coding (Draft 7)," Joint Video Experts Team (JVET) of ITU-T SG 16 WP 3 and ISO/IEC JTC 1/SC 29/WG 11, 16th Meeting, Geneva, CH. Oct. 1-11, 2019, document JVET-P2001, 2019.

Chiang et al. "CE6-Related: Constraint and Simplification for LFNST Signalling," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0291, 2019.

Choi et al. "CE6-Related: Unified Matrix for Transform," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0060, 2018.

Choi et al. "CE6: Unified Matrix for Transform (Test 6-1.2a)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0200, 2019.

Filippov et al. "CE3-Related: Simplification of Matrix-based Intra Prediction (MIP)," Joint Video Experts Team (JVET) of ITU-T SG

(56) References Cited

OTHER PUBLICATIONS

WP 3 and ISO/IEC JTC 1/SC 29/WG 11, 15th Meeting, Gothenburg, SE Jul. 3-12, 2019, document JVET-O0203, 2019.
He et al. "Cross-Check of JVET-K0172: CE3-Related: Gradient-Based Boundary Filtering in Intra Prediction," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0458, 2018.
Koo et al. "CE6: Reduced Secondary Transform (RST) (CE6-3.1)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0193, 2019.
Lainema, Jani. "CE6: Shape Adaptive Transform Selection (Test 3.1)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0303, 2019.
Lu et al. "AHG16: Simplification of Reshaper Information," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0220, 2019.
Pfaff et al. "CE3: Affine Linear Weighted Intra Prediciton (test 1.2.1, test 1.2.2)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0043, 2019.
Pfaff et al. "CE3: Affine Linear Weighted Intra Prediciton (CE3-4.1, CE3-4.2)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0217, 2019.
Pfaff et al. "Non-CE3: Harmonization of 8-Bit MIP with Unified-MPM and LFNST," Joint Video Experts Team (JVET) of ITU-T SG 16 WP 3 and ISO/IEC JTC 1/SC 29/WG 11, 15th Meeting, Gotenburg, SWE, Jul. 3-12, 2019, document JVET-O0485, 2019.
Ramasubramonian et al. "CE3-Related: Unification of MPM Derivation for Luma Intra Modes," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0433, 2019.
Wang et al. "CE3-Related: A Unified MPM List for Intra Coding," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0185, 2019.
Yoon et al. "Non-CE3: MIP Modifications," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0202, 2019.
Zhang et al. "Non-CE3: Fixed MPMs for MIP," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0255, 2019.
Zhou et al. "Study on the Development of Video Coding Standard VVC," Radio & TV Broadcast Engineering, ISSN 1002-4522, Dec. 31, 2018, 45(9):26-31.
International Search Report and Written Opinion from International Patent Application No. PCT/CN2020/084455 dated Jul. 10, 2020 (9 pages).
International Search Report and Written Opinion from International Patent Application No. PCT/CN2020/084462 dated Jul. 6, 2020 (10 pages).
International Search Report and Written Opinion from International Patent Application No. PCT/CN2020/084472 dated Jul. 9, 2020 (9 pages).
International Search Report and Written Opinion from International Patent Application No. PCT/CN2020/084486 dated Jul. 9, 2020 (9 pages).
International Search Report and Written Opinion from International Patent Application No. PCT/CN2020/084488 dated Jul. 9, 2020 (9 pages).
International Search Report and Written Opinion from International Patent Application No. PCT/CN2020/084499 dated Jun. 28, 2020 (9 pages).
International Search Report and Written Opinion from International Patent Application No. PCT/CN2020/084505 dated Jul. 17, 2020 (9 pages).
International Search Report and Written Opinion from International Patent Application No. PCT/CN2020/085050 dated Jul. 15, 2020 (13 pages).
International Search Report and Written Opinion from International Patent Application No. PCT/CN2020/088583 dated Jul. 1, 2020 (9 pages).
International Search Report and Written Opinion from International Patent Application No. PCT/CN2020/088584 dated Aug. 3, 2020 (11 pages).
International Search Report and Written Opinion from International Patent Application No. PCT/CN2020/091542 dated Aug. 20, 2020 (9 pages).
International Search Report and Written Opinion from International Patent Application No. PCT/CN2020/092905 dated Aug. 27, 2020 (9 pages).
International Search Report and Written Opinion from International Patent Application No. PCT/CN2020/092906 dated Aug. 17, 2020 (11 pages).
International Search Report and Written Opinion from International Patent Application No. PCT/CN2020/094513 dated Sep. 7, 2020 (9 pages).
International Search Report and Written Opinion from International Patent Application No. PCT/CN2020/124317 dated Jan. 18, 2021 (13 pages).
Non Final Office Action from U.S. Appl. No. 17/343,980 dated Oct. 15, 2021.
Non Final Office Action from U.S. Appl. No. 17/343,041 dated Oct. 29, 2021.
Notice of Allowance from U.S. Appl. No. 17/342,996 dated Nov. 23, 2021.
Notice of Allowance from U.S. Appl. No. 17/399,879 dated Dec. 21, 2021.
Notice of Allowance from U.S. Appl. No. 17/478,511 dated Dec. 24, 2021.
Notice of Allowance from U.S. Appl. No. 17/343,086 dated Jan. 25, 2022.
Non Final Office Action from U.S. Appl. No. 17/453,135 dated Feb. 3, 2022.
Final Office Action from U.S. Appl. No. 17/343,041 dated Feb. 24, 2022.
Final Office Action from U.S. Appl. No. 17/399,879 dated Apr. 7, 2022.
Non Final Office Action from U.S. Appl. No. 17/479,360 dated Apr. 18, 2022.

* cited by examiner

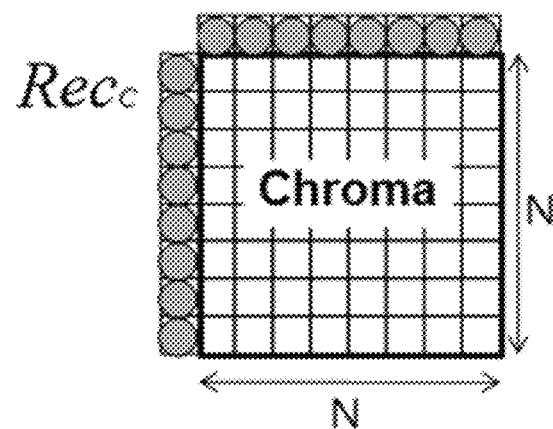
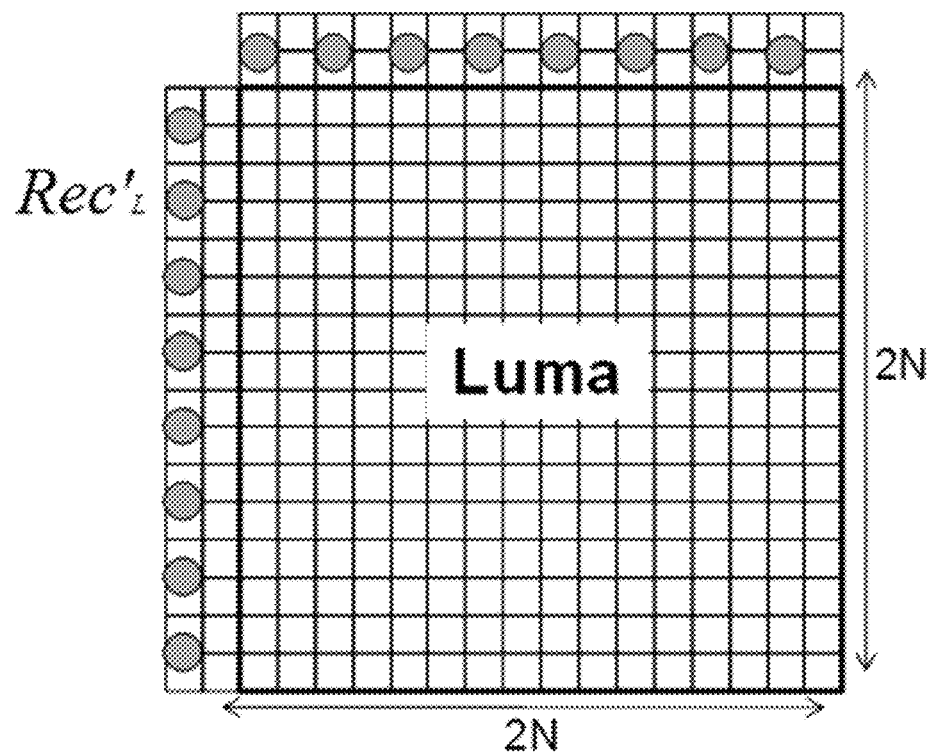
FIG. 3

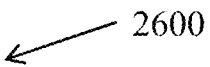

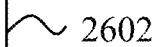

Performing a conversion between a current video block of a video and a coded representation of the current video block, where the conversion is based on a determination whether to code the current video block using a matrix based intra prediction (MIP) mode in which a prediction block of the current video block is determined by performing, on previously coded samples of the video, a boundary downsampling operation, followed by a matrix vector multiplication operation, and selectively followed by an upsampling operation

FIG. 26

Performing a conversion between a current video block of a video and a bitstream representation of the current video block, where the conversion includes generating, by using a matrix based intra prediction (MIP) mode, a prediction block for the current video block by selecting and applying matrix multiplication using matrices of samples and/or by selecting and adding an offset using offset vectors for the current video block, where the samples are obtained from a row and column wise averaging of previously coded samples of the video, and where the selecting is based on reshaping information associated with applying a luma mapping with chroma scaling (LMCS) technique on a reference picture of the current video block

FIG. 30

Performing a conversion between a current video block of a video and a bitstream representation of the current video block using a matrix based intra prediction (MIP) mode, where the performing the conversion using the MIP mode includes generating a prediction block by applying matrix multiplication using matrices of samples obtained from a row and column wise averaging of previously coded samples of the video, and where the matrices depend on a bit-depth of a sample — 3202

Performing a conversion between a current video block of a video and a bitstream representation of the current video block using a matrix based intra prediction (MIP) mode, where the performing the conversion includes using an interpolation filter in an upsampling process for the MIP mode, where, in the MIP mode, a matrix multiplication is applied to a first set of samples obtained from a row and column wise averaging of previously coded samples of the video, and the interpolation filter is applied to a second set of samples obtained from the matrix multiplication, and where interpolation filter excludes a bilinear interpolation filter    ⟶ 3402

Performing a conversion between a current video block of a video and a bitstream representation of the current video block according to a rule, where the rule specifies a relationship between applicability of a matrix based intra prediction (MIP) mode or a transform mode during the conversion, where the MIP mode includes determining a prediction block of the current video block by performing, on previously coded samples of the video, a boundary downsampling operation, followed by a matrix vector multiplication operation, and selectively followed by an upsampling operation, and where the transform mode specifies use of a transform operation for determining the prediction block for the current video block — 3502

Performing a conversion between a current video block of a video and a bitstream representation of the current video block using a matrix based intra prediction (MIP) mode in which a prediction block of the current video block is determined by performing, on previously coded samples of the video, a boundary downsampling operation, followed by a matrix vector multiplication operation, and selectively followed by an upsampling operation, where the performing the conversion includes deriving, according to a rule, boundary samples by applying a left bit shift operation or a right bit shift operation on a sum of at least one reference boundary sample, and where the rule determines whether to apply the left bit shift operation or the right bit shift operation 〜 3602

Performing a conversion between a current video block of a video and a bitstream representation of the current video block using a matrix based intra prediction (MIP) mode in which a prediction block of the current video block is determined by performing, on previously coded samples of the video, a boundary downsampling operation, followed by a matrix vector multiplication operation, and selectively followed by an upsampling operation, where the prediction samples predSamples[ xHor + dX ][ yHor ] are determined according to following formula in the upsampling operation: predSamples[ xHor + dX ][ yHor ] = ( ( upHor − dX ) * predSamples[ xHor ][ yHor ] + dX * predSamples[ xHor + upHor ][ yHor ] + offsetHor) / upHor, and predSamples[ xVer ][ yVer + dY ] = ( ( upVer − dY ) * predSamples[ xVer ][ yVer ] + dY * predSamples[ xVer ][ yVer + upVer ]+ offsetVer ) / upVer ⏤ 3702

MOST PROBABLE MODE LIST CONSTRUCTION FOR MATRIX-BASED INTRA PREDICTION

CROSS REFERENCE TO RELATED APPLICATIONS

This application is a continuation of International Patent Application No. PCT/CN2020/084505, filed on Apr. 13, 2020, which claims the priority to and benefits of International Patent Application No. PCT/CN2019/082424, filed on Apr. 12, 2019. All the aforementioned patent applications are hereby incorporated by reference in their entireties.

TECHNICAL FIELD

This patent document relates to video coding techniques, devices, and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems, and methods related to digital video coding, and specifically, matrix-based intra prediction methods for video coding are described. The described methods may be applied to both the existing video coding standards (e.g., High Efficiency Video Coding (HEVC)) and future video coding standards (e.g., Versatile Video Coding (VVC)) or codecs.

A first example video processing method includes generating, for a conversion between a current video block of a video and a coded representation of the current video block, a first most probable mode (MPM) list using a first procedure based on a rule; and performing the conversion between the current video block and the coded representation of the current video block using the first MPM list, where the conversion of the current video block uses a matrix based intra prediction (MIP) mode in which a prediction block of the current video block is determined by performing, on previously coded samples of the video, a boundary downsampling operation, followed by a matrix vector multiplication operation, and selectively followed by an upsampling operation, where the rule specifies that the first procedure used for generation of the first MPM list is same as a second procedure used for generation of a second MPM list for conversion of other video blocks of the video that are coded using a non-MIP intra mode that is different from the MIP mode, and where at least a portion of the first MPM list is generated based on at least a portion of the second MPM list.

A second example video processing method includes generating, for a conversion between a current video block of a video and a coded representation of the current video block, a most probable mode (MPM) list based on a rule, where the rule is based on whether a neighboring video block of the current video block is coded with a matrix based intra prediction (MIP) mode in which a prediction block of the neighboring video block is determined by performing, on previously coded samples of the video, a boundary downsampling operation, followed by a matrix vector multiplication operation, and selectively followed by an upsampling operation; and performing the conversion between the current video block and the coded representation of the current video block using the MPM list, where the conversion applies a non-MIP mode to the current video block, and where the non-MIP mode is different from the MIP mode.

A third example video processing method includes decoding a current video block of a video that is coded in a coded representation of the current video block using a matrix based intra prediction (MIP) mode in which a prediction block of the current video block is determined by performing, on previously coded samples of the video, a boundary downsampling operation, followed by a matrix vector multiplication operation, and selectively followed by an upsampling operation; and updating a line buffer associated with the decoding without storing in the line buffer information indicating whether the current video block is coded using the MIP mode.

A fourth example video processing method includes performing a conversion between a current video block and a bitstream representation of the current video block, where the current video block is coded using a matrix based intra prediction (MIP) mode in which a prediction block of the current video block is determined by performing, on previously coded samples of the video, a boundary downsampling operation, followed by a matrix vector multiplication operation, and selectively followed by an upsampling operation, where a flag is coded in the bitstream presentation using at most K contexts in an arithmetic coding or a decoding process, where the flag indicates whether the current video block is coded using the MIP mode, and where K is greater than or equal to zero.

A fifth example video processing method includes generating, for a conversion between a current video block of a video and a bitstream representation of the current video block, an intra prediction mode for the current video block coded with a matrix based intra prediction (MIP) mode in which a prediction block of the current video block is determined by performing, on previously coded samples of the video, a boundary downsampling operation, followed by a matrix vector multiplication operation, and selectively followed by an upsampling operation; determining a rule for storing information indicative of the intra prediction mode based on whether the current video block is coded with the MIP mode; and performing the conversion according to the rule, where the rule defines that a syntax element for the intra prediction mode is stored in the bitstream representation for the current video block, and where the rule defines that a mode index for the MIP mode for the current video block is not stored in the bitstream representation.

A sixth example video processing method includes performing a first determination that a luma video block of a video is coded using a matrix based intra prediction (MIP) mode in which a prediction block of the luma video block is determined by performing, on previously coded samples of the video, a boundary downsampling operation, followed by a matrix vector multiplication operation, and selectively followed by an upsampling operation; performing, based on the first determination, a second determination about a chroma intra mode to be used for a chroma video block associated with the luma video block; and performing, based on the second determination, a conversion between the chroma video block and a bitstream representation of the chroma video block.

A seventh example video processing method includes performing a conversion between a current video block of a video and a coded representation of the current video block, where the conversion is based on a determination whether to code the current video block using a matrix based intra prediction (MIP) mode in which a prediction block of the current video block is determined by performing, on previously coded samples of the video, a boundary downsampling operation, followed by a matrix vector multiplication operation, and selectively followed by an upsampling operation.

An eight example video processing method includes determining, for encoding a current video block of a video into a bitstream representation of the current video block, according to a rule whether to use a matrix based intra prediction (MIP) mode and a coding mode that is different from the MIP mode for encoding the current video block, where the MIP mode includes determining a prediction block of the current video block by performing, on previously coded samples of the video, a boundary downsampling operation, followed by a matrix vector multiplication operation, and selectively followed by an upsampling operation; and adding, based on the determining, an encoded representation of the current video block to the bitstream representation.

A ninth example video processing method includes determining that a current video block of a video is encoded in a bitstream representation using a matrix based intra prediction (MIP) mode and a coding mode that is different from the MIP mode, where the MIP mode includes determining a prediction block of the current video block by performing, on previously coded samples of the video, a boundary downsampling operation, followed by a matrix vector multiplication operation, and selectively followed by an upsampling operation; and generating a decoded representation of the current video block by parsing and decoding the bitstream representation.

A tenth example video processing method includes making a determination about an applicability of a loop filter to a reconstructed block of a current video block of a video in a conversion between the video and a coded representation of the current video block, where the current video block is coded using a matrix based intra prediction (MIP) mode in which a prediction block of the current video block is determined by performing, on previously coded samples of the video, a boundary downsampling operation, followed by a matrix vector multiplication operation, and selectively followed by an upsampling operation; and processing the current video block according to the determination.

An eleventh example video processing method includes determining, for encoding a current video block of a video into a bitstream representation of the current video block, a type of neighboring samples of the current video block to be used according to a rule; and adding, based on the determining, an encoded representation of the current video block to the bitstream representation, where the current video block is encoded using a matrix based intra prediction (MIP) mode in which a prediction block of the current video block is determined by performing, on previously coded samples of the video, a boundary downsampling operation, followed by a matrix vector multiplication operation, and selectively followed by an upsampling operation.

A twelfth example video processing method includes determining that a current video block of a video is encoded in a bitstream representation using a matrix based intra prediction (MIP) mode and using a type of neighboring samples of the current video block according to a rule, where the MIP mode includes determining a prediction block of the current video block by performing, on previously coded samples of the video, a boundary downsampling operation, followed by a matrix vector multiplication operation, and selectively followed by an upsampling operation; and generating a decoded representation of the current video block by parsing and decoding the bitstream representation.

A thirteenth example video processing method includes performing a conversion between a current video block of a video and a bitstream representation of the current video block, where the conversion includes generating, by using a matrix based intra prediction (MIP) mode, a prediction block for the current video block by selecting and applying matrix multiplication using matrices of samples and/or by selecting and adding an offset using offset vectors for the current video block, where the samples are obtained from a row and column wise averaging of previously coded samples of the video, and where the selecting is based on reshaping information associated with applying a luma mapping with chroma scaling (LMCS) technique on a reference picture of the current video block.

A fourteenth example video processing method includes determining that a current video block is to be coded using a matrix based intra prediction (MIP) mode in which a prediction block of the current video block is determined by performing, on previously coded samples of the video, a boundary downsampling operation, followed by a matrix vector multiplication operation, and selectively followed by an upsampling operation; and performing, based on the determining, a conversion between the current video block and a bitstream representation of the current video block, where the performing the conversion is based on a rule of co-application of the MIP mode and another coding technique.

A fifteenth example video processing method includes performing a conversion between a current video block of a video and a bitstream representation of the current video block using a matrix based intra prediction (MIP) mode, where the performing the conversion using the MIP mode includes generating a prediction block by applying matrix multiplication using matrices of samples obtained from a row and column wise averaging of previously coded samples of the video, and where the matrices depend on a bit-depth of a sample.

A sixteenth example video processing method includes generating, for a current video block of a video, an intermediate prediction signal using a matrix based intra prediction (MIP) mode in which a prediction block of the current video block is determined by performing, on previously coded samples of the video, a boundary downsampling operation, followed by a matrix vector multiplication operation, and selectively followed by an upsampling operation; generating, based on the intermediate prediction signal, a final prediction signal; and performing, based on the final prediction signal, a conversion between the current video block and a bitstream representation of the current video block.

A seventeenth example video processing method includes performing a conversion between a current video block of a video and a bitstream representation of the current video block using a matrix based intra prediction (MIP) mode, where the performing the conversion includes using an interpolation filter in an upsampling process for the MIP mode, where, in the MIP mode, a matrix multiplication is applied to a first set of samples obtained from a row and column wise averaging of previously coded samples of the video, and the interpolation filter is applied to a second set of samples obtained from the matrix multiplication, and where interpolation filter excludes a bilinear interpolation filter.

An eighteenth example video processing method includes performing a conversion between a current video block of a video and a bitstream representation of the current video block according to a rule, where the rule specifies a relationship between applicability of a matrix based intra prediction (MIP) mode or a transform mode during the conversion, where the MIP mode includes determining a prediction block of the current video block by performing, on previously coded samples of the video, a boundary downsampling operation, followed by a matrix vector multiplication operation, and selectively followed by an upsampling operation, and where the transform mode specifies use of a transform operation for the determining the prediction block for the current video block.

A nineteenth example video processing method includes performing a conversion between a current video block of a video and a bitstream representation of the current video block using a matrix based intra prediction (MIP) mode in which a prediction block of the current video block is determined by performing, on previously coded samples of the video, a boundary downsampling operation, followed by a matrix vector multiplication operation, and selectively followed by an upsampling operation, where the performing the conversion includes deriving, according to a rule, boundary samples by applying a left bit shift operation or a right bit shift operation on a sum of at least one reference boundary sample, and where the rule determines whether to apply the left bit shift operation or the right bit shift operation.

A twentieth example video processing method includes performing a conversion between a current video block of a video and a bitstream representation of the current video block using a matrix based intra prediction (MIP) mode in which a prediction block of the current video block is determined by performing, on previously coded samples of the video, a boundary downsampling operation, followed by a matrix vector multiplication operation, and selectively followed by an upsampling operation, where the prediction samples predSamples[xHor+dX][yHor] are determined according to following formula in the upsampling operation: predSamples[xHor+dX][yHor]=((upHor−dX)*predSamples[xHor][yHor]+dX*predSamples[xHor+upHor][yHor]+offsetHor)/upHor, and predSamples[xVer][yVer+dY]=((upVer−dY)*predSamples[xVer][yVer]+dY*predSamples[xVer][yVer+upVer]+offsetVer)/upVer, where offsetHor and offsetVer are integers, where upHor is a function of the current video block width and a pre-defined value based on the current video block size, where upVer is a function of the current video block height and the pre-defined value based on the current video block size; where dX is 1 . . . upHor−1, where dY is 1 . . . upVer−1, and where xHor are positions based on the upHor and yHor are positions based on the upVer.

A twenty-first example video processing method includes generating, for a conversion between a current video block of a video and a bitstream representation of the current video block, an intra prediction mode for the current video block coded with a matrix based intra prediction (MIP) mode in which a prediction block of the current video block is determined by performing, on previously coded samples of the video, a boundary downsampling operation, followed by a matrix vector multiplication operation, and selectively followed by an upsampling operation; determining a rule for storing information indicative of the intra prediction mode based on whether the current video block is coded with the MIP mode; and performing the conversion according to the rule, where the rule defines that the bitstream representation excludes a storage of information indicative of the MIP mode associated with the current video block.

In yet another representative aspect, the disclosed technology may be used to provide a method for video processing. This exemplary method includes determining that a current video block is coded using an affine linear weighted intra prediction (ALWIP) mode, constructing, based on the determining, at least a portion of a most probable mode (MPM) list for the ALWIP mode based on an at least a portion of an MPM list for a non-ALWIP intra mode, and performing, based on the MPM list for the ALWIP mode, a conversion between the current video block and a bitstream representation of the current video block.

In yet another representative aspect, the disclosed technology may be used to provide a method for video processing. This exemplary method includes determining that a luma component of a current video block is coded using an affine linear weighted intra prediction (ALWIP) mode, inferring, based on the determining, a chroma intra mode, and performing, based on the chroma intra mode, a conversion between the current video block and a bitstream representation of the current video block.

In yet another representative aspect, the disclosed technology may be used to provide a method for video processing. This exemplary method includes determining that a current video block is coded using an affine linear weighted intra prediction (ALWIP) mode, and performing, based on the determining, a conversion between the current video block and a bitstream representation of the current video block.

In yet another representative aspect, the disclosed technology may be used to provide a method for video processing. This exemplary method includes determining that a current video block is coded using a coding mode different from an affine linear weighted intra prediction (ALWIP) mode, and performing, based on the determining, a conversion between the current video block and a bitstream representation of the current video block.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 3 shows an example of locations of samples used for the derivation of the weights of the linear model.

FIGS. 20-38 show example flowcharts of additional example methods for matrix-based intra prediction, in accordance with the disclosed technology.

DETAILED DESCRIPTION

Due to the increasing demand of higher resolution video, video coding methods and techniques are ubiquitous in modern technology. Video codecs typically include an electronic circuit or software that compresses or decompresses digital video and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1 A Brief Review on HEVC 1.1 Intra Prediction in HEVC/H.265

Intra prediction involves producing samples for a given TB (transform block) using samples previously reconstructed in the considered color channel. The intra prediction mode is separately signaled for the luma and chroma channels, with the chroma channel intra prediction mode optionally dependent on the luma channel intra prediction mode via the 'DM_CHROMA' mode. Although the intra prediction mode is signaled at the PB (prediction block) level, the intra prediction process is applied at the TB level, in accordance with the residual quad-tree hierarchy for the CU, thereby allowing the coding of one TB to have an effect on the coding of the next TB within the CU, and therefore reducing the distance to the samples used as reference values.

Figure 1:
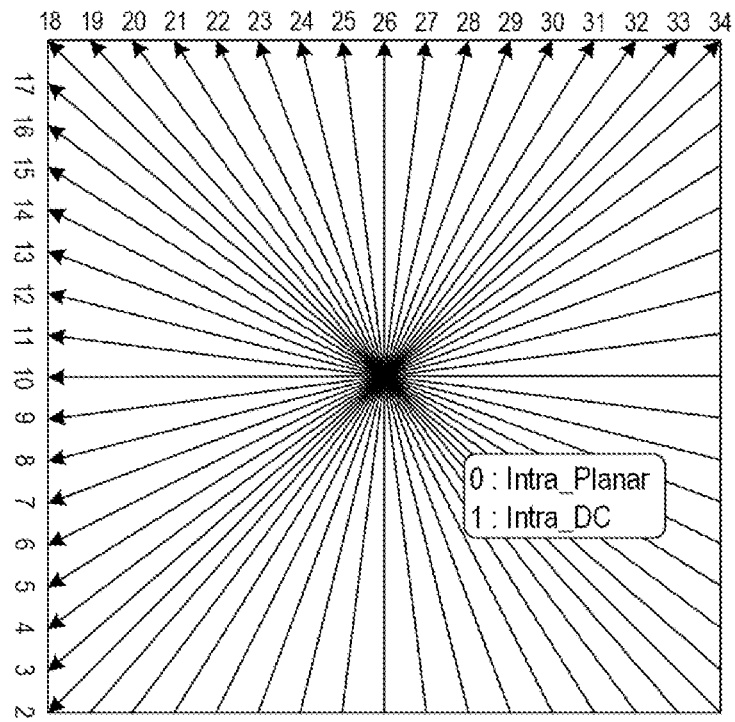
FIG. 1 shows an example of 33 intra prediction directions.

HEVC includes 35 intra prediction modes—a DC mode, a planar mode and 33 directional, or 'angular' intra prediction modes. The 33 angular intra prediction modes are illustrated in FIG. 1.

For PBs associated with chroma color channels, the intra prediction mode is specified as either planar, DC, horizontal, vertical, 'DM_CHROMA' mode or sometimes diagonal mode '34'.

Note for chroma formats 4:2:2 and 4:2:0, the chroma PB may overlap two or four (respectively) luma PBs; in this case the luma direction for DM_CHROMA is taken from the top left of these luma PBs.

The DM_CHROMA mode indicates that the intra prediction mode of the luma color channel PB is applied to the chroma color channel PBs. Since this is relatively common, the most-probable-mode coding scheme of the intra_chroma_pred_mode is biased in favor of this mode being selected.

Figure 2:
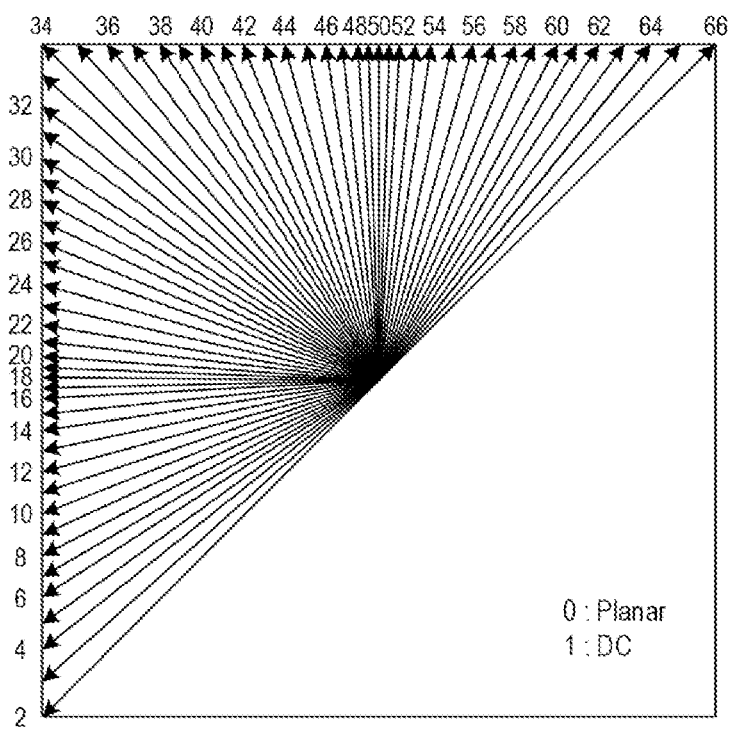
FIG. 2 shows an example of 67 intra prediction modes.

2 Examples of Intra Prediction in VVC 2.1 Intra Mode Coding with 67 Intra Prediction Modes To capture the arbitrary edge directions presented in natural video, the number of directional intra modes is extended from 33, as used in HEVC, to 65. The additional directional modes are depicted as red dotted arrows in FIG. 2, and the planar and DC modes remain the same. These denser directional intra prediction modes apply for all block sizes and for both luma and chroma intra predictions.

2.2 Examples of the Cross-Component Linear Model (CCLM)

In some embodiments, and to reduce the cross-component redundancy, a cross-component linear model (CCLM) prediction mode (also referred to as LM), is used in the JEM, for which the chroma samples are predicted based on the reconstructed luma samples of the same CU by using a linear model as follows:

$$\text{pred}_C(i,j) = \alpha \cdot \text{rec}_L'(i,j) + \beta \tag{1}$$

Here, $\text{pred}_C(i,j)$ represents the predicted chroma samples in a CU and $\text{rec}_L'(i,j)$ represents the downsampled reconstructed luma samples of the same CU. Linear model parameter $\alpha$ and $\beta$ are derived from the relation between luma values and chroma values from two samples, which are luma sample with minimum sample value and with maximum sample inside the set of downsampled neighboring luma samples, and their corresponding chroma samples. FIG. 3 shows an example of the location of the left and above samples and the sample of the current block involved in the CCLM mode.

This parameter computation is performed as part of the decoding process, and is not just as an encoder search operation. As a result, no syntax is used to convey the $\alpha$ and $\beta$ values to the decoder.

For chroma intra mode coding, a total of 8 intra modes are allowed for chroma intra mode coding. Those modes include five traditional intra modes and three cross-component linear model modes (CCLM, LM_A, and LM_L). Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

2.3 Multiple Reference Line (MRL) Intra Prediction

Figure 4:
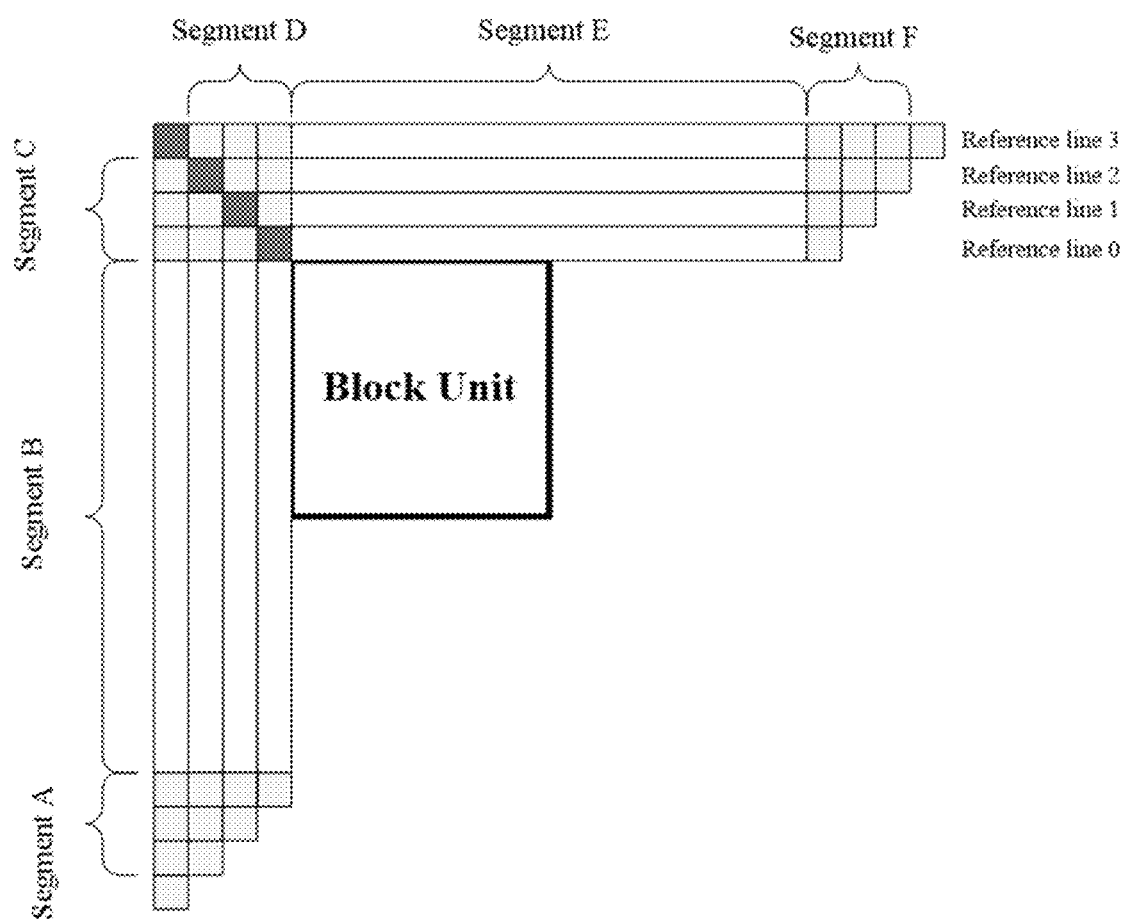
FIG. 4 shows an example of four reference lines neighboring a prediction block.

Multiple reference line (MRL) intra prediction uses more reference lines for intra prediction. In FIG. 4, an example of 4 reference lines is depicted, where the samples of segments A and F are not fetched from reconstructed neighboring samples but padded with the closest samples from Segment B and E, respectively. HEVC intra-picture prediction uses the nearest reference line (i.e., reference line 0). In MRL, 2 additional lines (reference line 1 and reference line 3) are used. The index of selected reference line (mrl_idx) is signalled and used to generate intra predictor. For reference line idx, which is greater than 0, only include additional reference line modes in MPM list and only signal mpm index without remaining mode.

2.4 Intra Sub-Partitions (ISP)

Figure 5A:
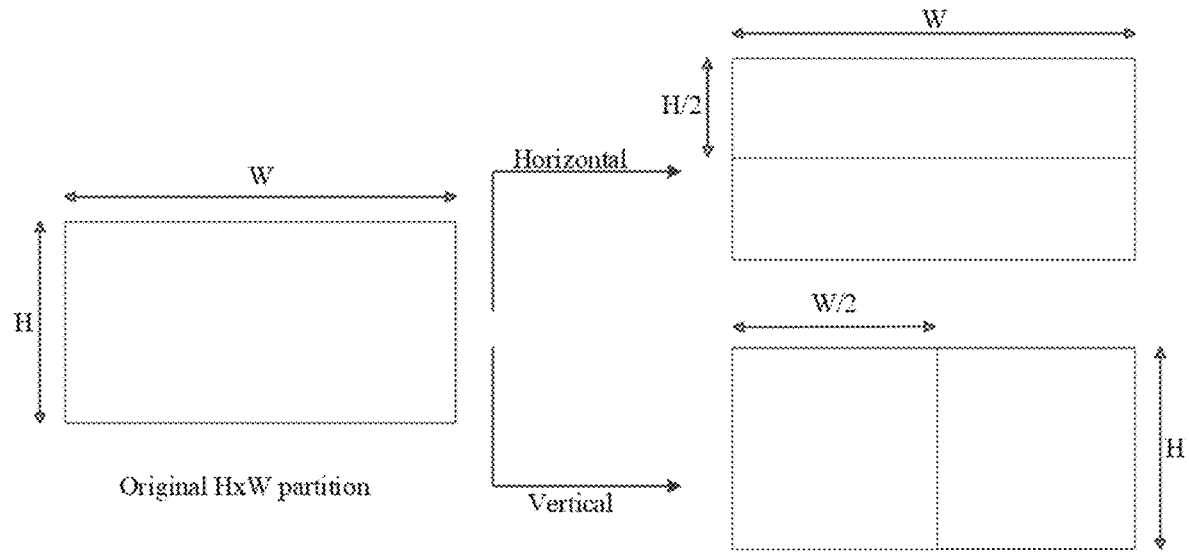
FIG. 5A and FIG. 5B show examples of sub-partitions depending on block size.
Figure 5B:
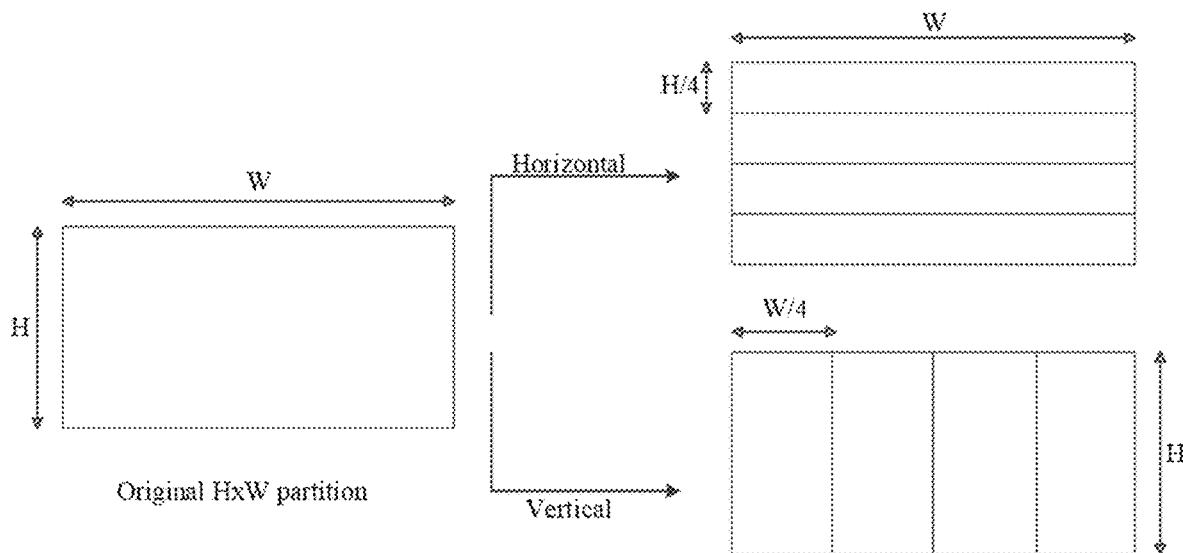
Figure 6:
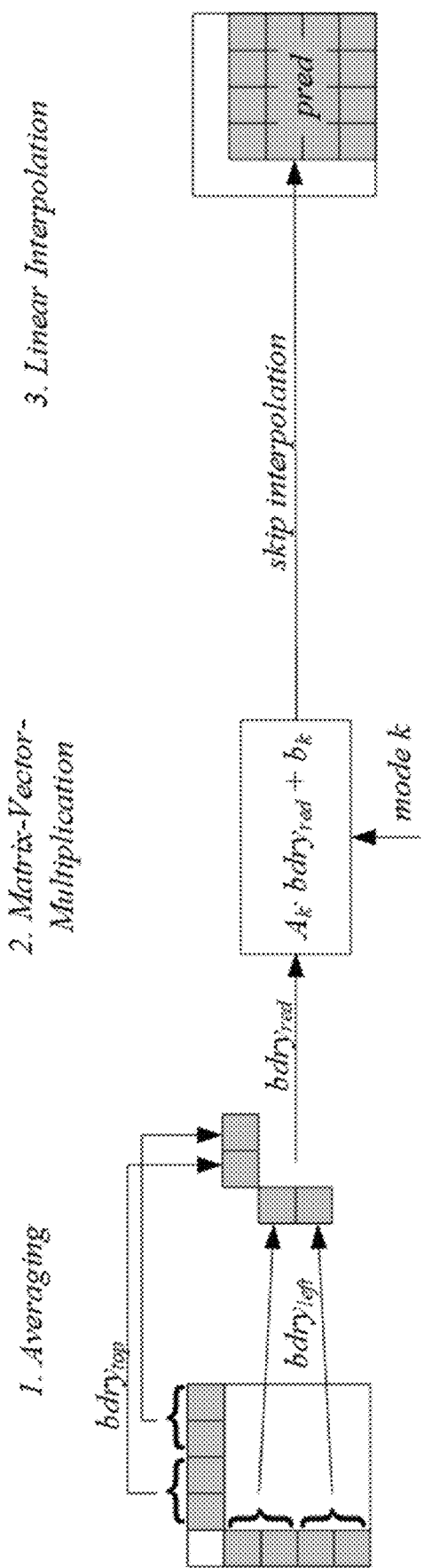
FIG. 6 shows an example of ALWIP for 4×4 blocks.
Figure 7:
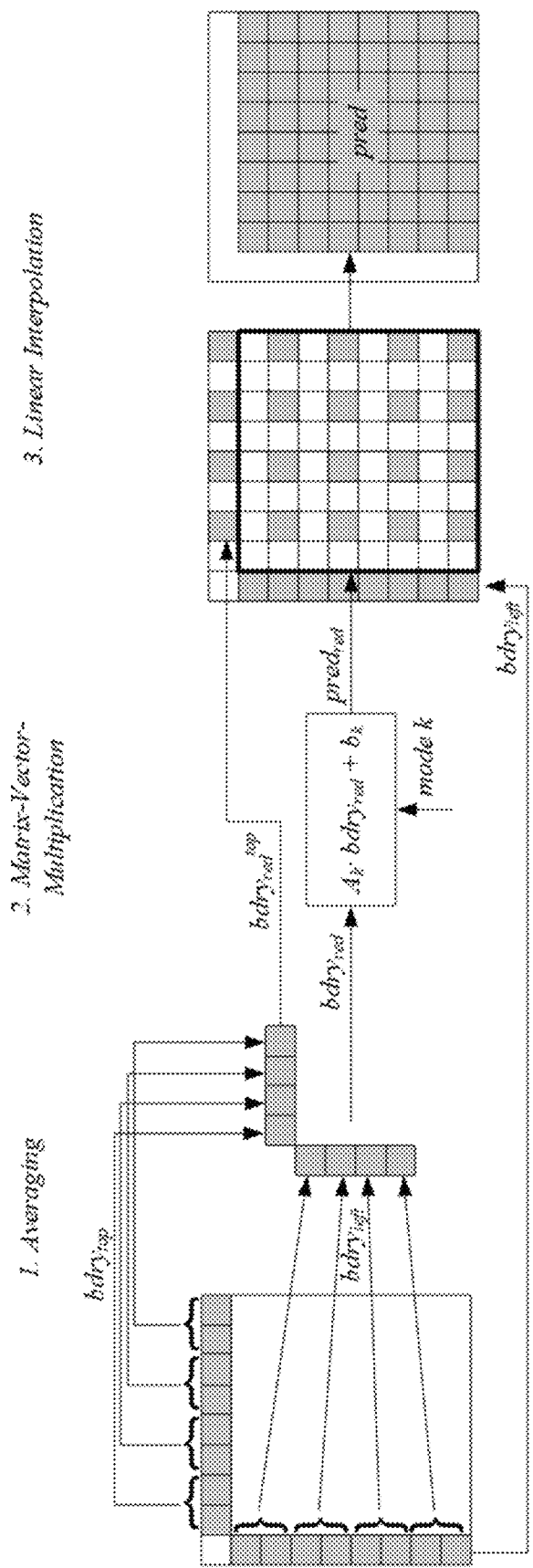
FIG. 7 shows an example of ALWIP for 8×8 blocks.
Figure 8:
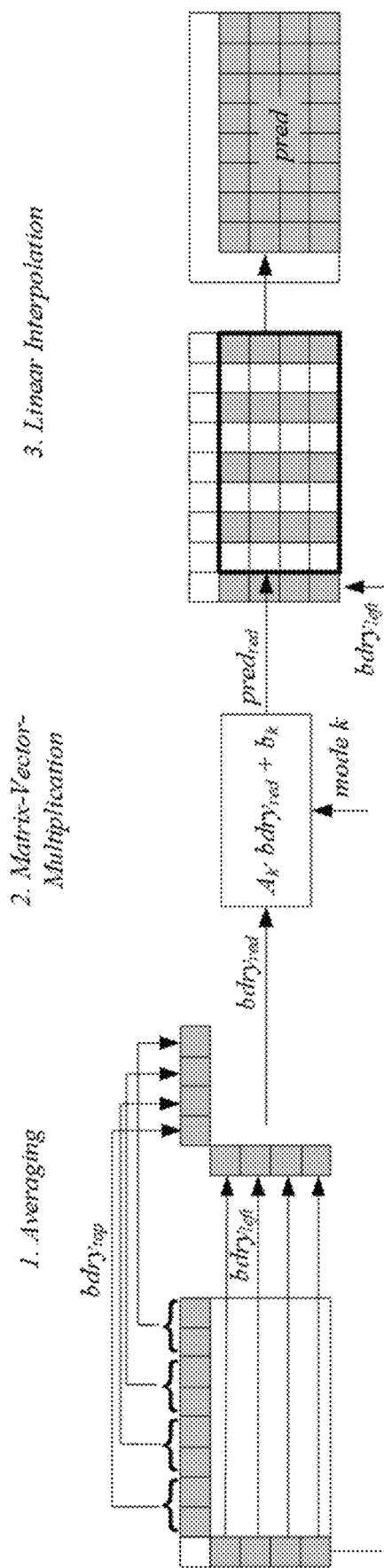
FIG. 8 shows an example of ALWIP for 8×4 blocks.
Figure 9:
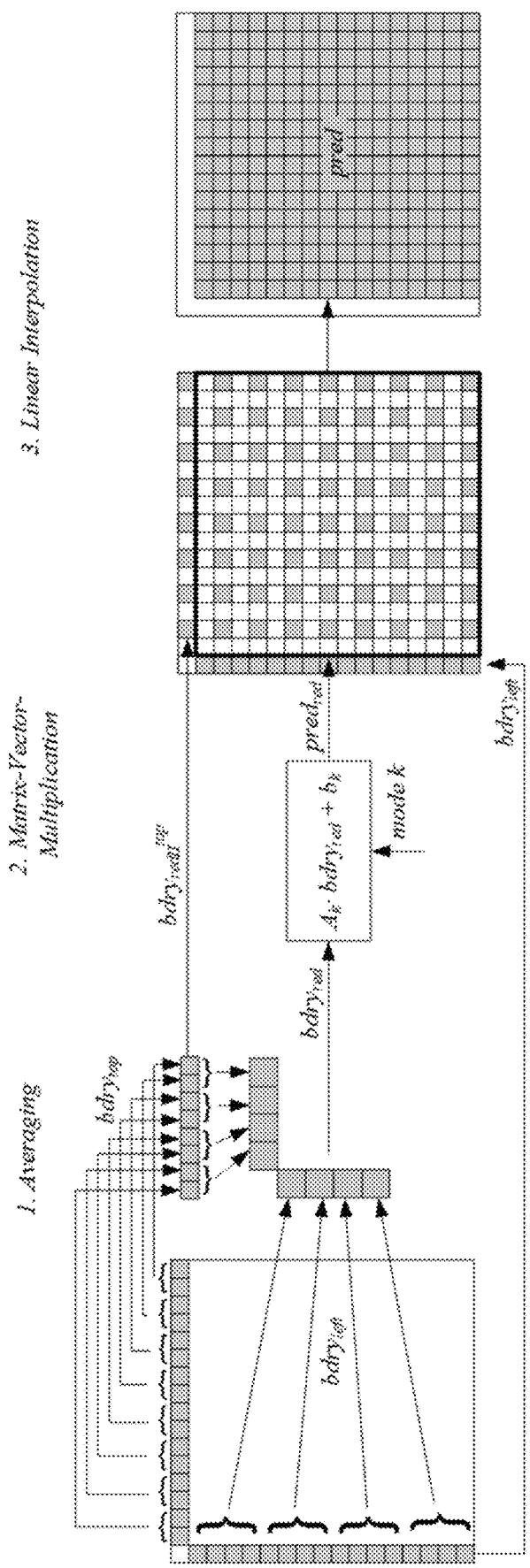
FIG. 9 shows an example of ALWIP for 16×16 blocks.

The Intra Sub-Partitions (ISP) tool divides luma intra-predicted blocks vertically or horizontally into 2 or 4 sub-partitions depending on the block size. For example, minimum block size for ISP is 4×8 (or 8×4). If block size is greater than 4×8 (or 8×4) then the corresponding block is divided by 4 sub-partitions. FIG. 5 shows examples of the two possibilities. All sub-partitions fulfill the condition of having at least 16 samples.

For each sub-partition, reconstructed samples are obtained by adding the residual signal to the prediction signal. Here, a residual signal is generated by the processes such as entropy decoding, inverse quantization and inverse transform. Therefore, the reconstructed sample values of each sub-partition are available to generate the prediction of the next sub-partition, and each sub-partition is processed repeatedly. In addition, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. All sub-partitions share the same intra mode.

2.5 Affine Linear Weighted Intra Prediction (ALWIP or Matrix-Based Intra Prediction)

Affine linear weighted intra prediction (ALWIP, a.k.a. Matrix based intra prediction (MIP)) is proposed in JVET-N0217.

In JVET-N0217, two tests are conducted. In test 1, ALWIP is designed with a memory restriction of 8K bytes and at most 4 multiplications per sample. Test 2 is similar to test 1, but further simplifies the design in terms of memory requirement and model architecture.

- Single set of matrices and offset vectors for all block shapes.
- Reduction of number of modes to 19 for all block shapes.
- Reduction of memory requirement to 576010-bit values, that is 7.20 Kilobyte.
- Linear interpolation of predicted samples is carried out in a single step per direction replacing iterative interpolation as in the first test.

2.5.1 Test 1 of JVET-N0217

For predicting the samples of a rectangular block of width W and height H, affine linear weighted intra prediction (ALWIP) takes one line of H reconstructed neighboring boundary samples left of the block and one line of W reconstructed neighboring boundary samples above the block as input. If the reconstructed samples are unavailable, they are generated as it is done in the conventional intra prediction.

The generation of the prediction signal is based on the following three steps:

Out of the boundary samples, four samples in the case of W=H=4 and eight samples in all other cases are extracted by averaging.

A matrix vector multiplication, followed by addition of an offset, is carried out with the averaged samples as an input. The result is a reduced prediction signal on a subsampled set of samples in the original block.

The prediction signal at the remaining positions is generated from the prediction signal on the subsampled set by linear interpolation which is a single step linear interpolation in each direction.

The matrices and offset vectors needed to generate the prediction signal are taken from three sets $S_0$, $S_1$, $S_2$ of matrices. The set $S_0$ consists of 18 matrices $A_0^i$, $i \in \{0, \ldots, 17\}$ each of which has 16 rows and 4 columns and 18 offset vectors $b_0^i$, $i \in \{0, \ldots, 17\}$ each of size 16. Matrices and offset vectors of that set are used for blocks of size 4×4. The set $S_1$ consists of 10 matrices $A_1^i$, $i \in \{0, \ldots, 9\}$, each of which has 16 rows and 8 columns and 10 offset vectors $b_1^i$, $i \in \{0, \ldots, 9\}$ each of size 16. Matrices and offset vectors of that set are used for blocks of sizes 4×8, 8×4 and 8×8. Finally, the set $S_2$ consists of 6 matrices $A_2^i$, $i \in \{0, \ldots, 5\}$, each of which has 64 rows and 8 columns and of 6 offset vectors $b_2^i$, $i \in \{0, \ldots, 5\}$ of size 64. Matrices and offset vectors of that set or parts of these matrices and offset vectors are used for all other block-shapes.

The total number of multiplications needed in the computation of the matrix vector product is always smaller than or equal to 4×W×H. In other words, at most four multiplications per sample are required for the ALWIP modes.

2.5.2 Averaging of the Boundary

In a first step, the input boundaries $bdry^{top}$ and $bdry^{left}$ are reduced to smaller boundaries $bdry_{red}^{top}$ and $bdry_{red}^{left}$. Here, $bdry_{red}^{top}$ and $bdry_{red}^{left}$ both consists of 2 samples in the case of a 4×4-block and both consist of 4 samples in all other cases.

In the case of a 4×4-block, for $0 \le i < 2$, one defines $$bdry_{red}^{top}[i] = \left(\left(\sum_{j=0}^{1} bdry^{top}[i \cdot 2 + j]\right) + 1\right) \gg 1$$

and defines $bdry_{red}^{left}$ analogously.

Otherwise, if the block-width W is given as $W=4 \cdot 2^k$, for $0 \le i < 4$, one defines $$bdry_{red}^{top}[i] = \left(\left(\sum_{j=0}^{2^k-1} bdry^{top}[i \cdot 2^k + j]\right) + (1 \ll (k-1))\right) \gg k$$

and defines $bdry_{red}^{left}$ analogously.

The two reduced boundaries $bdry_{red}^{top}$ and $bdry_{red}^{left}$ are concatenated to a reduced boundary vector $bdry_{red}$ which is thus of size four for blocks of shape 4×4 and of size eight for blocks of all other shapes. If mode refers to the ALWIP-mode, this concatenation is defined as follows:

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for } \max(W, H) = 8 \text{ and mode} < 10 \\ [bdry_{red}^{left}, bdry_{red}^{top}] & \text{for } \max(W, H) = 8 \text{ and mode} \geq 10 \\ [bdry_{red}^{top}, bdry_{red}^{left}] & \text{for } \max(W, H) > 8 \text{ and mode} < 6 \\ [bdry_{red}^{left}, bdry_{red}^{top}] & \text{for } \max(W, H) > 8 \text{ and mode} \geq 6 \end{cases}$$

Finally, for the interpolation of the subsampled prediction signal, on large blocks a second version of the averaged boundary is needed. Namely, if $\min(W, H) > 8$ and $W \geq H$, one writes $W = 8 * 2^l$, and, for $0 \leq i < 8$, defines $$bdry_{redII}^{top}[i] = \left(\left(\sum_{j=0}^{2^l-1} bdry^{top}[i \cdot 2^l + j]\right) + (1 \ll (l-1))\right) \gg l.$$

If $\min(W, H) > 8$ and $H > W$, one defines $bdry_{redII}^{left}$ analogously.

2.5.3 Generation of the Reduced Prediction Signal by Matrix Vector Multiplication Out of the reduced input vector $bdry_{red}$ one generates a reduced prediction signal $pred_{red}$. The latter signal is a signal on the downsampled block of width $W_{red}$ and height $H_{red}$. Here, $W_{red}$ and $H_{red}$ are defined as:

$$W_{red} = \begin{cases} 4 & \text{for } \max(W, H) \leq 8 \\ \min(W, 8) & \text{for } \max(W, H) > 8 \end{cases}$$

$$H_{red} = \begin{cases} 4 & \text{for } \max(W, H) \leq 8 \\ \min(H, 8) & \text{for } \max(W, H) > 8 \end{cases}$$

The reduced prediction signal $pred_{red}$ is computed by calculating a matrix vector product and adding an offset:

$$pred_{red} = A \cdot bdry_{red} + b$$

Here, A is a matrix that has $W_{red} \cdot H_{red}$ rows and 4 columns if $W = H = 4$ and 8 columns in all other cases. b is a vector of size $W_{red} \cdot H_{red}$.

The matrix A and the vector b are taken from one of the sets $S_0$, $S_1$, $S_2$ as follows. One defines an index $idx = idx(W, H)$ as follows:

$$idx(W, H) = \begin{cases} 0 & \text{for } W = H = 4 \\ 1 & \text{for } \max(W, H) = 8 \\ 2 & \text{for } \max(W, H) > 8 \end{cases}.$$

Moreover, one puts m as follows:

$$m = \begin{cases} \text{mode} & \text{for } W = H = 4 \text{ and mode} < 18 \\ \text{mode} - 17 & \text{for } W = H = 4 \text{ and mode} \geq 18 \\ \text{mode} & \text{for } \max(W, H) = 8 \text{ and mode} < 10 \\ \text{mode} - 9 & \text{for } \max(W, H) = 8 \text{ and mode} \geq 10 \\ \text{mode} & \text{for } \max(W, H) > 8 \text{ and mode} < 6 \\ \text{mode} - 5 & \text{for } \max(W, H) > 8 \text{ and mode} \geq 6 \end{cases}.$$

Then, if $idx \leq 1$ or $idx = 2$ and $\min(W, H) > 4$, one puts $A = A_{idx}^m$ and $b = b_{idx}^m$. In the case that $idx = 2$ and $\min(W, H) = 4$, one lets A be the matrix that arises by leaving out every row of $A_{idx}^m$ that, in the case $W = 4$, corresponds to an odd x-coordinate in the downsampled block, or, in the case $H = 4$, corresponds to an odd y-coordinate in the downsampled block.

Finally, the reduced prediction signal is replaced by its transpose in the following cases:

W=H=4 and mode≥18
max(W, H)=8 and mode≥10
max(W, H)>8 and mode≥6

The number of multiplications required for calculation of $pred_{red}$ is 4 in the case of W=H=4 since in this case A has 4 columns and 16 rows. In all other cases, A has 8 columns and $W_{red} \cdot H_{red}$ rows and one immediately verifies that in these cases $8 \cdot W_{red} \cdot H_{red} \leq 4 \cdot W \cdot H$ multiplications are required, i.e. also in these cases, at most 4 multiplications per sample are needed to compute $pred_{red}$.

2.5.4 Illustration of the Entire ALWIP Process

The entire process of averaging, matrix vector multiplication and linear interpolation is illustrated for different shapes in FIGS. 6-9. Note, that the remaining shapes are treated as in one of the depicted cases.

1. Given a 4×4 block, ALWIP takes two averages along each axis of the boundary. The resulting four input samples enter the matrix vector multiplication. The matrices are taken from the set $S_0$. After adding an offset, this yields the 16 final prediction samples. Linear interpolation is not necessary for generating the prediction signal. Thus, a total of (4·16)/(4·4)=4 multiplications per sample are performed.

2. Given an 8×8 block, ALWIP takes four averages along each axis of the boundary. The resulting eight input samples enter the matrix vector multiplication. The matrices are taken from the set $S_1$. This yields 16 samples on the odd positions of the prediction block. Thus, a total of (8·16)/(8·8)=2 multiplications per sample are performed. After adding an offset, these samples are interpolated vertically by using the reduced top boundary. Horizontal interpolation follows by using the original left boundary.

3. Given an 8×4 block, ALWIP takes four averages along the horizontal axis of the boundary and the four original boundary values on the left boundary. The resulting eight input samples enter the matrix vector multiplication. The matrices are taken from the set $S_1$. This yields 16 samples on the odd horizontal and each vertical positions of the prediction block. Thus, a total of (8·16)/(8·4)=4 multiplications per sample are performed. After adding an offset, these samples are interpolated horizontally by using the original left boundary.

4. Given a 16×16 block, ALWIP takes four averages along each axis of the boundary. The resulting eight input samples enter the matrix vector multiplication. The matrices are taken from the set $S_2$. This yields 64 samples on the odd positions of the prediction block. Thus, a total of (8·64)/

(16·16)=2 multiplications per sample are performed. After adding an offset, these samples are interpolated vertically by using eight averages of the top boundary. Horizontal interpolation follows by using the original left boundary. The interpolation process, in this case, does not add any multiplications. Therefore, totally, two multiplications per sample are required to calculate ALWIP prediction.

For larger shapes, the procedure is essentially the same and it is easy to check that the number of multiplications per sample is less than four.

For W×8 blocks with W>8, only horizontal interpolation is necessary as the samples are given at the odd horizontal and each vertical positions.

Finally, for W×4 blocks with W>8, let A_k be the matrix that arises by leaving out every row that corresponds to an odd entry along the horizontal axis of the downsampled block. Thus, the output size is 32 and again, only horizontal interpolation remains to be performed.

The transposed cases are treated accordingly.

2.5.5 Single Step Linear Interpolation

For a W×H block with max(W, H)≥8, the prediction signal arises from the reduced prediction signal $pred_{red}$ on $W_{red} \times H_{red}$ by linear interpolation. Depending on the block shape, linear interpolation is done in vertical, horizontal or both directions. If linear interpolation is to be applied in both directions, it is first applied in horizontal direction if W<H and it is first applied in vertical direction, else.

Consider without loss of generality a W×H block with max(W, H)≥8 and W≥H. Then, the one-dimensional linear interpolation is performed as follows. Without loss of generality, it suffices to describe linear interpolation in vertical direction. First, the reduced prediction signal is extended to the top by the boundary signal. Define the vertical upsampling factor $U_{ver} = H/H_{red}$ and write $U_{ver} = 2^{u_{ver}} > 1$. Then, define the extended reduced prediction signal by $$pred_{red}[x][-1] = \begin{cases} bdry_{red}^{top}[x] & \text{for } W = 8 \\ bdry_{redII}^{top}[x] & \text{for } W > 8 \end{cases}.$$

Then, from this extended reduced prediction signal, the vertically linear interpolated prediction signal is generated by $$pred_{red}^{ups,ver}[x][U_{ver} \cdot y + k] =$$
$$\left((U_{ver} - k - 1) \cdot pred_{red}[x][y-1] + (k+1) \cdot pred_{red}[x][y] + \frac{U_{ver}}{2}\right) \gg u_{ver}$$

for $0 \le x < W_{red}, 0 \le y < H_{red}$ and $0 \le k < U_{ver}$.

2.5.6 Signalization of the Proposed Intra Prediction Modes

For each Coding Unit (CU) in intra mode, a flag indicating if an ALWIP mode is to be applied on the corresponding Prediction Unit (PU) or not is sent in the bitstream. The signalization of the latter index is harmonized with MRL in the same way as in JVET-M0043. If an ALWIP mode is to be applied, the index predmode of the ALWIP mode is signaled using a MPM-list with 3 MPMS.

Here, the derivation of the MPMs is performed using the intra-modes of the above and the left PU as follows. There are three fixed tables map_angular_to_alwip$_{idx}$, idx∈{0,1,2} that assign to each conventional intra prediction mode predmode$_{Angular}$ an ALWIP mode predmode$_{ALWIP}$=map_angular_to_alwip$_{idx}$[predmode$_{Angular}$].

For each PU of width W and height H one defines an index idx(PU)=idx(W,H)∈{0,1,2} that indicates from which of the three sets the ALWIP-parameters are to be taken as in Section 2.5.3.

If the above Prediction Unit PU$_{above}$ is available, belongs to the same CTU as the current PU and is in intra mode, if idx(PU)=idx(PU$_{above}$) and if ALWIP is applied on PU$_{above}$ with ALWIP-mode predmode$_{ALWIP}^{above}$, one puts mode$_{ALWIP}^{above}$=predmode$_{ALWIP}^{above}$.

If the above PU is available, belongs to the same CTU as the current PU and is in intra mode and if a conventional intra prediction mode predmode$_{Angular}^{above}$ is applied on the above PU, one puts mode$_{ALWIP}^{above}$=map_angular_to_alwip$_{idx(PU_{above})}$[predmode$_{Angular}^{above}$].

In all other cases, one puts mode$_{ALWIP}^{above}$=-1, which means that this mode is unavailable. In the same way but without the restriction that the left PU needs to belong to the same CTU as the current PU, one derives a mode mode$_{ALWIP}^{left}$.

Finally, three fixed default lists list$_{idx}$, idx∈{0,1,2} are provided, each of which contains three distinct ALWIP modes. Out of the default list list$_{idx(PU)}$ and the modes mode$_{ALWIP}^{above}$ and mode$_{ALWIP}^{left}$, one constructs three distinct MPMs by substituting -1 by default values as well as eliminating repetitions.

Figure 10:
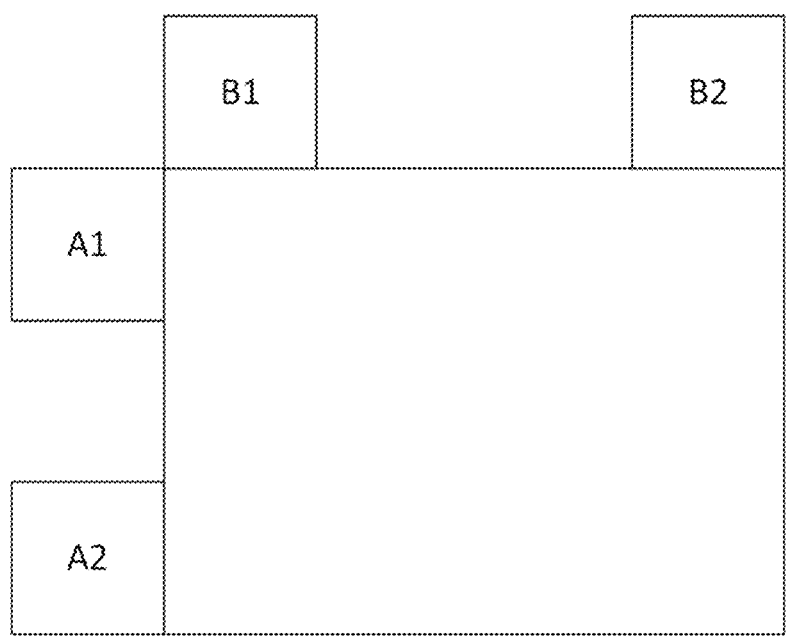
FIG. 10 shows an example of neighboring blocks using in MPM list construction.

The left neighboring block and above neighboring block used in the ALWIP MPM list construction is A1 and B1 as shown in FIG. 10.

2.5.7 Adapted MPM-List Derivation for Conventional Luma and Chroma Intra-Prediction Modes The proposed ALWIP-modes are harmonized with the MPM-based coding of the conventional intra-prediction modes as follows. The luma and chroma MPM-list derivation processes for the conventional intra-prediction modes uses fixed tables map_alwip_to_angular$_{idx}$, idx∈{0,1,2}, mapping an ALWIP-mode predmode$_{ALWIP}$ on a given PU to one of the conventional intra-prediction modes predmode$_{Angular}$=map_alwip_to_angular$_{idx(PU)}$[predmode$_{ALWIP}$]

For the luma MPM-list derivation, whenever a neighboring luma block is encountered which uses an ALWIP-mode predmode$_{ALWIP}$, this block is treated as if it was using the conventional intra-prediction mode predmode$_{Angular}$. For the chroma MPM-list derivation, whenever the current luma block uses an LWIP-mode, the same mapping is used to translate the ALWIP-mode to a conventional intra prediction mode.

2.5.8 Corresponding Modified Working Draft

In some embodiments, as described in this section, portions related to intra_lwip_flag, int_lwip_mpm_flag, intra_lwip_mpm_idx and intra_lwip_mpm_remainder have been added to the working draft based on embodiments of the disclosed technology.

In some embodiments, as described in this section, the <begin> and <end> tags are used to denote additions and modifications to the working draft based on embodiments of the disclosed technology.

Syntax Tables
Coding Unit Syntax

Semantics

<begin>intra_lwip_flag[x0][y0] equal to 1 specifies that the intra prediction type for luma samples is affine linear weighted intra prediction. intra_lwip_flag[x0][y0] equal to 0 specifies that the intra prediction type for luma samples is not affine linear weighted intra prediction.

When intra_lwip_flag[x0][y0] is not present, it is inferred to be equal to 0.

The syntax elements intra_lwip_mpm_flag[x0][y0], intra_lwip_mpm_idx[x0][y0] and intra_lwip_mpm_remainder[x0][y0] specify the affine linear weighted intra prediction mode for luma samples. The array indices x0, y0 specify

|  | Descriptor |
|---|---|
| coding_unit( x0, y0, cbWidth, cbHeight, treeType ) { | |
|   if( tile_group_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && tile_group_type != I ) | |
|       pred_mode_flag | ae(v) |
|     if( ( ( tile_group_type = = I && cu_skip_flag[ x0 ][ y0 ] = = 0 ) \|\| | |
|       ( tile_group_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|         if( Abs( Log2( cbWidth ) − Log2( cbHeight ) ) <= 2 ) | |
|           intra_lwip_flag[ x0 ][ y0 ] | ae(v) |
|         if( intra_lwip_flag[ x0 ][ y0 ] ) { | |
|           intra_lwip_mpm_flag[ x0 ][ y0 ] | ae(v) |
|           if( intra_lwip_mpm_flag[ x0 ][ y0 ] ) | |
|             intra_lwip_mpm_idx[ x0 ][ y0 ] | ae(v) |
|           else | |
|             intra_lwip_mpm_remainder[ x0 ][ y0 ] | ae(v) |
|         } else { | |
|           if( ( y0 % CtbSizeY ) > 0 ) | |
|             intra_luma_ref_idx[ x0 ][ y0 ] | ae(v) |
|           if (intra_luma_ref_idx[ x0 ][ y0 ] = = 0 && | |
|             ( cbWidth <= MaxTbSizeY \|\| cbHeight <= MaxTbSizeY ) && | |
|             ( cbWidth * cbHeight > MinTbSizeY * MinTbSizeY )) | |
|             intra_subpartitions_mode_flag[ x0 ][ y0 ] | ae(v) |
|           if( intra_subpartitions_mode_flag[ x0 ][ y0 ] = = 1 && | |
|             cbWidth <= MaxTbSizeY && cbHeight <= MaxTbSizeY ) | |
|             intra_subpartitions_split_flag[ x0 ][ y0 ] | ae(v) |
|           if( intra_luma_ref_idx[ x0 ][ y0 ] = = 0 && | |
|             intra_subpartitions_mode_flag[ x0 ][ y0 ] = = 0 ) | |
|             intra_luma_mpm_flag[ x0 ][ y0 ] | ae(v) |
|           if( intra_luma_mpm_flag[ x0 ][ y0 ] ) | |
|             intra_luma_mpm_idx[ x0 ][ y0 ] | ae(v) |
|           else | |
|             intra_luma_mpm_remainder[ x0 ][ y0 ] | ae(v) |
|         } | |
|       } | |
|       if( treeType = = SINGLE_TREE \|\| treeType = = DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER or MODE_IBC */ | |
|     ... | | the location (x0, y0) of the top-left luma sample of the considered coding block relative to the top-left luma sample of the picture. When intra_lwip_mpm_flag[x0][y0] is equal to 1, the affine linear weighted intra prediction mode is inferred from a neighboring intra-predicted coding unit according to clause 8.4.X.
When intra_lwip_mpm_flag[x0][y0] is not present, it is inferred to be equal to 1.<end>
intra_subpartitions_split_fag[x0][y0] specifies whether the intra subpartitions split type is horizontal or vertical. When intra_subpartitions_split_flag[x0][y0] is not present, it is inferred as follows:
    If intra_lwip_flag[x0][y0] is equal to 1, intra_subpartitions_split_flag[x0][y0] is inferred to be equal to 0.
    Otherwise, the following applies:
        If cbHeight is greater than MaxTbSizeY, intra_subpartitions_split_flag[x0][y0] is inferred to be equal to 0.
        Otherwise (cbWidth is greater than MaxTbSizeY), intra_subpartitions_split_flag[x0][y0] is inferred to be equal to 1.
Decoding Process
8.4.1 General Decoding Process for Coding Units Coded in Intra Prediction Mode
Inputs to this process are:
    a luma location (xCb, yCb) specifying the top-left sample of the current coding block relative to the top-left luma sample of the current picture,
    a variable cbWidth specifying the width of the current coding block in luma samples,
    a variable cbHeight specifying the height of the current coding block in luma samples,
    a variable treeType specifying whether a single or a dual tree is used and if a dual tree is used, it specifies whether the current tree corresponds to the luma or chroma components.
Output of this process is a modified reconstructed picture before in-loop filtering.
The derivation process for quantization parameters as specified in clause 8.7.1 is invoked with the luma location (xCb, yCb), the width of the current coding block in luma samples cbWidth and the height of the current coding block in luma samples cbHeight, and the variable treeType as inputs.
When treeType is equal to SINGLE_TREE or treeType is equal to DUAL_TREE_LUMA, the decoding process for luma samples is specified as follows:
    If pcm_flag[xCb][yCb] is equal to 1, the reconstructed picture is modified as follows:

$$S_L[xCb+i][yCb+j] = \text{pcm\_sample\_luma}[(cbHeight*j)+i] << (BitDepth_Y - PcmBitDepth_Y), \text{ with } i = 0 \ldots cbWidth-1, j = 0 \ldots cbHeight-1 \quad (8\text{-}6)$$

Otherwise, the following applies:
        1. The luma intra prediction mode is derived as follows:
            If intra_lwip_flag[xCb][yCb] is equal to 1, the derivation process for the affine linear weighted intra prediction mode as specified in clause 8.4.X is invoked with the luma location (xCb, yCb), the width of the current coding block in luma samples cbWidth and the height of the current coding block in luma samples cbHeight as input.
            Otherwise, the derivation process for the luma intra prediction mode as specified in clause 8.4.2 is invoked with the luma location (xCb, yCb), the width of the current coding block in luma samples cbWidth and the height of the current coding block in luma samples cbHeight as input.
        2. The general decoding process for intra blocks as specified in clause 8.4.4.1 is invoked with the luma location (xCb, yCb), the tree type treeType, the variable nTbW set equal to cbWidth, the variable nTbH set equal to cbHeight, the variable predModeIntra set equal to IntraPredModeY[xCb][yCb], and the variable cIdx set equal to 0 as inputs, and the output is a modified reconstructed picture before in-loop filtering.
. . .
<begin>
8.4.X Derivation Process for Affine Linear Weighted Intra Prediction Mode
Input to this process are:
    a luma location (xCb, yCb) specifying the top-left sample of the current luma coding block relative to the top-left luma sample of the current picture,
    a variable cbWidth specifying the width of the current coding block in luma samples,
    a variable cbHeight specifying the height of the current coding block in luma samples.
In this process, the affine linear weighted intra prediction mode IntraPredModeY[xCb][yCb] is derived.
IntraPredModeY[xCb][yCb] is derived by the following ordered steps:
    1. The neighboring locations (xNbA, yNbA) and (xNbB, yNbB) are set equal to (xCb−1, yCb) and (xCb, yCb−1), respectively.
    2. For X being replaced by either A or B, the variables candLwipModeX are derived as follows:
        The availability derivation process for a block as specified in clause 6.4.X [Ed. (BB): Neighboring blocks availability checking process tbd] is invoked with the location (xCurr, yCurr) set equal to (xCb, yCb) and the neighboring location (xNbY, yNbY) set equal to (xNbX, yNbX) as inputs, and the output is assigned to availableX.
        The candidate affine linear weighted intra prediction mode candLwipModeX is derived as follows:
            If one or more of the following conditions are true, candLwipModeX is set equal to −1.
                The variable availableX is equal to FALSE.
                CuPredMode[xNbX][yNbX] is not equal to MODE_INTRA and mh_intra_flag[xNbX][yNbX] is not equal to 1.
                pcm_flag[xNbX][yNbX] is equal to 1.
                X is equal to B and yCb−1 is less than ((yCb>>CtbLog 2SizeY)<<CtbLog 2SizeY).
            Otherwise, the following applies:
                The size type derivation process for a block as specified in clause 8.4.X.1 is invoked with the width of the current coding block in luma samples cbWidth and the height of the current coding block in luma samples cbHeight as input, and the output is assigned to variable sizeId.
                If intra_lwip_flag[xNbX][yNbX] is equal to 1, the size type derivation process for a block as specified in clause 8.4.X.1 is invoked with the width of the neighboring coding block in luma samples nbWidthX and the height of the neighboring coding block in luma samples nbHeightX as input, and the output is assigned to variable sizeIdX.
                If sizeId is equal to sizeIdX, candLwipModeX is set equal to IntraPredModeY[xNbX][yNbX].
                Otherwise, candLwipModeX is set equal to −1.

Otherwise, candLwipModeX is derived using IntraPredModeY[xNbX][yNbX] and sizeId as specified in Table 8-X1.
3. The candLwipModeList[x] with x=0 . . . 2 is derived as follows, using lwipMpmCand[sizeId] as specified in Table 8-X2:
If candLwipModeA and candLwipModeB are both equal to −1, the following applies:

candLwipModeList[0]=lwipMpmCand[sizeId][0]　　(8-X1)

candLwipModeList[1]=lwipMpmCand[sizeId][1]　　(8-X2)

candLwipModeList[2]=lwipMpmCand[sizeId][2]　　(8-X3)

Otherwise, the following applies:
  If candLwipModeA is equal to candLwipModeB or if either candLwipModeA or candLwipModeB is equal to −1, the following applies:

candLwipModeList[0]=(candLwipMode*A*!=−1)?can-dLwipMode*A*: candLwipMode*B*　　(8-X4)

If candLwipModeList[0] is equal to lwipMpmCand[sizeId][0]), the following applies:

candLwipModeList[1]=lwipMpmCand[sizeId][1]　　(8-X5)

candLwipModeList[2]=lwipMpmCand[sizeId][2]　　(8-X6)

Otherwise, the following applies:

candLwipModeList[1]=lwipMpmCand[sizeId][0]　　(8-X7)

candLwipModeList[2]=(candLwipModeList[0]!=lwipMpmCand[sizeId][1])?lwipMpmCand[sizeId][1]: lwipMpmCand[sizeId][2]　　(8-X8)

Otherwise, the following applies:

candLwipModeList[0]=candLwipMode*A*　　(8-X9)

candLwipModeList[1]=candLwipMode*B*　　(8-X10)

If candLwipModeA and candLwipModeB are both not equal to lwipMpmCand[sizeId][0], the following applies:

candLwipModeList[2]=lwipMpmCand[sizeId][0]　　(8-X11)

Otherwise, the following applies:
    If candLwipModeA and candLwipModeB are both not equal to lwipMpmCand[sizeId][1], the following applies:

candLwipModeList[2]=lwipMpmCand[sizeId][1]　　(8-X12)

Otherwise, the following applies:

candLwipModeList[2]=lwipMpmCand[sizeId][2]　　(8-X13)

4. IntraPredModeY[xCb][yCb] is derived by applying the following procedure:
  If intra_lwip_mpm_flag[xCb][yCb] is equal to 1, the IntraPredModeY[xCb][yCb] is set equal to candLwipModeList[intra_lwip_mpm_idx[xCb][yCb]].
  Otherwise, IntraPredModeY[xCb][yCb] is derived by applying the following ordered steps:
    1. When candLwipModeList[i] is greater than candLwipModeList[j] for i=0 . . . 1 and for each i, j=(i+1) . . . 2, both values are swapped as follows:

(candLwipModeList[*i*],candLwipModeList[*j*])=Swap(candLwipModeList[*i*],candLwipModeList[*j*])　　(8-X14)

2. IntraPredModeY[xCb][yCb] is derived by the following ordered steps:
      i. IntraPredModeY[xCb][yCb] is set equal to intra_lwip_mpm_remainder[xCb][yCb].
      ii. For i equal to 0 to 2, inclusive, when IntraPredModeY[xCb][yCb] is greater than or equal to candLwipModeList[i], the value of IntraPredModeY[xCb][yCb] is incremented by one.
The variable IntraPredModeY[x][y] with x=xCb . . . xCb+cbWidth−1 and y=yCb . . . yCb+cbHeight−1 is set to be equal to IntraPredModeY[xCb][yCb].

8.4.X.1 Derivation Process for Prediction Block Size Type

Input to this process are:
  a variable cbWidth specifying the width of the current coding block in luma samples,
  a variable cbHeight specifying the height of the current coding block in luma samples.
Output of this process is a variable sizeId.
The variable sizeId is derived as follows:
  If both cbWidth and cbHeight are equal to 4, sizeId is set equal to 0.
  Otherwise, if both cbWidth and cbHeight are less than or equal to 8, sizeId is set equal to 1.
  Otherwise, sizeId is set equal to 2.

TABLE 8-X1

Specification of mapping between intra prediction and affine linear weighted intra prediction modes

| IntraPredModeY[xNbX][yNbX] | block size type sizeId | | |
| --- | --- | --- | --- |
| | 0 | 1 | 2 |
| 0 | 17 | 0 | 5 |
| 1 | 17 | 0 | 1 |
| 2, 3 | 17 | 10 | 3 |
| 4, 5 | 9 | 10 | 3 |
| 6, 7 | 9 | 10 | 3 |
| 8, 9 | 9 | 10 | 3 |
| 10, 11 | 9 | 10 | 0 |
| 12, 13 | 17 | 4 | 0 |
| 14, 15 | 17 | 6 | 0 |
| 16, 17 | 17 | 7 | 4 |
| 18, 19 | 17 | 7 | 4 |
| 20, 21 | 17 | 7 | 4 |
| 22, 23 | 17 | 5 | 5 |
| 24, 25 | 17 | 5 | 1 |
| 26, 27 | 5 | 0 | 1 |
| 28, 29 | 5 | 0 | 1 |
| 30, 31 | 5 | 3 | 1 |
| 32, 33 | 5 | 3 | 1 |
| 34, 35 | 34 | 12 | 6 |
| 36, 37 | 22 | 12 | 6 |
| 38, 39 | 22 | 12 | 6 |
| 40, 41 | 22 | 12 | 6 |
| 42, 43 | 22 | 14 | 6 |
| 44, 45 | 34 | 14 | 10 |
| 46, 47 | 34 | 14 | 10 |
| 48, 49 | 34 | 16 | 9 |
| 50, 51 | 34 | 16 | 9 |
| 52, 53 | 34 | 16 | 9 |
| 54, 55 | 34 | 15 | 9 |
| 56, 57 | 34 | 13 | 9 |
| 58, 59 | 26 | 1 | 8 |
| 60, 61 | 26 | 1 | 8 |
| 62, 63 | 26 | 1 | 8 |
| 64, 65 | 26 | 1 | 8 |
| 66 | 26 | 1 | 8 |

TABLE 8-X2

Specification of affine linear weighted
intra prediction candidate modes

| | candidate mode | | |
|---|---|---|---|
| | 0 | 1 | 2 |
| lwipMpmCand[0] | 17 | 34 | 5 |
| lwipMpmCand[1] | 0 | 7 | 16 |
| lwipMpmCand[2] | 1 | 4 | 6 |

<end>

8.4.2. Derivation Process for Luma Intra Prediction Mode

Input to this process are:
 a luma location (xCb, yCb) specifying the top-left sample of the current luma coding block relative to the top-left luma sample of the current picture,
 a variable cbWidth specifying the width of the current coding block in luma samples,
 a variable cbHeight specifying the height of the current coding block in luma samples.

In this process, the luma intra prediction mode IntraPredModeY[xCb][yCb] is derived.

Table 8-1 specifies the value for the intra prediction mode IntraPredModeY[xCb][yCb] and the associated names.

TABLE 8-1

Specification of intra prediction
mode and associated names

| Intra prediction mode | Associated name |
|---|---|
| 0 | INTRA_PLANAR |
| 1 | INTRA_DC |
| 2 ... 66 | INTRA_ANGULAR2 ... INTRA_ANGULAR66 |
| 81 ... 83 | INTRA_LT_CCLM, INTRA_L_CCLM, INTRA_T_CCLM |

NOTE:
The intra prediction modes INTRA_LT_CCLM, INTRA_L_CCLM and INTRA_T_CCLM are only applicable to chroma components.

IntraPredModeY[xCb][yCb] is derived by the following ordered steps:

1. The neighboring locations (xNbA, yNbA) and (xNbB, yNbB) are set equal to (xCb−1, yCb+cbHeight−1) and (xCb+cbWidth−1, yCb−1), respectively.
2. For X being replaced by either A or B, the variables candIntraPredModeX are derived as follows:
   The availability derivation process for a block as specified in clause <begin>6.4.X [Ed. (BB): Neighboring blocks availability checking process tbd]<end> is invoked with the location (xCurr, yCurr) set equal to (xCb, yCb) and the neighboring location (xNbY, yNbY) set equal to (xNbX, yNbX) as inputs, and the output is assigned to availableX.
   The candidate intra prediction mode candIntraPredModeX is derived as follows:
      If one or more of the following conditions are true, candIntraPredModeX is set equal to INTRA_PLANAR.
         The variable availableX is equal to FALSE.
         CuPredMode[xNbX][yNbX] is not equal to MODE_INTRA and ciip_flag[xNbX][yNbX] is not equal to 1.
         pcm_flag[xNbX][yNbX] is equal to 1.
         X is equal to B and yCb−1 is less than ((yCb>>CtbLog 2SizeY)<<CtbLog 2SizeY).

Otherwise, candIntraPredModeX is derived as follows:
   If intra_lwip_lag[xCb][yCb] is equal to 1, candIntraPredModeX is derived by the following ordered steps:
      i. The size type derivation process for a block as specified in clause 8.4.X.1 is invoked with the width of the current coding block in luma samples cbWidth and the height of the current coding block in luma samples cbHeight as input, and the output is assigned to variable sizeId.
      ii. candIntraPredModeX is derived using IntraPredModeY[xNbX][yNbX] and sizeId as specified in Table 8-X3.
   Otherwise, candIntraPredModeX is set equal to IntraPredModeY[xNbX][yNbX].
3. The variables ispDefaultMode1 and ispDefaultMode2 are defined as follows:
   If IntraSubPartitionsSplitType is equal to ISP_HOR_SPLIT, ispDefaultMode1 is set equal to INTRA_ANGULAR18 and ispDefaultMode2 is set equal to INTRA_ANGULAR5.
   Otherwise, ispDefaultMode1 is set equal to INTRA_ANGULAR50 and ispDefaultMode2 is set equal to INTRA_ANGULAR63.

. . .

TABLE 8-X3

Specification of mapping between affine linear
weighted intra prediction and intra prediction modes

| | block size type sizeId | | |
|---|---|---|---|
| IntraPredModeY[xNbX][yNbX] | 0 | 1 | 2 |
| 0 | 0 | 0 | 1 |
| 1 | 18 | 1 | 1 |
| 2 | 18 | 0 | 1 |
| 3 | 0 | 1 | 1 |
| 4 | 18 | 0 | 18 |
| 5 | 0 | 22 | 0 |
| 6 | 12 | 18 | 1 |
| 7 | 0 | 18 | 0 |
| 8 | 18 | 1 | 1 |
| 9 | 2 | 0 | 50 |
| 10 | 18 | 1 | 0 |
| 11 | 12 | 0 | |
| 12 | 18 | 1 | |
| 13 | 18 | 0 | |
| 14 | 1 | 44 | |
| 15 | 18 | 0 | |
| 16 | 18 | 50 | |
| 17 | 0 | 1 | |
| 18 | 0 | 0 | |
| 19 | 50 | | |
| 20 | 0 | | |
| 21 | 50 | | |
| 22 | 0 | | |
| 23 | 56 | | |
| 24 | 0 | | |
| 25 | 50 | | |
| 26 | 66 | | |
| 27 | 50 | | |
| 28 | 56 | | |
| 29 | 50 | | |
| 30 | 50 | | |
| 31 | 1 | | |
| 32 | 50 | | |
| 33 | 50 | | |
| 34 | 50 | | |

8.4.3 Derivation Process for Chroma Intra Prediction Mode
Input to this process are:
- a luma location (xCb, yCb) specifying the top-left sample of the current chroma coding block relative to the top-left luma sample of the current picture,
- a variable cbWidth specifying the width of the current coding block in luma samples,
- a variable cbHeight specifying the height of the current coding block in luma samples.

In this process, the chroma intra prediction mode IntraPredModeC[xCb][yCb] is derived.

The corresponding luma intra prediction mode lumaIntraPredMode is derived as follows:
- If intra_lwip_flag[xCb][yCb] is equal to 1, lumaIntraPredMode is derived by the following ordered steps:
  i. The size type derivation process for a block as specified in clause 8.4.X.1 is invoked with the width of the current coding block in luma samples cbWidth and the height of the current coding block in luma samples cbHeight as input, and the output is assigned to variable sizeId.
  ii. The luma intra prediction mode is derived using IntraPredModeY[xCb+cbWidth/2]yCb+cbHeight/2) and sizeId as specified in Table 8-X3 and assigning the value of candIntraPredModeX to lumaIntraPredMode.
- Otherwise, lumaIntraPredMode is set equal to IntraPredModeY[xCb+cbWidth/2][yCb+cbHeight/2].

The chroma intra prediction mode IntraPredModeC[xCb][yCb] is derived using intra_chroma_pred_mode[xCb][yCb] and lumaIntraPredMode as specified in Table 8-2 and Table 8-3.

. . .

xxx. Intra Sample Prediction
<begin>
Inputs to this process are:
- a sample location (xTbCmp, yTbCmp) specifying the top-left sample of the current transform block relative to the top-left sample of the current picture,
- a variable predModeIntra specifying the intra prediction mode,
- a variable nTbW specifying the transform block width,
- a variable nTbH specifying the transform block height,
- a variable nCbW specifying the coding block width,
- a variable nCbH specifying the coding block height,
- a variable cIdx specifying the colour component of the current block.

Outputs of this process are the predicted samples predSamples[x][y], with x=0 . . . nTbW−1, y=0 . . . nTbH−1.

The predicted samples predSamples[x][y] are derived as follows:
- If intra_lwip_flag[xTbCmp][yTbCmp] is equal to 1 and cIdx is equal to 0, the affine linear weighted intra sample prediction process as specified in clause 8.4.4.2.X1 is invoked with the location (xTbCmp, yTbCmp), the intra prediction mode predModeIntra, the transform block width nTbW and height nTbH as inputs, and the output is predSamples.
- Otherwise, the general intra sample prediction process as specified in clause 8.4.4.2.X1. is invoked with the location (xTbCmp, yTbCmp), the intra prediction mode predModeIntra, the transform block width nTbW and height nTbH, the coding block width nCbW and height nCbH, and the variable cIdx as inputs, and the output is predSamples.

8.4.4.2.X1 Affine Linear Weighted Intra Sample Prediction
Inputs to this process are:
- a sample location (xTbCmp, yTbCmp) specifying the top-left sample of the current transform block relative to the top-left sample of the current picture,
- a variable predModeIntra specifying the intra prediction mode,
- a variable nTbW specifying the transform block width,
- a variable nTbH specifying the transform block height.

Outputs of this process are the predicted samples predSamples[x][y], with x=0 . . . nTbW−1, y=0 . . . nTbH−1.

The size type derivation process for a block as specified in clause 8.4.X.1 is invoked with the transform block width nTbW and the transform block height nTbH as input, and the output is assigned to variable sizeId.

Variables numModes, boundarySize, predW, predH and predC are derived using sizeId as specified in Table 8-X4.

TABLE 8-X4

Specification of number of modes, boundary sample size and prediction sizes depending on sizeId

| sizeId | numModes | boundarySize | predW | predH | predC |
|---|---|---|---|---|---|
| 0 | 35 | 2 | 4 | 4 | 4 |
| 1 | 19 | 4 | 4 | 4 | 4 |
| 2 | 11 | 4 | Min (nTbW, 8) | Min (nTbH, 8) | 8 |

The flag isTransposed is derived as follows:

$$\text{isTransposed}=(\text{predModeIntra}>(\text{numModes}/2))?1:0 \qquad (8\text{-}X15)$$

The flags needUpsBdryHor and needUpsBdryVer are derived as follows:

$$\text{needUpsBdryHor}=(\text{nTbW}>\text{predW})?\text{TRUE}:\text{FALSE} \qquad (8\text{-}X16)$$

$$\text{needUpsBdryVer}=(\text{nTbH}>\text{predH})?\text{TRUE}:\text{FALSE} \qquad (8\text{-}X17)$$

The variables upsBdryW and upsBdryH are derived as follows:

$$\text{upsBdryW}=(\text{nTbH}>\text{nTbW})?\text{nTbW}:\text{predW} \qquad (8\text{-}X18)$$

$$\text{upsBdryH}=(\text{nTbH}>\text{nTbW})?\text{predH}:\text{nTbH} \qquad (8\text{-}X19)$$

The variables lwipW and lwipH are derived as follows:

$$\text{lwipW}=(\text{isTransposed}==1)?\text{predH}:\text{predW} \qquad (8\text{-}X20)$$

$$\text{lwipH}=(\text{isTransposed}==1)?\text{predW}:\text{predH} \qquad (8\text{-}X21)$$

For the generation of the reference samples refT[x] with x=0 . . . nTbW−1 and refL[y] with y=0 . . . nTbH−1, the reference sample derivation process as specified in clause 8.4.4.2.X2 is invoked with the sample location (xTbCmp, yTbCmp), the transform block width nTbW, the transform block height nTbH as inputs, and top and left reference samples refT[x] with x=0 . . . nTbW−1 and refL[y] with y=0 . . . nTbH−1, respectively, as outputs.

For the generation of the boundary samples p[x] with x=0 . . . 2*boundarySize−1, the following applies:
- The boundary reduction process as specified in clause 8.4.4.2.X3 is invoked for the top reference samples with the block size nTbW, the reference samples refT, the boundary size boundarySize, the upsampling boundary flag needUpsBdryVer, and the upsampling boundary size upsBdryW as inputs, and reduced boundary samples redT[x] with x=0 . . . boundarySize−1 and upsampling boundary samples upsBdryT[x] with x=0 . . . upsBdryW−1 as outputs.

The boundary reduction process as specified in clause 8.4.4.2.X3 is invoked for the left reference samples with the block size nTbH, the reference samples refL, the boundary size boundarySize, the upsampling boundary flag needUpsBdryHor, and the upsampling boundary size upsBdryH as inputs, and reduced boundary samples redL[x] with x=0 . . . boundarySize−1 and upsampling boundary samples upsBdryL[x] with x=0 . . . upsBdryH−1 as outputs.

The reduced top and left boundary samples redT and redL are assigned to the boundary sample array p as follows:
If isTransposed is equal to 1, p[x] is set equal to redL[x] with x=0 . . . boundarySize−1 and p[x+boundarySize] is set equal to redT[x] with x=0 . . . boundarySize−1.

If needUpsBdryVer is equal to TRUE or needUpsBdryHor is equal to TRUE, the prediction upsampling process as specified in clause 8.4.4.2.X4 is invoked with the input block width predW, the input block height predH, affine linear weighted samples predLwip, the transform block width nTbW, the transform block height nTbH, the upsampling boundary width upsBdryW, the upsampling boundary height upsBdryH, the top upsampling boundary samples upsBdryT, and the left upsampling boundary samples upsBdryL as inputs, and the output is the predicted sample array predSamples.

Otherwise, predSamples[x][y], with x=0 . . . nTbW−1, y=0 . . . nTbH−1 is set equal to predLwip[x][y].

TABLE 8-X5

Specification of weight shifts sW depending on sizeId and modeId

| | modeId | | | | | | | | | | | | | | | | | |
|---|---|---|---|---|---|---|---|---|---|---|---|---|---|---|---|---|---|---|
| sizeId | 0 | 1 | 2 | 3 | 4 | 5 | 6 | 7 | 8 | 9 | 10 | 11 | 12 | 13 | 14 | 15 | 16 | 17 |
| 0 | 8 | 8 | 8 | 8 | 8 | 8 | 8 | 8 | 8 | 8 | 8 | 8 | 8 | 8 | 8 | 8 | 8 | 8 |
| 1 | 8 | 8 | 8 | 9 | 8 | 8 | 8 | 8 | 9 | 8 | | | | | | | | |
| 2 | 8 | 8 | 8 | 8 | 8 | 8 | | | | | | | | | | | | |

Otherwise, p[x] is set equal to redT[x] with x=0 . . . boundarySize−1 and p[x+boundarySize] is set equal to redL[x] with x=0 . . . boundarySize−1.

For the intra sample prediction process according to predModeIntra, the following ordered steps apply:

1. The affine linear weighted samples predLwip[x][y], with x=0 . . . lwipW−1, y=0 . . . lwipH−1 are derived as follows:

The variable modeId is derived as follows:

$$\text{modeId} = \text{predModeIntra} - (\text{isTransposed}==1)?(\text{numModes}/2):0 \quad (8\text{-}X22)$$

The weight matrix mWeight[x][y] with x=0 . . . 2*boundarySize−1, y=0 . . . predC*predC−1 is derived using sizeId and modeId as specified in Table 8-XX [TBD: add weight matrices].

The bias vector vBias[y] with y=0 . . . predC*predC−1 is derived using sizeId and modeId as specified in Table 8-XX [TBD: add bias vectors].

The variable sW is derived using sizeId and modeId as specified in Table 8-X5.

The affine linear weighted samples predLwip[x][y], with x=0 . . . lwipW−1, y=0 . . . lwipH−1 are derived as follows:

$$oW = 1 << (sW-1) \quad (8\text{-}X23)$$

$$sB = \text{BitDepth}_Y - 1 \quad (8\text{-}X24)$$

$$incW = (predC > lwipW)?2:1 \quad (8\text{-}X25)$$

$$incH = (predC > lwipH)?2:1 \quad (8\text{-}X26)$$

$$predLwip[x][y] = ((\Sigma_{i=0}^{2*boundarySize-1} mWeight[i][y*incH*predC+x*incW]*p[i]) + (vBias[y*incH*predC+x*incW] << sB) + oW) >> sW \quad (8\text{-}X27)$$

2. The predicted samples predSamples[x][y], with x=0 . . . nTbW−1, y=0 . . . nTbH−1 are derived as follows:

When isTransposed is equal to 1, predLwip[x][y], with x=0 . . . predW−1, y=0 . . . predH−1 is set equal to predLwip[y][x].

8.4.4.2.X2 Reference Sample Derivation Process

Inputs to this process are:
- a sample location (xTbY, yTbY) specifying the top-left luma sample of the current transform block relative to the top-left luma sample of the current picture,
- a variable nTbW specifying the transform block width,
- a variable nTbH specifying the transform block height.

Outputs of this process are the top and left reference samples refT[x] with x=0 . . . nTbW−1 and refL[y] with y=0 . . . nTbH−1, respectively.

The neighboring samples refT[x] with x=0 . . . nTbW−1 and refL[y] with y=0 . . . nTbH−1 are constructed samples prior to the in-loop filter process and derived as follows:

The top and left neighboring luma locations (xNbT, yNbT) and (xNbL, yNbL) are specified by:

$$(xNbT, yNbT) = (xTbY+x, yTbY-1) \quad (8\text{-}X28)$$

$$(xNbL, yNbL) = (xTbY-1, yTbY+y) \quad (8\text{-}X29)$$

The availability derivation process for a block as specified in clause 6.4.X [Ed. (BB): Neighboring blocks availability checking process tbd] is invoked with the current luma location (xCurr, yCurr) set equal to (xTbY, yTbY) and the top neighboring luma location (xNbT, yNbT) as inputs, and the output is assigned to availTop[x] with x=0 . . . nTbW−1.

The availability derivation process for a block as specified in clause 6.4.X [Ed. (BB): Neighboring blocks availability checking process tbd] is invoked with the current luma location (xCurr, yCurr) set equal to (xTbY, yTbY) and the left neighboring luma location (xNbL, yNbL) as inputs, and the output is assigned to availLeft[y] with y=0 . . . nTbH−1.

The top reference samples refT[x] with x=0 . . . nTbW−1 are derived as follows:

If all availTop[x] with x=0 . . . nTbW−1 are equal to TRUE, the sample at the location (xNbT, yNbT) is assigned to refT[x] with x=0 . . . nTbW−1.

Otherwise, if availTop[0] is equal to FALSE, all refT[x] with x=0 . . . nTbW−1 are set equal to 1<<(BitDepth$_Y$−1).

Otherwise, reference samples refT[x] with x=0 . . . nTbW−1 are derived by the following ordered steps:
1. The variable lastT is set equal to the position x of the first element in the sequence availTop[x] with x=1 . . . nTbW−1 that is equal to FALSE.
2. For every x=0 . . . lastT−1, the sample at the location (xNbT, yNbT) is assigned to refT[x].
3. For every x=lastT . . . nTbW−1, refT[x] is set equal to refT[lastT−1].

The left reference samples refL[y] with x=0 . . . nTbH−1 are derived as follows:
If all availLeft[y] with y=0 . . . nTbH−1 are equal to TRUE, the sample at the location (xNbL yNbL) is assigned to refL[y] with y=0 . . . nTbH−1.
Otherwise, if availLeft[0] is equal to FALSE, all refL[y] with y=0 . . . nTbH−1 are set equal to 1<<(BitDepth$_Y$−1).
Otherwise, reference samples refL[y] with y=0 . . . nTbH−1 are derived by the following ordered steps:
1. The variable lastL is set equal to the position y of the first element in the sequence availLeft[y] with y=1 . . . nTbH−1 that is equal to FALSE.
2. For every y=0 . . . lastL−1, the sample at the location (xNbL yNbL) is assigned to refL[y].
3. For every y=lastL . . . nTbH−1, refL[y] is set equal to refL[lastL−1].

Specification of the Boundary Reduction Process
Inputs to this process are:
a variable nTbX specifying the transform block size,
reference samples refX[x] with x=0 . . . nTbX−1,
a variable boundarySize specifying the downsampled boundary size,
a flag needUpsBdryX specifying whether intermediate boundary samples are required for upsampling,
a variable upsBdrySize specifying the boundary size for upsampling.

Outputs of this process are the reduced boundary samples redX[x] with x=0 . . . boundarySize−1 and upsampling boundary samples upsBdryX[x] with x=0 . . . upsBdrySize−1.

The upsampling boundary samples upsBdryX[x] with x=0 . . . upsBdrySize−1 are derived as follows:
If needUpsBdryX is equal to TRUE and upsBdrySize is less than nTbX, the following applies:

uDwn=nTbX/upsBdrySize (8-X30)

upsBdryX[x]=($\Sigma_{i=0}^{uDwn-1}$refX[x*uDwn+i]+(1<<(Log 2(uDwn)−1)))>>Log 2(uDwn) (8-X31)

Otherwise (upsBdrySize is equal to nTbX), upsBdryX[x] is set equal to refX[x].

The reduced boundary samples redX[x] with x=0 . . . boundarySize−1 are derived as follows:
If boundarySize is less than upsBdrySize, the following applies:

bDwn=upsBdrySize/boundarySize (8-X32)

redX[x]=($\Sigma_{i=0}^{bDwn-1}$upsBdryX[x*bDwn+i]+(1<<(Log 2(bDwn)−1)))>>Log 2(bDwn) (8-X33)

Otherwise (boundarySize is equal to upsBdrySize), redX[x] is set equal to upsBdryX[x].

8.4.4.2.X4 Specification of the Prediction Upsampling Process
Inputs to this process are:
a variable predW specifying the input block width,
a variable predH specifying the input block height,
affine linear weighted samples predLwip[x][y], with x=0 . . . predW−1, y=0 . . . predH−1,
a variable nTbW specifying the transform block width,
a variable nTbH specifying the transform block height,
a variable upsBdryW specifying the upsampling boundary width,
a variable upsBdryH specifying the upsampling boundary height,
top upsampling boundary samples upsBdryT[x] with x=0 . . . upsBdryW−1,
left upsampling boundary samples upsBdryL[x] with x=0 . . . upsBdryH−1.

Outputs of this process are the predicted samples predSamples[x][y], with x=0 . . . nTbW−1, y=0 . . . nTbH−1.
The sparse predicted samples predSamples[m][n] are derived from predLwip[x][y], with x=0 . . . predW−1, y=0 . . . predH−1 as follows:

upHor=nTbW/predW (8-X34)

upVer=nTbH/predH (8-X35)

predSamples[(x+1)*upHor−1][(y+1)*upVer−1]=predLwip[x][y] (8-X36)

The top boundary samples upsBdryT[x] with x=0 . . . upsBdryW−1 are assigned to predSamples[m][−1] as follows:

predSamples[(x+1)*(nTbW/upsBdryW)−1][−1]=upsBdryT[x] (8-X37)

The left boundary samples upsBdryL[y] with y=0 . . . upsBdryH−1 are assigned to predSamples[−1][n] as follows:

predSamples[−1][(y+1)*(nTbH/upsBdryH)−1]=upsBdryL[y] (8-X38)

The predicted samples predSamples[x][y], with x=0 . . . nTbW−1, y=0 . . . nTbH−1 are derived as follows:
If nTbH is greater than nTbW, the following ordered steps apply:
1. When upHor is greater than 1, horizontal upsampling for all sparse positions (xHor, yHor)=(m*upHor−1, n*upVer−1) with m=0 . . . predW−1, n=1 . . . predH is applied with dX=1 . . . upHor−1 as follows:

predSamples[xHor+dX][yHor]=((upHor−dX)*predSamples[xHor][yHor]+dX*predSamples[xHor+upHor][yHor])/upHor (8-X39)

2. Vertical upsampling for all sparse positions (xVer, yVer)=(m, n*upVer−1) with m=0 . . . nTbW−1, n=0 . . . predH−1 is applied with dY=1 . . . upVer−1 as follows:

predSamples[xVer][yVer+dY]=((upVer−dY)*predSamples[xVer][yVer]+dY*predSamples[xVer][yVer+upVer])/upVer (8-X40)

Otherwise, the following ordered steps apply:
1. When upVer is greater than 1, vertical upsampling for all sparse positions (xVer, yVer)=(m*upHor−1, n*upVer−1) with m=1 . . . predW, n=0 . . . predH−1 is applied with dY=1 . . . upVer−1 as specified in (8-X40).
2. Horizontal upsampling for all sparse positions (xHor, yHor)=(m*upHor−1, n) with m=0 . . . predW−1, n=0 . . . nTbH−1 is applied with dX=1 . . . upHor−1 as specified in (8-X39).

<end>

TABLE 9-9

Syntax elements and associated binarizations

| Syntax structure | Syntax element | Binarization Process | Input parameters |
|---|---|---|---|
| coding_unit( ) | cu_skip_flag[ ][ ] | FL | cMax = 1 |
| | pred_mode_ibc_flag | FL | cMax = 1 |
| | pred_mode_flag | FL | cMax = 1 |
| | <begin>intra_lwip_flag[ ][ ] | FL | cMax = 1 |
| | intra_lwip_mpm_flag[ ][ ] | FL | cMax = 1 |
| | intra_lwip_mpm_idx[ ][ ] | TR | cMax = 2, cRiceParam = 0 |
| | intra_lwip_mpm_remainder[ ][ ] | FL | cMax = (cbWidth = = 4 && cbHeight = = 4) ? 31 : ((cbWidth < = 8 && cbHeight < = 8) ? 15 : 7) |
| ... | | | |

TABLE 9-15

Assignment of ctxInc to syntax elements with context coded bins

| | binIdx | | | | | |
|---|---|---|---|---|---|---|
| Syntax element | 0 | 1 | 2 | 3 | 4 | >= 5 |
| ... | | | | | | |
| | terminate | na | na | na | na | na |
| intra_lwip_flag[ ][ ] | (Abs( Log2(cbWidth) − Log2(cbHeight) ) > 1) ? 3 : ( 0,1,2 (clause 9.5.4.2.2) ) | na | na | na | na | na |
| intra_lwip_mpm_flag[ ][ ] | 0 | na | na | na | na | na |
| intra_lwip_mpm_idx[ ][ ] | bypass | bypass | na | na | na | na |
| intra_lwip_mpm_remainder[ ][ ] | bypass | bypass | bypass | bypass | bypass | na |

TABLE 9-16

Specification of ctxInc using left and above syntax elements

| Syntax element | condL | condA | ctxSetIdx |
|---|---|---|---|
| ... | | | |
| intra_lwip_flag [x0][y0] | intra_lwip_flag [xNbL][yNbL] | intra_lwip_flag [xNbA][yNba] | 0 |
| ... | | | |

<end>
Summary of ALWIP

For predicting the samples of a rectangular block of width W and height H, affine linear weighted intra prediction (ALWIP) takes one line of H reconstructed neighboring boundary samples left of the block and one line of W reconstructed neighboring boundary samples above the block as input. If the reconstructed samples are unavailable, they are generated as it is done in the conventional intra prediction. ALWIP is only applied to luma intra block. For chroma intra block, the conventional intra coding modes are applied.

The generation of the prediction signal is based on the following three steps:
1. Out of the boundary samples, four samples in the case of W=H=4 and eight samples in all other cases are extracted by averaging.
2. A matrix vector multiplication, followed by addition of an offset, is carried out with the averaged samples as an input. The result is a reduced prediction signal on a subsampled set of samples in the original block.
3. The prediction signal at the remaining positions is generated from the prediction signal on the subsampled set by linear interpolation which is a single step linear interpolation in each direction.

If an ALWIP mode is to be applied, the index predmode of the ALWIP mode is signaled using a MPM-list with 3 MPMS. Here, the derivation of the MPMs is performed using the intra-modes of the above and the left PU as follows. There are three fixed tables map_angular_to_alwip$_{idx}$, idx$\in\{0,1,2\}$ that assign to each conventional intra prediction mode predmode$_{Angular}$ an ALWIP mode $$\text{predmode}_{ALWIP}=\text{map\_angular\_to\_alwip}_{idx}[\text{predmode}_{Angular}].$$

For each PU of width W and height H one defines an index $$\text{idx}(PU)=\text{idx}(W,H)\in\{0,1,2\}$$

that indicates from which of the three sets the ALWIP-parameters are to be taken.

If the above Prediction Unit PU$_{above}$ is available, belongs to the same CTU as the current PU and is in intra mode, if idx(PU)=idx(PU$_{above}$) and if ALWIP is applied on PU$_{above}$ with ALWIP-mode predmode$_{ALWIP}^{above}$, one puts $$\text{mode}_{ALWIP}^{above}=\text{predmode}_{ALWIP}^{above}.$$

If the above PU is available, belongs to the same CTU as the current PU and is in intra mode and if a conventional intra prediction mode predmode$_{Angular}^{above}$, is applied on the above PU, one puts $$\text{mode}_{ALWIP}^{above}=\text{map\_angular\_to\_alwip}_{idx(PU_{above})}[\text{predmode}_{Angular}^{above}].$$

In all other cases, one puts $$\text{mode}_{ALWIP}^{above}=-1$$

which means that this mode is unavailable. In the same way but without the restriction that the left PU needs to belong to the same CTU as the current PU, one derives a mode mode$_{ALWIP}^{left}$.

Finally, three fixed default lists list$_{idx}$, idx$\in\{0,1,2\}$ are provided, each of which contains three distinct ALWIP modes. Out of the default list list$_{idx(PU)}$ and the modes mode$_{ALWIP}^{above}$ and mode$_{ALWIP}^{left}$, one constructs three distinct MPMs by substituting −1 by default values as well as eliminating repetitions.

For the luma MPM-list derivation, whenever a neighboring luma block is encountered which uses an ALWIP-mode predmode$_{ALWIP}$, this block is treated as if it was using the conventional intra-prediction mode predmode$_{Angular}$.

predmode$_{Angular}$=map_alwip_to_angular$_{idx(PU)}$[predmode$_{ALWIP}$]

3 Transform in VVC

3.1 Multiple Transform Selection (MTS)

In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII.

3.2 Reduced Secondary Transform (RST) proposed in JVET-N0193

Reduced secondary transform (RST) applies 16×16 and 16×64 non-separable transform for 4×4 and 8×8 blocks, respectively. Primary forward and inverse transforms are still performed the same way as two 1-D horizontal/vertical transform passes. Secondary forward and inverse transforms are a separate process step from that of primary transforms. For encoder, primary forward transform is performed first, then followed by secondary forward transform and quantization, and CABAC bit encoding. For decoder, CABAC bit decoding and inverse quantization, then Secondary inverse transform is performed first, then followed by primary inverse transform. RST applies only to intra coded TUs in both intra slice and inter slices.

3.3 A Unified MPM List for Intra Mode Coding in JVET-N0185

A unified 6-MPM list is proposed for intra blocks irrespective of whether Multiple Reference Line (MRL) and Intra sub-partition (ISP) coding tools are applied or not. The MPM list is constructed based on intra modes of the left and above neighboring block as in VTM4.0. Suppose the mode of the left is denoted as Left and the mode of the above block is denoted as Above, the unified MPM list is constructed as follows:

When a neighboring block is not available, its intra mode is set to Planar by default.
If both modes Left and Above are non-angular modes:
  a. MPM list→{Planar, DC, V, H, V−4, V+4}
If one of modes Left and Above is angular mode, and the other is non-angular:
  a. Set a mode Max as the larger mode in Left and Above
  b. MPM list→{Planar, Max, DC, Max−1, Max+1, Max−2}
If Left and Above are both angular and they are different:
  a. Set a mode Max as the larger mode in Left and Above
  b. if the difference of mode Left and Above is in the range of 2 to 62, inclusive
    i. MPM list→{Planar, Left, Above, DC, Max−1, Max+1}
  c. Otherwise
    i. MPM list→{Planar, Left, Above, DC, Max−2, Max+2}
If Left and Above are both angular and they are the same:
  a. MPM list→{Planar, Left, Left −1, Left+1, DC, Left−2}

Besides, the first bin of the MPM index codeword is CABAC context coded. In total three contexts are used, corresponding to whether the current intra block is MRL enabled, ISP enabled, or a normal intra block.

The left neighboring block and above neighboring block used in the unified MPM list construction is A2 and B2 as shown in FIG. 10.

One MPM flag is firstly coded. If the block is coded with one of mode in the MPM list, an MPM index is further coded. Otherwise, an index to the remaining modes (excluding MPMs) is coded.

4 Examples of Drawbacks in Existing Implementations

The design of ALWIP in JVET-N0217 has the following problems:

1) At the March 2019 JVET meeting, a unified 6-MPM list generation was adopted for MRL mode, ISP mode, and normal intra mode. But the affine linear weighted prediction mode uses a different 3-MPM list construction which makes the MPM list construction complicated. A complex MPM list construction might compromise the throughput of the decoder, in particular for small blocks such as 4×4 samples.

2) ALWIP is only applied to luma component of the block. For the chroma component of an ALWP coded block, a chroma mode index is coded and sent to decoder, which could result in unnecessary signaling.

3) The interactions of ALWIP with other coding tools should be considered.

4) When calculating upsBdryX in upsBdryX[x]= ($\Sigma_{i=0}^{uDwn-1}$refX[x*uDwn+i]+(1<<(Log 2 (uDwn)−1)))>>Log 2(uDwn) (8-X31), it is possible that Log 2(uDwn)−1 is equal to −1, while left shifted with −1 is undefined.

5) When upsampling the prediction samples, no rounding is applied.

6) In the deblocking process, ALWIP coded blocks are treated as normal intra-blocks.

5 Exemplary Methods for Matrix-Based Intra Coding

Embodiments of the presently disclosed technology overcome drawbacks of existing implementations, thereby providing video coding with higher coding efficiencies but lower computational complexity. Matrix-based intra prediction methods for video coding, and as described in the present document, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

In the following discussion, an intra-prediction mode refers to an angular intra prediction mode (including DC, planar, CCLM and other possible intra prediction modes); while an intra mode refers to normal intra mode, or MRL, or ISP or ALWIP.

In the following discussion, "Other intra modes" may refer to one or multiple intra modes except ALWIP, such as normal intra mode, or MRL, or ISP.

In the following discussion, SatShift(x, n) is defined as $$SatShift(x, n) = \begin{cases} (x + offset0) >> n & \text{if } x \geq 0 \\ -((-x + offset1) >> n) & \text{if } x < 0 \end{cases}$$

Shift(x, n) is defined as Shift(x, n)=(x+offset0)>>n.

In one example, offset0 and/or offset1 are set to (1<<n)>>1 or (1<<(n−1)). In another example, offset0 and/or offset1 are set to 0.

In another example, offset0=offset1=((1<<n)>>1)−1 or ((1<<(n−1)))−1.

Clip3(min, max, x) is defined as $$\text{Clip3(Min, Max, }x) = \begin{cases} \text{Min} & \text{if } x < \text{Min} \\ \text{Max} & \text{if } x > \text{Max} \\ x & \text{Otherwise} \end{cases}$$

MPM List Construction for ALWIP

1. It is proposed that the whole or partial of the MPM list for ALWIP may be constructed according to the whole or partial procedure to construct the MPM list for non-ALWIP intra mode (such as normal intra mode, MRL, or ISP).
   a. In one example, the size of the MPM list for ALWIP may be the same as that of the MPM list for non-ALWIP intra mode.
      i. For example, the size of MPM list is 6 for both ALWIP and non-ALWIP intra modes.
   b. In one example, the MPM list for ALWIP may be derived from the MPM list for non-ALWIP intra mode.
      i. In one example, the MPM list for non-ALWIP intra mode may be firstly constructed. Afterwards, partial or all of them may be converted to the MPMs which may be further added to the MPM list for ALWIP coded blocks.
         1) Alternatively, furthermore, when adding a converted MPM to the MPM list for ALWIP coded blocks, pruning may be applied.
         2) Default modes may be added to the MPM list for ALWIP coded blocks.
            a. In one example, default modes may be added before those converted from the MPM list of non-ALWIP intra mode.
            b. Alternatively, default modes may be added after those converted from the MPM list of non-ALWIP intra mode.
            c. Alternatively, default modes may be added in an interleaved way with those converted from the MPM list of non-ALWIP intra mode.
            d. In one example, the default modes may be fixed to be the same for all kinds of blocks.
            e. Alternatively, the default modes may be determined according to coded information, such as availability of neighboring blocks, mode information of neighboring blocks, block dimension.
      ii. In one example, one intra-prediction mode in the MPM list for non-ALWIP intra mode may be converted to its corresponding ALWIP intra-prediction mode, when it is put into the MPM list for ALWIP.
         1) Alternatively, all the intra-prediction modes in the MPM list for non-ALWIP intra modes may be converted to corresponding ALWIP intra-prediction modes before being used to construct the MPM list for ALWIP.
         2) Alternatively, all the candidate intra-prediction modes (may include the intra-prediction modes from neighboring blocks and default intra-prediction modes such as Planar and DC) may be converted to corresponding ALWIP intra-prediction modes before being used to construct the MPM list for non-ALWIP intra modes, if the MPM list for non-ALWIP intra modes may be further used to derive the MPM list for ALWIP.
      3) In one example, two converted ALWIP intra-prediction modes may be compared.
         a. In one example, if they are the same, only one of them may be put into the MPM list for ALWIP.
         b. In one example, if they are the same, only one of them may be put into the MPM list for non-ALWIP intra modes.
      iii. In one example, K out of S intra-prediction modes in the MPM list for non-ALWIP intra modes may be picked as the MPM list for ALWIP mode. E.g., K is equal to 3 and S is equal to 6.
         1) In one example, the first K intra-prediction modes in the MPM list for non-ALWIP intra modes may be picked as the MPM list for ALWIP mode.
2. It is proposed that the one or multiple neighboring blocks used to derive the MPM list for ALWIP may also be used to used derive the MPM list for non-ALWIP intra modes (such as normal intra mode, MRL, or ISP).
   a. In one example, the neighboring block left to the current block used to derive the MPM list for ALWIP should be the same as that used to derive the MPM list for non-ALWIP intra modes.
      i. Suppose the top-left corner of the current block is (xCb, yCb), the width and height of the current block are W and H, then in one example, the left neighboring block used to derive the MPM list for both ALWIP and non-ALWIP intra modes may cover the position (xCb−1, yCb). In an alternative example, the left neighboring block used to derive the MPM list for both ALWIP and non-ALWIP intra modes may cover the position (xCb−1, yCb+H−1).
      ii. For example, the left neighboring block and above neighboring block used in the unified MPM list construction is A2 and B2 as shown in FIG. 10.
   b. In one example, the neighboring block above to the current block used to derive the MPM list for ALWIP should be the same as that used to derive the MPM list for non-ALWIP intra modes.
      i. Suppose the top-left corner of the current block is (xCb, yCb), the width and height of the current block are W and H, then in one example, the above neighboring block used to derive the MPM list for both ALWIP and non-ALWIP intra modes may cover the position (xCb, yCb−1). In an alternative example, the above neighboring block used to derive the MPM list for both ALWIP and non-ALWIP intra modes may cover the position (xCb+W−1, yCb−1).
      ii. For example, the left neighboring block and above neighboring block used in the unified MPM list construction is A1 and B1 as shown in FIG. 10.
3. It is proposed that the MPM list for ALWIP may be constructed in different ways according to the width and/or height of the current block.
   a. In one example, different neighboring blocks may be accessed for different block dimensions.
4. It is proposed that the MPM list for ALWIP and the MPM list for non-ALWIP intra modes may be constructed with the same procedure but with different parameters.
   a. In one example, K out of S intra-prediction modes in the MPM list construction procedure of non-ALWIP intra modes may be derived for the MPM list used in ALWIP mode. E.g., K is equal to 3 and S is equal to 6.
  i. In one example, the first K intra-prediction modes in the MPM list construction procedure may be derived for the MPM list used in ALWIP mode.
 b. In one example, the first mode in the MPM list may be different.
  i. For example, the first mode in the MPM list for non-ALWIP intra modes may be Planar, but it may be a Mode X0 in the MPM list for ALWIP.
   1) In one example, X0 may be the ALWIP intra-prediction mode converted from Planar.
 c. In one example, stuffing modes in the MPM list may be different.
  i. For example, the first three stuffing modes in the MPM list for non-ALWIP intra modes may be DC, Vertical and Horizontal, but they may be Mode X1, X2, X3 in the MPM list for ALWIP.
   1) In one example, X1, X2, X3 may be different for different sizeId.
  ii. In one example, the number of stuffing mode may be different.
 d. In one example, neighboring modes in the MPM list may be different.
  i. For example, the normal intra-prediction modes of neighboring blocks are used to construct the MPM list for non-ALWIP intra modes. And they are converted to ALWIP intra-prediction modes to construct the MPM list for ALWIP mode.
 e. In one example, the shifted modes in the MPM list may be different.
  i. For example, X+K0 where X is a normal intra-prediction mode and K0 is an integer may be put into the MPM list for non-ALWIP intra modes. And Y+K1 where Y is an ALWIP intra-prediction mode and K1 is an integer may be put into the MPM list for ALWIP, where K0 may be different from K1.
   1) In one example, K1 may depend on the width and height.
5. It is proposed that a neighboring block is treated as unavailable if it is coded with ALWIP when constructing the MPM list for the current block with non-ALWIP intra modes.
 a. Alternatively, a neighboring block is treated as being coded with a predefined intra-prediction mode (such as Planar) if it is coded with ALWIP when constructing the MPM list for the current block with non-ALWIP intra modes.
6. It is proposed that a neighboring block is treated as unavailable if it is coded with non-ALWIP intra modes when constructing the MPM list for the current block with ALWIP mode.
 a. Alternatively, a neighboring block is treated as being coded with a predefined ALWIP intra-prediction mode X if it is coded with non-ALWIP intra modes when constructing the MPM list for the current block with ALWIP mode.
  i. In one example, X may depend on the block dimensions, such as width and/or height.
7. It is proposed to remove the storage of ALWIP flag from line buffer.
 a. In one example, when the $2^{nd}$ block to be accessed is located in a different LCU/CTU row/region compared to the current block, the conditional check of whether the $2^{nd}$ block is coded with ALWIP is skipped.
 b. In one example, when the $2^{nd}$ block to be accessed is located in a different LCU/CTU row/region compared to the current block, the $2^{nd}$ block is treated in the same way as non-ALWIP mode, such as treated as normal intra coded block.
8. When encoding the ALWIP flag, no more than K (K>=0) contexts may be used.
 a. In one example, K=1.
9. It is proposed to store the converted intra prediction mode of ALWIP coded blocks instead of directly storing the mode index associated with the ALWIP mode.
 a. In one example, the decoded mode index associated with one ALWIP coded block is mapped to the normal intra mode, such as according to map_alwip_to_angular as described in Section 2.5.7.
 b. Alternatively, furthermore, the storage of ALWIP flag is totally removed.
 c. Alternatively, furthermore, the storage of ALWIP mode is totally removed.
 d. Alternatively, furthermore, condition check of whether one neighboring/current block is coded with ALWIP flag may be skipped.
 e. Alternatively, furthermore, the conversion of modes assigned for ALWIP coded blocks and normal intra predictions associated with one accessed block may be skipped.

ALWIP on Different Color Components

10. It is proposed that an inferred chroma intra mode (e.g., DM mode) might be always applied if the corresponding luma block is coded with ALWIP mode.
 a. In one example, chroma intra mode is inferred to be DM mode without signaling if the corresponding luma block is coded with ALWIP mode.
 b. In one example, the corresponding luma block may be the one covering the corresponding sample of a chroma sample located at a given position (e.g., top-left of current chroma block, center of current chroma block).
 c. In one example, the DM mode may be derived according to the intra prediction mode of the corresponding luma block, such as via mapping the (ALWIP) mode to one of the normal intra mode.
11. When the corresponding luma block of the chroma blocks is coded with ALWIP mode, several DM modes may be derived.
12. It is proposed that a special mode is assigned to the chroma blocks if one corresponding luma block is coded with ALWIP mode.
 a. In one example, the special mode is defined to be a given normal intra prediction mode regardless the intra prediction mode associated with the ALWIP coded blocks.
 b. In one example, different ways of intra prediction may be assigned to this special mode.
13. It is proposed that ALWIP may also be applied to chroma components.
 a. In one example, the matrix and/or bias vector may be different for different color components.
 b. In one example, the matrix and/or bias vector may be predefined jointly for Cb and Cr.
  i. In one example, Cb and Cr component may be concatenated.
  ii. In one example, Cb and Cr component may be interleaved.

c. In one example, the chroma component may share the same ALWIP intra-prediction mode as the corresponding luma block.
   i. In one example, the same ALWIP intra-prediction mode is applied on the chroma component if the corresponding luma block applies the ALWIP mode and the chroma block is coded with DM mode.
   ii. In one example, the same ALWIP intra-prediction mode is applied on the chroma component and the linear interpolation thereafter can be skipped.
   iii. In one example, the same ALWIP intra-prediction mode is applied on the chroma component with a subsampled matrix and/or bias vector.
d. In one example, the number of ALWIP intra-prediction modes for different component may be different.
   i. For example, the number of ALWIP intra-prediction modes for chroma components may be less than that for luma component for the same block width and height.

Applicability of ALWIP

14. It is proposed that whether ALWIP can be applied may be signaled.
   a. For example, it may be signaled at sequence level (e.g. in SPS), at picture level (e.g. in PPS or picture header), at slice level (e.g. in slice header), at tile group level (e.g. in tile group header), at tile level, at CTU row level, or at CTU level.
   b. For example, intra_lwip_flag may not be signaled and inferred to be 0 if ALWIP cannot be applied.
15. It is proposed that whether ALWIP can be applied may depend on the block width (W) and/or height (H).
   c. For example, ALWIP may not be applied if W>=T1 (or W>T1) and H>=T2 (or H>T2). E.g. T1=T2=32;
      i. For example, ALWIP may not be applied if W<=T1 (or W<T1) and H<=T2 (or H<T2). E.g. T1=T2=32;
   d. For example, ALWIP may not be applied if W>=T1 (or W>T1) or H>=T2 (or H>T2). E.g. T1=T2=32;
      i. For example, ALWIP may not be applied if W<=T1 (or W<T1) or H<=T2 (or H<T2). E.g. T1=T2=32, or T1=T2=8;
   e. For example, ALWIP may not be applied if W+H>=T (or W*H>T). E.g. T=256;
      i. For example, ALWIP may not be applied if W+H<=T (or W+H<T). E.g. T=256;
   f. For example, ALWIP may not be applied if W*H>=T (or W*H>T). E.g. T=256;
      i. For example, ALWIP may not be applied if W*H<=T (or W*H<T). E.g. T=256;
   g. For example, intra_lwip_flag may not be signaled and inferred to be 0 if ALWIP cannot be applied.

Calculation Problems in ALWIP

16. It is proposed that any shift operation involved in ALWIP can only left shift or right shift a number by S, where S must be larger or equal to 0.
   a. In one example, the right shift operation may be different when S is equal to 0 or larger than 0.
      i. In one example, upsBdryX[x] should be calculated as upsBdryX[x]=($\Sigma_{i=0}^{uDwn-1}$refX[x*uDwn+i]+(1<<(Log 2(uDwn)−1)))>>Log 2(uDwn) when uDwn>1, and upsBdryX[x]=$\Sigma_{i=0}^{uDwn-1}$ refX[x*uDwn+i] when uDwn is equal to 1.
      b. In one example, upsBdryX[x] should be calculated as upsBdryX[x]=($\Sigma_{i=0}^{uDwn-1}$refX[x*uDwn+i]+(1<<Log 2(uDwn)>>1))>>Log 2(uDwn)

17. It is proposed that the results should be rounded toward-zero or away-from-zero in the up-sampling process of ALWIP.
   a. In one example, predSamples[xHor+dX][yHor]=((upHor−dX)*predSamples[xHor][yHor]+dX*predSamples[xHor+upHor][yHor]+offsetHor)/upHor (8-X39)

and predSamples[xVer][yVer+dY]=((upVer−dY)*predSamples[xVer][yVer]+dY*predSamples[xVer][yVer+upVer]+offsetVer)/upVer (8-X40)

where offsetHor and offsetVer are integers. For example, offsetHor=upHor/2 and offsetVer=upVer/2.

Interaction with Other Coding Tools

18. It is proposed that ALWIP may be used for a CIIP-coded block.
   a. In one example, in a CUP-coded block, it may be explicitly signaled whether an ALWIP intra-prediction mode or a normal intra prediction mode such as Planar is used to generate the intra prediction signal.
   b. In one example, it may be implicitly inferred whether an ALWIP intra-prediction mode or a normal intra prediction mode such as Planar may be used to generate the intra prediction signal.
      i. In one example, ALWIP intra-prediction mode may never be used in a CUP coded block.
         1) Alternatively, normal intra prediction may never be used in a CIIP coded block.
      ii. In one example, it may be inferred from information of neighboring blocks whether an ALWIP intra-prediction mode or a normal intra prediction mode such as Planar is used to generate the intra prediction signal.
19. It is proposed that the whole or partial of the procedure used to down-sample the neighboring luma samples in the CCLM mode may be used to down-sample the neighboring samples in the ALWIP mode.
   a. Alternatively, the whole or partial of the procedure used to down-sample the neighboring luma samples in the ALWIP mode may be used to down-sample the neighboring samples in the CCLM mode.
   b. The down-sampling procedure may be invoked with different parameters/arguments when it is used in the CCLM process and ALWIP process.
   c. In one example, the down-sampling method (such as selection of neighboring luma locations, down-sampling filters) in the CCLM process may be utilized in the ALWIP process.
   d. The procedure used to down-sample the neighboring luma samples at least include the selection of down-sampled positions, the down-sampling filters, the rounding and clipping operations.
20. It is proposed that a block coded with ALWIP mode cannot apply RST or/and secondary transform or/and rotation transform or/and Non-Separable Secondary Transform (NSST).
   a. In one example, whether such constraint may be applied or not may depend on the dimension information of the block, e.g., same as conditions described in (15).
   b. Alternatively, ALWIP mode may be disallowed when RST or/and secondary transform or/and rotation transform or/and NSST is applied.

c. Alternatively, a block coded with ALWIP mode may apply RST or/and secondary transform or/and rotation transform or/and Non-Separable Secondary Transform (NSST).
   i. In one example, the selection of transform matrix may depend the ALWIP intra-prediction mode.
   ii. In one example, the selection of transform matrix may depend the normal intra-prediction mode which is converted from the ALWIP intra-prediction mode.
   iii. In one example, the selection of transform matrix may depend the classification on the normal intra-prediction mode which is converted from the ALWIP intra-prediction mode.
21. It is proposed that a block coded with ALWIP mode cannot apply Block-based DPCM (BDPCM) or Residue RDPCM.
   a. Alternatively, ALWIP mode may be disallowed when BDPCM or RDPCM is applied.
22. It is proposed that a block coded with ALWIP mode may only use DCT-II as the transform.
   a. In one example, the signalling of transform matrix indices is always skipped.
   b. Alternatively, it is proposed that the transform used for a block coded with ALWIP mode may be implicitly derived instead of explicitly signaled. For example, the transform may be selected following the way proposed in JVET-M0303.
   c. Alternatively, it is proposed that a block coded with ALWIP mode may only use transform skip.
      i. Alternatively, furthermore, when ALWIP is used, the signalling of indication of usage of transform skip is skipped.
   d. In one example, ALWIP mode information (such as enabled/disabled, prediction mode index) may be conditionally signalled after indications of transform matrix.
      i. In one example, for a given transform matrix (such as transform skip or DCT-II), the indications of ALWIP mode information may be signalled.
      ii. Alternatively, furthermore, the indications of ALWIP mode information may be skipped for some pre-defined transform matrices.
23. It is proposed that a block coded with ALWIP mode is regarded to be coded with a normal intra-prediction converted from the ALWIP intra-prediction mode when the selected transform is mode-dependent.
24. ALWIP mode may not use transform skip.
   a. For example, there is no need to further signal the indication of usage of transform skip in this case.
   b. Alternatively, ALWIP mode may be disallowed when transform skip is applied.
      i. For example, there is no need to signal ALWIP mode information when transform skip is applied in this case.
25. In the filtering process, such as deblocking filter, sample adaptive offset (SAO), adaptive loop filter (ALF), how to select the filters and/or whether to filter samples may be determined by the usage of ALWIP.
26. Unfiltered neighboring samples may be used in ALWIP mode.
   a. Alternatively, filtered neighboring samples may be used in ALWIP mode.
   b. In one example, filtered neighboring samples may be used for down sampling and unfiltered neighboring samples may be used for up sampling.
   c. In one example, unfiltered neighboring samples may be used for down sampling and filtered neighboring samples may be used for up sampling.
   d. In one example, filtered left neighboring samples may be used in up sampling and unfiltered above neighboring samples may be used in up sampling.
   e. In one example, unfiltered left neighboring samples may be used in up sampling and filtered above neighboring samples may be used in up sampling.
   f. In one example, whether filter or unfiltered neighboring samples is used may depend on the ALWIP mode.
      i. In one example, ALWIP mode may be converted to traditional intra prediction mode, and whether filtered or unfiltered neighboring samples is used may depend on the converted traditional intra prediction mode. For example, such decision is same as traditional intra prediction modes.
      ii. Alternatively, whether filter or unfiltered neighboring samples is used for ALWIP mode may be signaled.
   g. In one example, the filtered samples may be generated same as traditional intra prediction modes.
27. Which matrices or/and offset vectors are used may depend on reshaping (a.k.a. LMCS, luma mapping with chroma scaling) information.
   a. In one example, different matrices or/and offset vectors may be used when reshaping is on and off.
   b. In one example, different matrices or/and offset vectors may be used for different reshaping parameters.
   c. In one example, ALWIP may be always performed in original domain.
      i. For example, neighboring sample are mapped to the original domain (if reshaping is applied) before used in ALWIP.
28. ALWIP may be disabled when reshaping is applied.
   a. Alternatively, reshaping may be disabled when ALWIP is enabled.
   b. In one example, ALWIP may be disabled for HDR (high dynamic range) content when reshaping is applied.
29. The matrices used in ALWIP may depend on sample bit-depth.
30. It is proposed that the prediction generated by ALWIP may be treated as an intermediate signal which will be processed to obtain the prediction signal to be further used.
   a. In one example, Position Dependent Intra Prediction Combination (PDPC) may be applied on the prediction generated by ALWIP to generate the prediction signal to be further used.
   b. In one example, the boundary samples prediction generated by ALWIP may be filtered with neighbouring samples to generate the prediction signal to be further used.
31. It is proposed that interpolation filters other than bilinear interpolation filter may be used in the up-sampling process of ALWIP.
   a. In one example, 4-tap interpolation filters may be used in the up-sampling process of ALWIP.
      i. For example, the 4-tap interpolation filters in VVC used to do the motion compensation for chroma components may be used in the up-sampling process of ALWIP.

ii. For example, the 4-tap interpolation filters in VVC used to do angular intra-prediction may be used in the up-sampling process of ALWIP.

iii. For example, the 8-tap interpolation filters in VVC used to do the motion compensation for luma component may be used in the up-sampling process of ALWIP.

The examples described above may be incorporated in the context of the methods described below, e.g., methods 1100 to 1400, and 2000 to 3800, which may be implemented at a video encoder and/or decoder.

Figure 11:
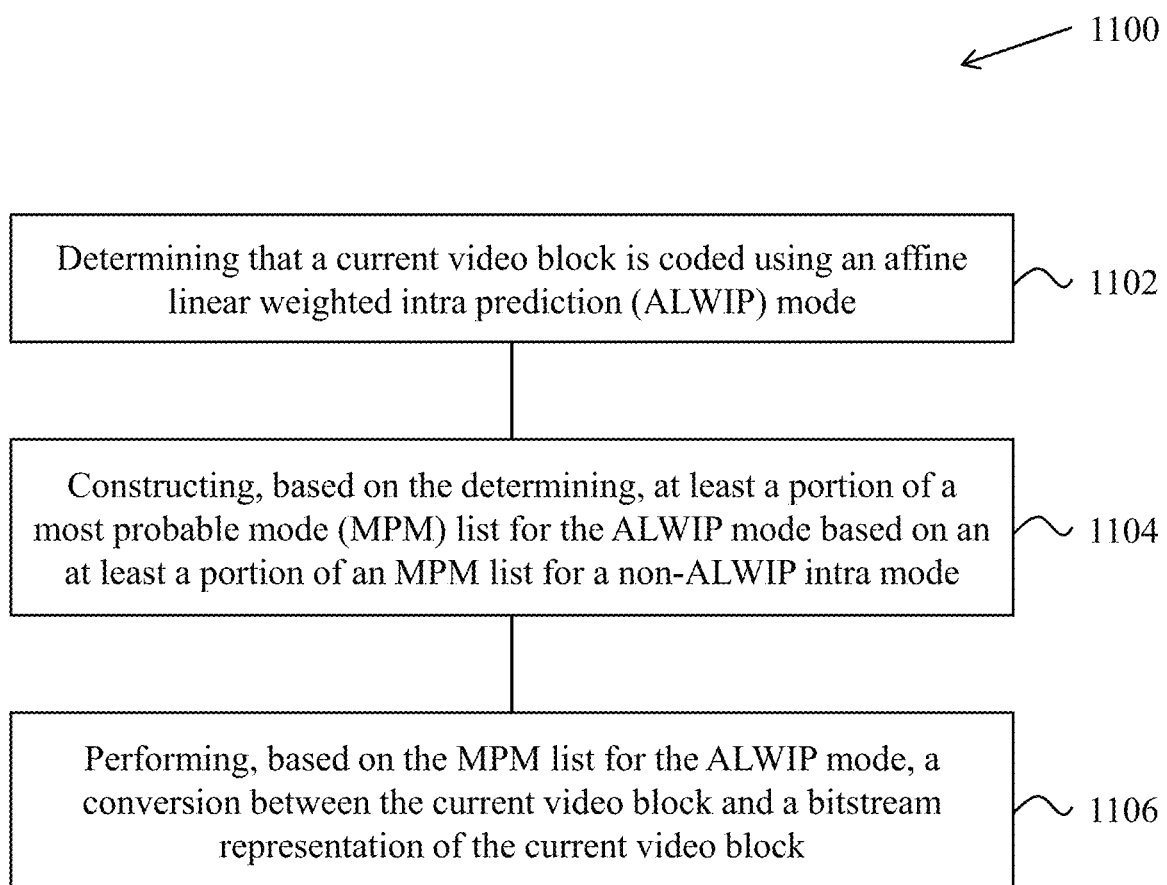
FIG. 11 shows a flowchart of an example method for matrix-based intra prediction, in accordance with the disclosed technology.

FIG. 11 shows a flowchart of an exemplary method for video processing. The method 1100 includes, at step 1102, determining that a current video block is coded using an affine linear weighted intra prediction (ALWIP) mode.

The method 1100 includes, at step 1104, constructing, based on the determining, at least a portion of a most probable mode (MPM) list for the ALWIP mode based on an at least a portion of an MPM list for a non-ALWIP intra mode.

The method 1100 includes, at step 1106, performing, based on the MPM list for the ALWIP mode, a conversion between the current video block and a bitstream representation of the current video block.

In some embodiments, a size of the MPM list of the ALWIP mode is identical to a size of the MPM list for the non-ALWIP intra mode. In an example, the size of the MPM list of the ALWIP mode is 6.

In some embodiments, the method 1100 further comprises the step of inserting default modes to the MPM list for the ALWIP mode. In an example, the default modes are inserted prior to the portion of a MPM list for the ALWIP mode that is based on the MPM list for the non-ALWIP intra mode. In another example, the default modes are inserted subsequent to the portion of a MPM list for the ALWIP mode that is based on the MPM list for the non-ALWIP intra mode. In yet another example, the default modes are inserted in an interleaved manner with the portion of a MPM list for the ALWIP mode that is based on the MPM list for the non-ALWIP intra mode.

In some embodiments, constructing the MPM list for the ALWIP mode and the MPM list for the non-ALWIP intra mode is based on one or more neighboring blocks.

In some embodiments, constructing the MPM list for the ALWIP mode and the MPM list for the non-ALWIP intra mode is based a height or a width of the current video block.

In some embodiments, constructing the MPM list for the ALWIP mode is based on a first set of parameters that is different from a second set of parameters used to construct the MPM list for the non-ALWIP intra mode.

In some embodiments, the method 1100 further includes the step of determining that a neighboring block of the current video block has been coded with the ALWIP mode, and designating, in constructing the MPM list for the non-ALWIP intra mode, the neighboring block as unavailable.

In some embodiments, the method 1100 further includes the step of determining that a neighboring block of the current video block has been coded with the non-ALWIP intra mode, and designating, in constructing the MPM list for the ALWIP mode, the neighboring block as unavailable.

In some embodiments, the non-ALWIP intra mode is based on a normal intra mode, a multiple reference line (MRL) intra prediction mode or an intra sub-partition (ISP) tool.

Figure 12:
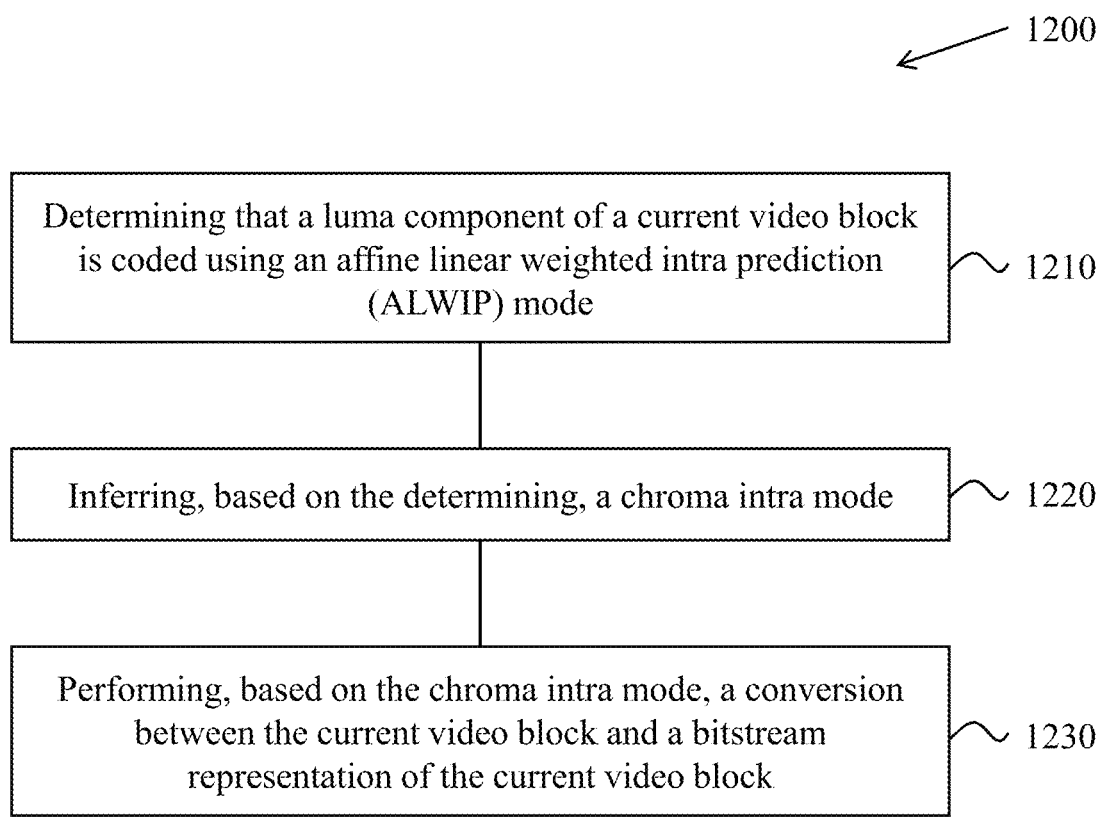
FIG. 12 shows a flowchart of another example method for matrix-based intra prediction, in accordance with the disclosed technology.

FIG. 12 shows a flowchart of an exemplary method for video processing. The method 1200 includes, at step 1210, determining that a luma component of a current video block is coded using an affine linear weighted intra prediction (ALWIP) mode.

The method 1200 includes, at step 1220, inferring, based on the determining, a chroma intra mode.

The method 1200 includes, at step 1230, performing, based on the chroma intra mode, a conversion between the current video block and a bitstream representation of the current video block.

In some embodiments, the luma component covers a predetermined chroma sample of the chroma component. In an example, the predetermined chroma sample is a top-left sample or a center sample of the chroma component.

In some embodiments, the inferred chroma intra mode is a DM mode.

In some embodiments, the inferred chroma intra mode is the ALWIP mode.

In some embodiments, the ALWIP mode is applied to one or more chroma components of the current video block.

In some embodiments, different matrix or bias vectors of the ALWIP mode are applied to different color components of the current video block. In an example, the different matrix or bias vectors are predefined jointly for Cb and Cr components. In another example, the Cb and Cr components are concatenated. In yet another example, the Cb and Cr components are interleaved.

Figure 13:
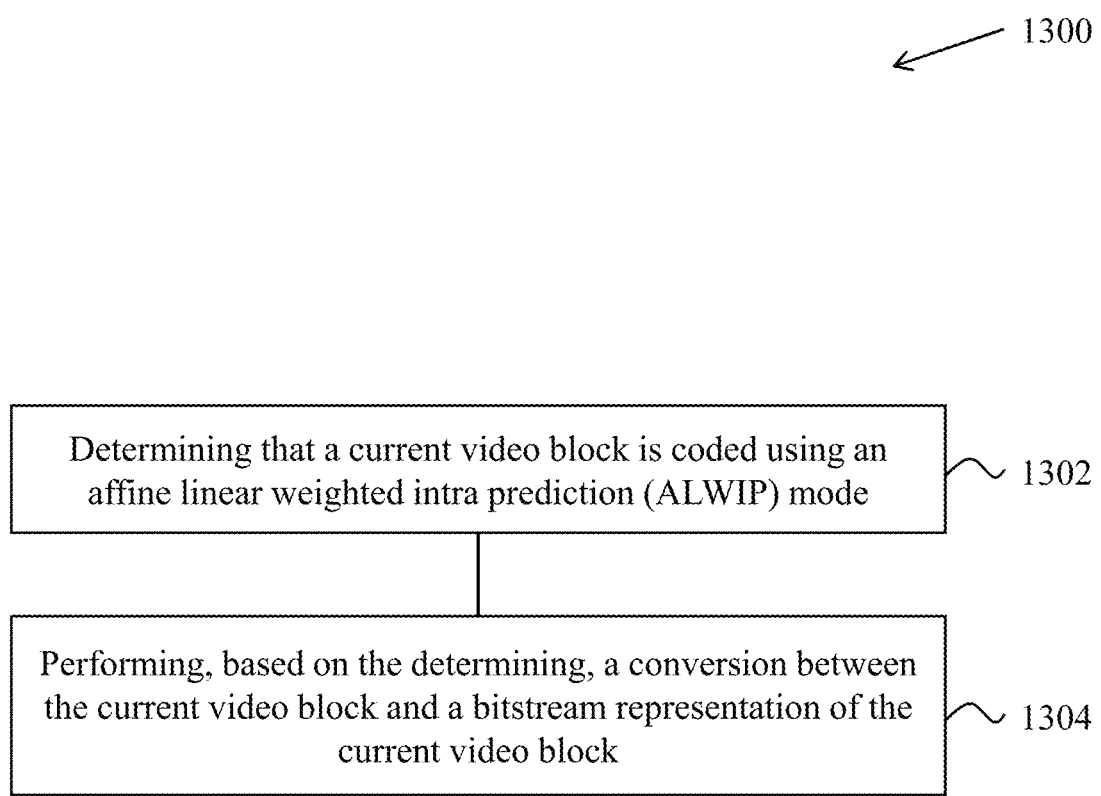
FIG. 13 shows a flowchart of yet another example method for matrix-based intra prediction, in accordance with the disclosed technology.

FIG. 13 shows a flowchart of an exemplary method for video processing. The method 1300 includes, at step 1302, determining that a current video block is coded using an affine linear weighted intra prediction (ALWIP) mode.

The method 1300 includes, at step 1304, performing, based on the determining, a conversion between the current video block and a bitstream representation of the current video block.

In some embodiments, the determining is based on signaling in a sequence parameter set (SPS), a picture parameter set (PPS), a slice header, a tile group header, a tile header, a coding tree unit (CTU) row or a CTU region.

In some embodiments, the determining is based on a height (H) or a width (W) of the current video block. In an example, W>T1 or H>T2. In another example, W≥T1 or H≥T2. In yet another example, W<T1 or H<T2. In yet another example, W≤T1 or H≤T2. In yet another example, T1=32 and T2=32.

In some embodiments, the determining is based on a height (H) or a width (W) of the current video block. In an example, W+H≤T. In another example, W+H≥T. In yet another example, W×H≤T. In yet another example, W×H≥T. In yet another example, T=256.

Figure 14:
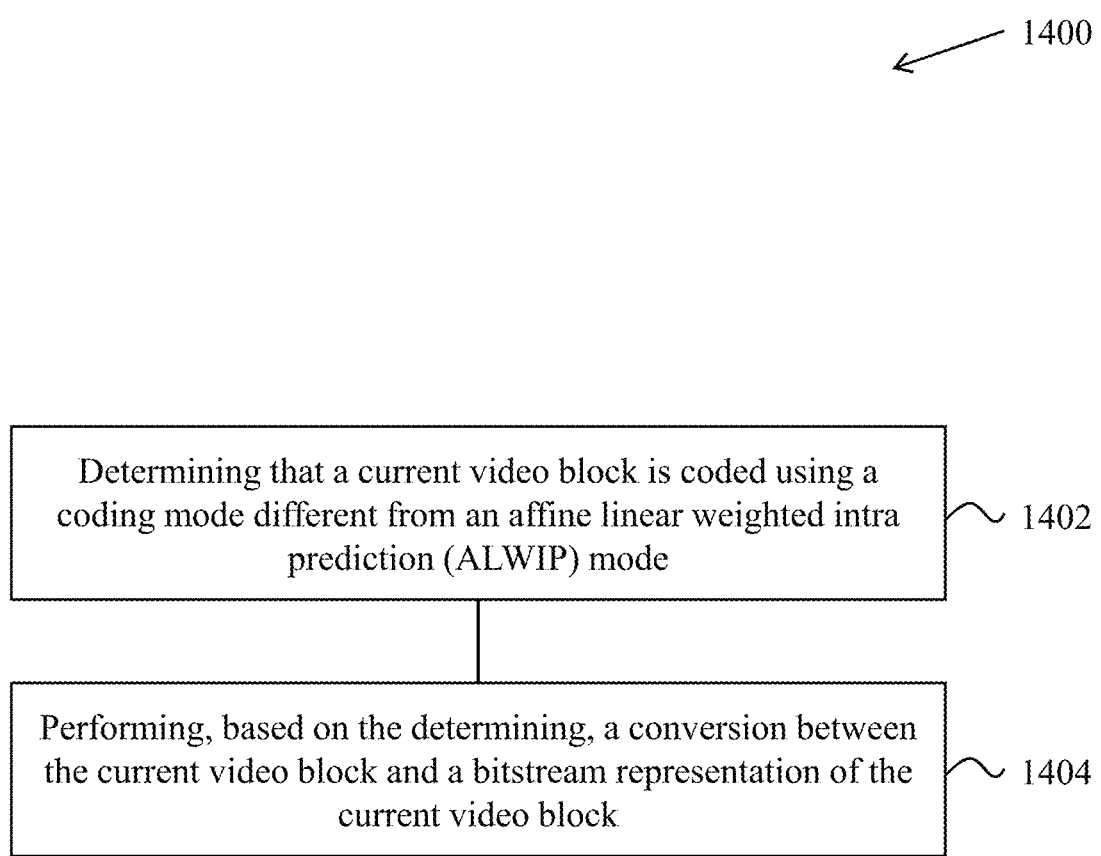
FIG. 14 shows a flowchart of yet another example method for matrix-based intra prediction, in accordance with the disclosed technology.

FIG. 14 shows a flowchart of an exemplary method for video processing. The method 1400 includes, at step 1402, determining that a current video block is coded using a coding mode different from an affine linear weighted intra prediction (ALWIP) mode.

The method 1400 includes, at step 1404, performing, based on the determining, a conversion between the current video block and a bitstream representation of the current video block.

In some embodiments, the coding mode is a combined intra and inter prediction (CIIP) mode, and method 1400 further includes the step of performing a selection between the ALWIP mode and a normal intra prediction mode. In an example, performing the selection is based on an explicit signaling in the bitstream representation of the current video block. In another example, performing the selection is based on predetermined rule. In yet another example, the predetermined rule always selects the ALWIP mode when the current video block is coded using the CIIP mode. In yet another example, the predetermined rule always selects the normal intra prediction mode when the current video block is coded using the CIIP mode.

In some embodiments, the coding mode is a cross-component linear model (CCLM) prediction mode. In an example, a downsampling procedure for the ALWIP mode is based on a downsampling procedure for the CCLM prediction mode. In another example, the downsampling procedure for the ALWIP mode is based on a first set of parameters, and where the downsampling procedure for the CCLM prediction mode is based on a second set of parameters different from the first set of parameters. In yet another example, the downsampling procedure for the ALWIP mode or the CCLM prediction mode comprises at least one of a selection of downsampled positions, a selection of downsampling filters, a rounding operation or a clipping operation.

In some embodiments, the method 1400 further includes the step of applying one or more of a Reduced Secondary Transform (RST), a secondary transform, a rotation transform or a Non-Separable Secondary Transform (NSST).

In some embodiments, the method 1400 further includes the step of applying block-based differential pulse coded modulation (DPCM) or residual DPCM.

6 Example Implementations of the Disclosed Technology

Figure 15:
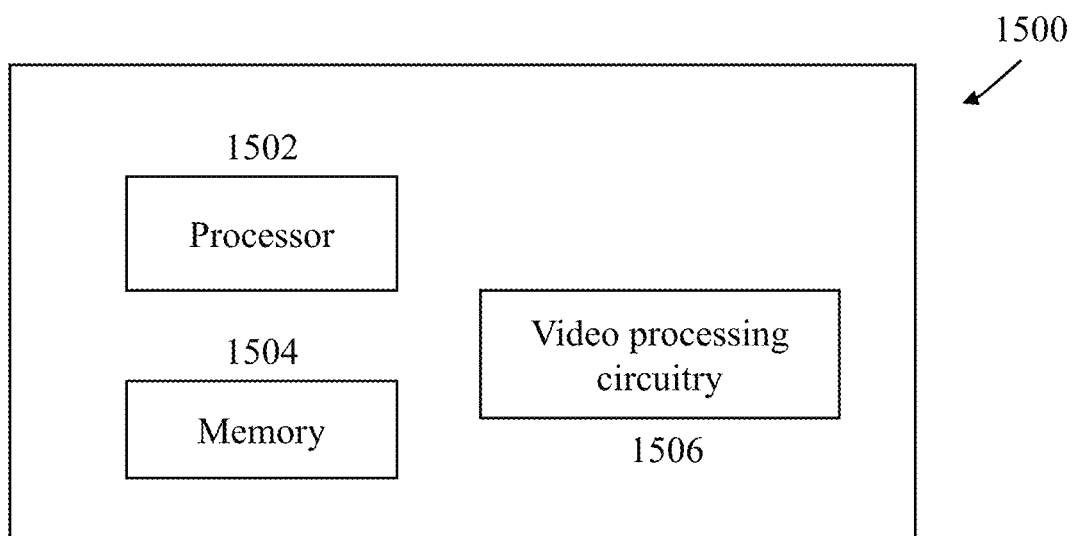
FIG. 15 is a block diagram of an example of a hardware platform for implementing a visual media decoding or a visual media encoding technique described in the present document.

FIG. 15 is a block diagram of a video processing apparatus 1500. The apparatus 1500 may be used to implement one or more of the methods described herein. The apparatus 1500 may be embodied in a smartphone, tablet, computer, Internet of Things (IoT) receiver, and so on. The apparatus 1500 may include one or more processors 1502, one or more memories 1504 and video processing hardware 1506. The processor(s) 1502 may be configured to implement one or more methods (including, but not limited to, methods 1100 to 1400, and 2000 to 3800) described in the present document. The memory (memories) 1504 may be used for storing data and code used for implementing the methods and techniques described herein. The video processing hardware 1506 may be used to implement, in hardware circuitry, some techniques described in the present document.

In some embodiments, the video coding methods may be implemented using an apparatus that is implemented on a hardware platform as described with respect to FIG. 15.

Figure 16:
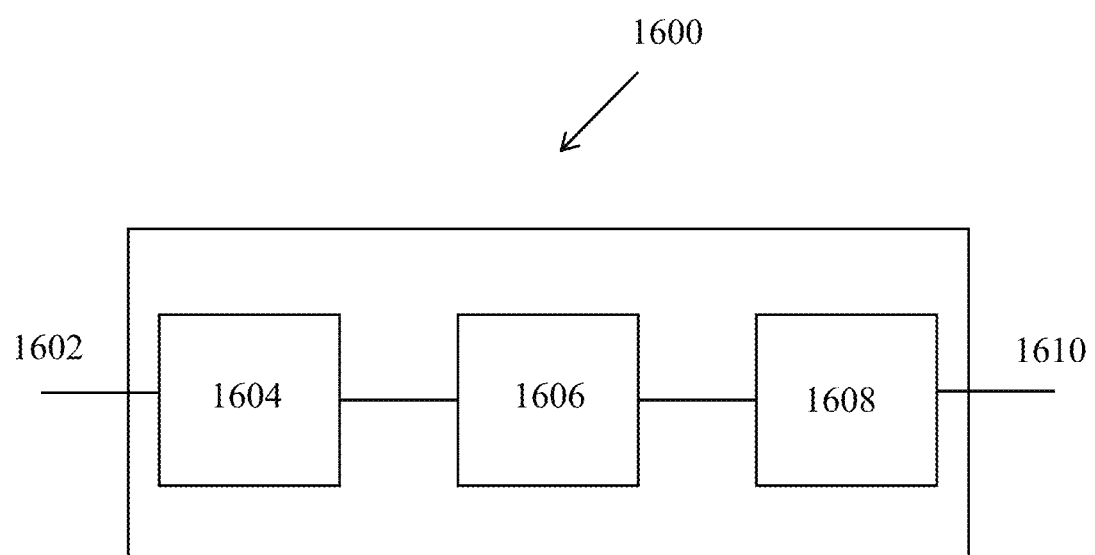
FIG. 16 is a block diagram showing an example video processing system in which various techniques disclosed herein may be implemented.

FIG. 16 is a block diagram showing an example video processing system 1600 in which various techniques disclosed herein may be implemented. Various implementations may include some or all of the components of the system 1600. The system 1600 may include input 1602 for receiving video content. The video content may be received in a raw or uncompressed format, e.g., 8 or 10 bit multi-component pixel values, or may be in a compressed or encoded format. The input 1602 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1600 may include a coding component 1604 that may implement the various coding or encoding methods described in the present document. The coding component 1604 may reduce the average bitrate of video from the input 1602 to the output of the coding component 1604 to produce a coded representation of the video. The coding techniques are therefore sometimes called video compression or video transcoding techniques. The output of the coding component 1604 may be either stored, or transmitted via a communication connected, as represented by the component 1606. The stored or communicated bitstream (or coded) representation of the video received at the input 1602 may be used by the component 1608 for generating pixel values or displayable video that is sent to a display interface 1610. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

Figure 17:
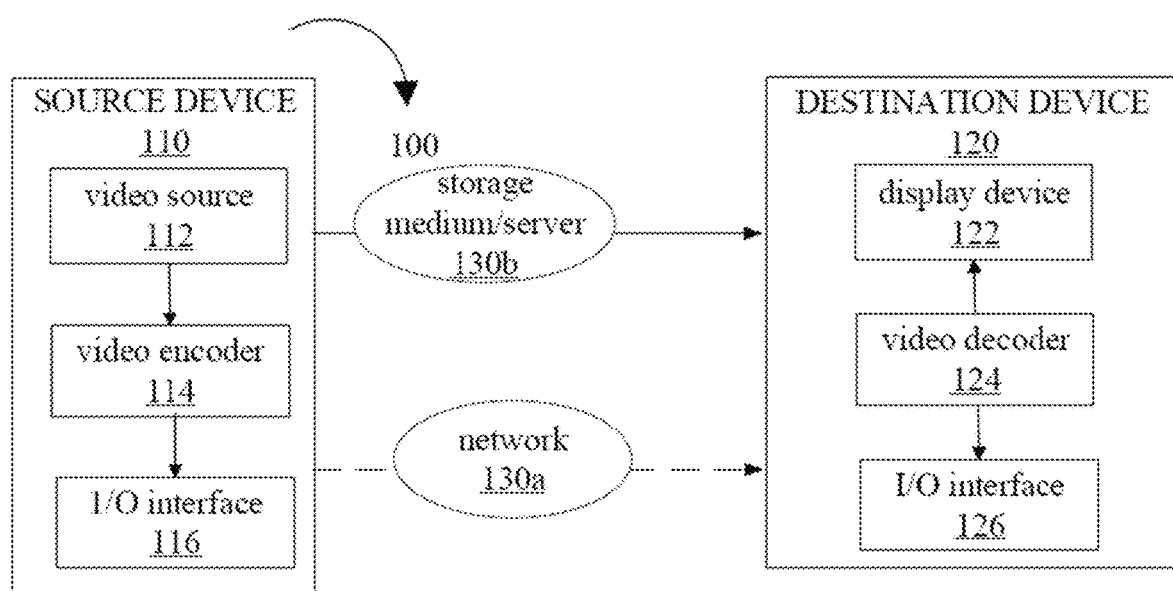
FIG. 17 is a block diagram that illustrates an example video coding system that may utilize the techniques of this disclosure.

FIG. 17 is a block diagram that illustrates an example video coding system 100 that may utilize the techniques of this disclosure. As shown in FIG. 17, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 18:
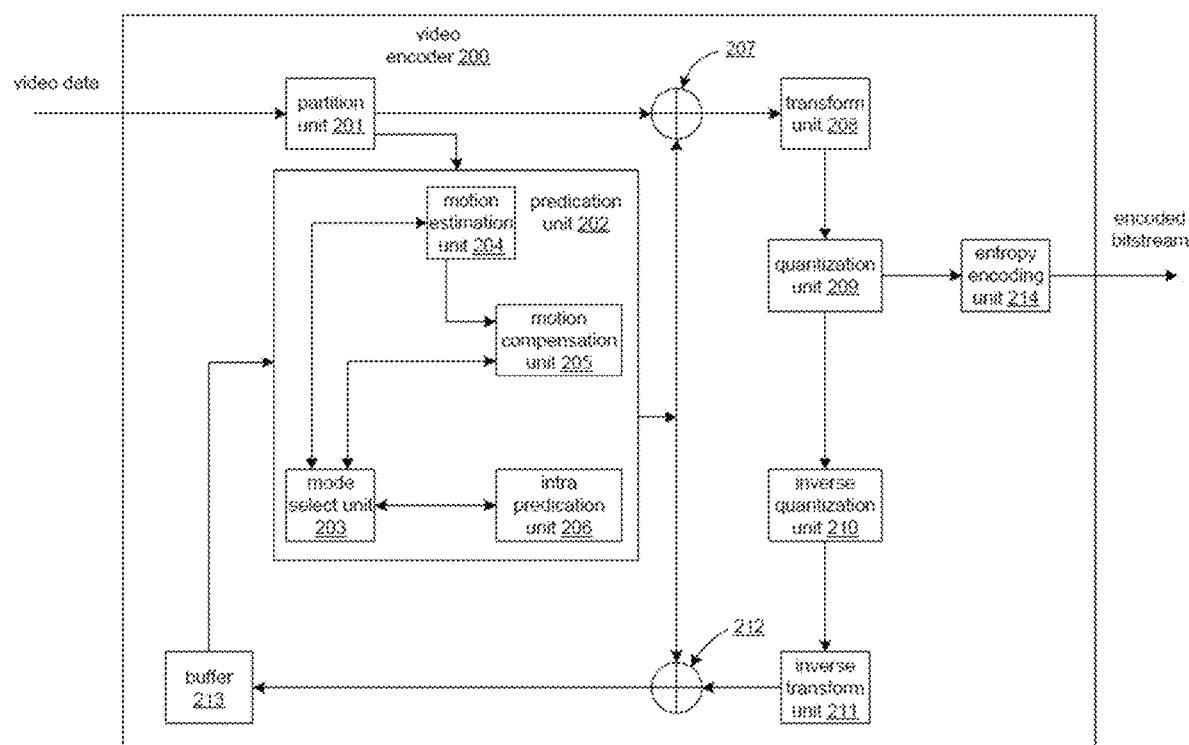
FIG. 18 is a block diagram illustrating an example of video encoder.

FIG. 18 is a block diagram illustrating an example of video encoder 200, which may be video encoder 114 in the system 100 illustrated in FIG. 17.

Video encoder 200 may be configured to perform any or all of the techniques of this disclosure. In the example of FIG. 18, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 18 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 19:
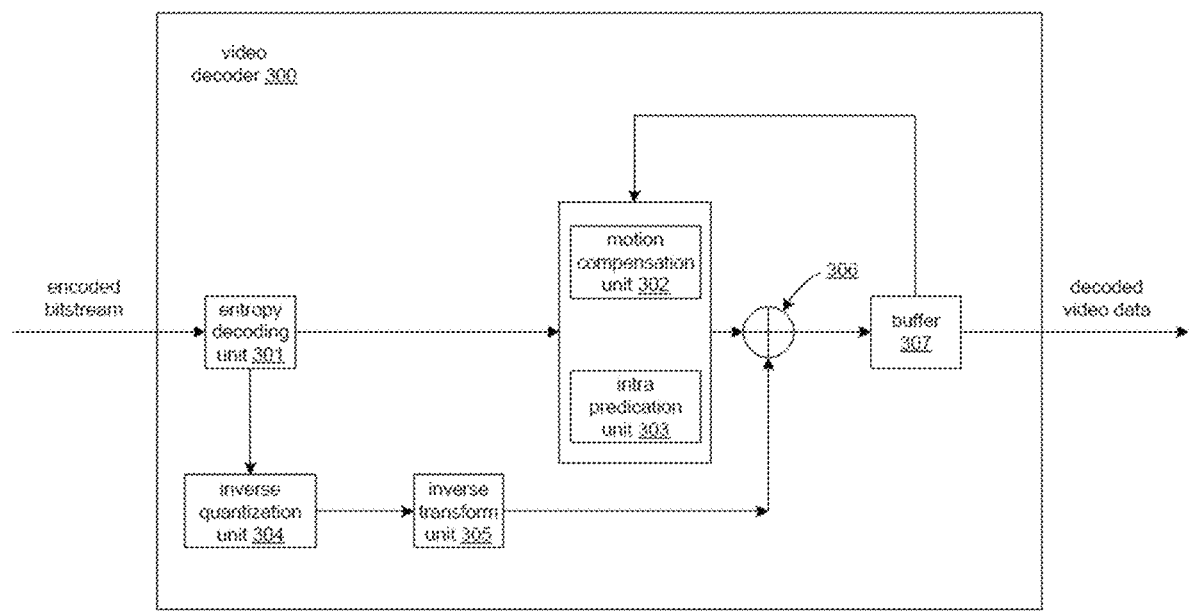
FIG. 19 is a block diagram illustrating an example of video decoder.

FIG. 19 is a block diagram illustrating an example of video decoder 300 which may be video decoder 114 in the system 100 illustrated in FIG. 17.

The video decoder 300 may be configured to perform any or all of the techniques of this disclosure. In the example of FIG. 19, the video decoder 300 includes a plurality of functional components. The techniques described in this disclosure may be shared among the various components of the video decoder 300. In some examples, a processor may be configured to perform any or all of the techniques described in this disclosure.

In the example of FIG. 19, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 18).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

In some embodiments, the ALWIP mode or the MIP mode is used to compute a prediction block of the current video block by performing, on previously coded samples of the video, a boundary downsampling operation (or an averaging operation), followed by a matrix vector multiplication operation, and selectively (or optionally) followed by an upsampling operation (or a linear interpolation operation). In some embodiments, the ALWIP mode or the MIP mode is used to compute a prediction block of the current video block by performing, on previously coded samples of the video, a boundary downsampling operation (or an averaging operation) and followed by a matrix vector multiplication operation. In some embodiments, the ALWIP mode or the MIP mode can also perform an upsampling operation (or a linear interpolation operation) after performing the matrix vector multiplication operation.

Figure 20:
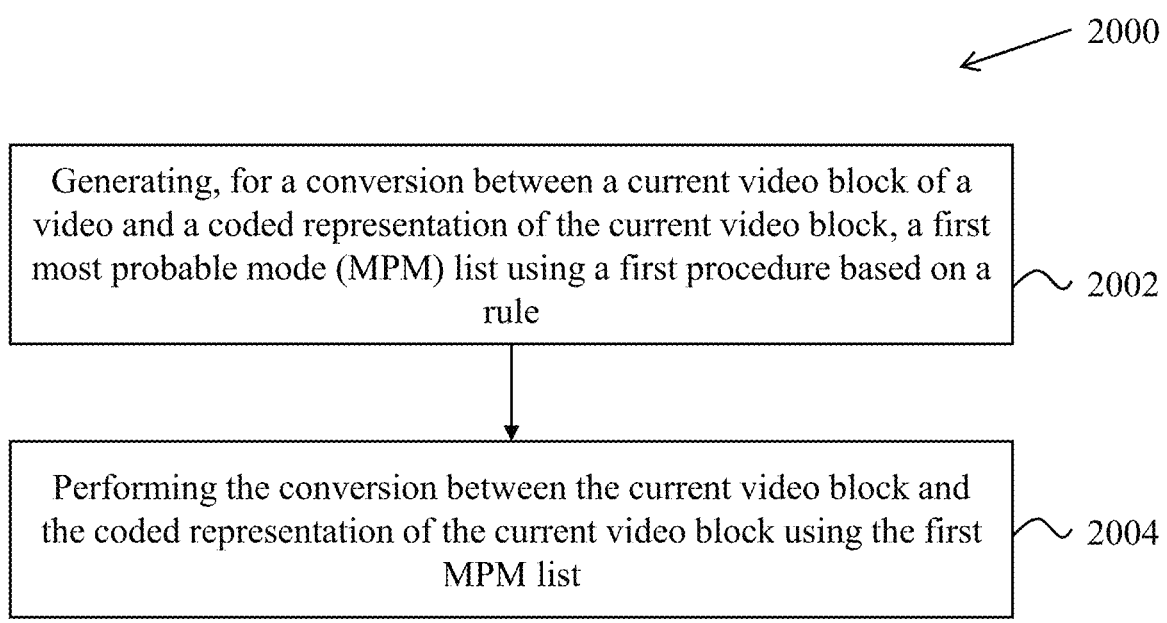

FIG. 20 shows an example flowchart of an example method 2000 for matrix-based intra prediction. Operation 2002 includes generating, for a conversion between a current video block of a video and a coded representation of the current video block, a first most probable mode (MPM) list using a first procedure based on a rule. Operation 2004 includes performing the conversion between the current video block and the coded representation of the current video block using the first MPM list, where the conversion of the current video block uses a matrix based intra prediction (MIP) mode in which a prediction block of the current video block is determined by performing, on previously coded samples of the video, a boundary downsampling operation, followed by a matrix vector multiplication operation, and selectively followed by an upsampling operation, where the rule specifies that the first procedure used for generation of the first MPM list is same as a second procedure used for generation of a second MPM list for conversion of other video blocks of the video that are coded using a non-MIP intra mode that is different from the MIP mode, and where at least a portion of the first MPM list is generated based on at least a portion of the second MPM list.

In some embodiments for method 2000, a size of the first MPM list for the MIP mode is same as that of the second MPM list for the non-MIP intra mode. In some embodiments for method 2000, the size of the first MPM list for the MIP mode and of the second MPM list for the non-MIP intra mode is 6. In some embodiments for method 2000, the second MPM list for the non-MIP intra mode is constructed before the first MPM list for the MIP mode is constructed. In some embodiments for method 2000, the portion or all of the second MPM list for the non-MIP intra mode is converted to MPMs that are added to the portion of the first MPM list for the MIP mode.

In some embodiments for method 2000, a subset of the MPMs are added to the portion of the first MPM list for the MIP mode by pruning the MPMs. In some embodiments, the method 2000 further includes adding default intra-prediction modes to the first MPM list for the MIP mode. In some embodiments for method 2000, the default intra-prediction modes are added to the first MPM list for the MIP mode prior to the portion of the first MPM list for the MIP mode that is based on the portion of the second MPM list for the non-MIP intra mode. In some embodiments for method 2000, the default intra-prediction modes are added to the first MPM list for the MIP mode after the portion of the first MPM list for the MIP mode that is based on the portion of the second MPM list for the non-MIP intra mode. In some embodiments for method 2000, the default intra-prediction modes are added to the first MPM list for the MIP mode in an interleaved manner with the portion of the first MPM list for the MIP mode that is based on the portion of the second MPM list for the non-MIP intra mode. In some embodiments for method 2000, the default intra-prediction modes are same for a plurality of types of video blocks. In some embodiments for method 2000, the default intra-prediction modes are determined based on coded information of the current video block. In some embodiments for method 2000, the coded information includes availability of neighboring video blocks, mode information of the neighboring video blocks, or block dimension of the current video block.

In some embodiments for method 2000, one intra-prediction mode in the second MPM list for the non-MIP intra mode is converted to its corresponding MIP mode to obtain a converted MIP mode that is added to the first MPM list for the MIP mode. In some embodiments for method 2000, all intra-prediction modes in the second MPM list for the non-MIP intra mode are converted to its corresponding MIP mode to obtain a plurality of converted MIP modes that are added to the first MPM list for the MIP mode. In some embodiments for method 2000, all intra-prediction modes are converted to its corresponding MIP mode to obtain a plurality of converted MIP modes that are used to construct the second MPM list for the non-MIP intra mode. In some embodiments for method 2000, the all intra-prediction modes include intra-prediction modes from neighboring video blocks of the current video block and default intra-prediction modes. In some embodiments for method 2000, the default intra-prediction modes include a planar mode and a direct current (DC) mode.

In some embodiments for method 2000, two intra-prediction modes in the second MPM list for the non-MIP intra mode are converted to its corresponding MIP modes to obtain two converted MIP modes, and one of two converted MIP modes is added to the first MPM list for the MIP mode in response to the two converted MIP modes being same. In some embodiments for method 2000, two intra-prediction modes in the second MPM list for the non-MIP intra mode are converted to its corresponding MIP modes to obtain two converted MIP modes, and one of two converted MIP modes is added to the second MPM list for the non-MIP intra mode in response to the two converted MIP modes being same. In some embodiments for method 2000, the second MPM list for non-MIP intra mode includes S intra-prediction modes, and where K out of S intra-prediction modes is or are selected to be included in the first MPM list for MIP mode. In some embodiments for method 2000, K is 3 and S is 6. In some embodiments for method 2000, the first K intra-prediction modes in the second MPM list for non-MIP intra mode is selected to be included in the first MPM list for MIP mode. In some embodiments for method 2000, the first MPM list for the MIP mode and the second MPM list for the non-MIP intra mode is derived or constructed based on one or more neighboring video blocks of the current video block. In some embodiments for method 2000, the first MPM list for the MIP mode and the second MPM list for the non-MIP intra mode is derived or constructed based on a same neighboring video block located to a left of the current video block.

In some embodiments for method 2000, the same neighboring video block located to the left is directly to left of the current video block and is aligned with the current video block. In some embodiments for method 2000, the same neighboring video block located to the left and below the current video block. In some embodiments for method 2000, the first MPM list for the MIP mode and the second MPM list for the non-MIP intra mode is derived or constructed based on a same neighboring video block, where the same neighboring video block is located to left of the current video block at a bottom-most position or the same neighboring video block is located above the current video block at a right-most position. In some embodiments for method 2000, the first MPM list for the MIP mode and the second MPM list for the non-MIP intra mode is derived or constructed based on a same neighboring video block located above the current video block.

In some embodiments for method 2000, the same neighboring video block located to above is directly above the current video block and is aligned with the current video block. In some embodiments for method 2000, the same neighboring video block located to left and above the current video block. In some embodiments for method 2000, the first MPM list for the MIP mode and the second MPM list for the non-MIP intra mode is derived or constructed based on a same neighboring video block, where the same neighboring video block is located above the current video block at a left-most position or the same neighboring video block is located to left of the current video block at a top-most position. In some embodiments for method 2000, the non-MIP intra mode is based on an intra prediction mode, a multiple reference line (MRL) intra prediction mode, or an intra sub-partition (ISP) tool. In some embodiments for method 2000, the first MPM list for the MIP mode is further based on a height or a width of the current video block.

In some embodiments for method 2000, the first MPM list for the MIP mode is further based on a height or a width of a neighboring video block of the current video block. In some embodiments for method 2000, the first MPM list for the MIP mode is constructed based on a first set of parameters that is different from a second set of parameters used to construct the second MPM list for the non-MIP intra mode. In some embodiments for method 2000, the second MPM list for non-MIP intra mode includes S intra-prediction modes, and where K out of S intra-prediction modes are derived to be included in the first MPM list for MIP mode. In some embodiments for method 2000, K is 3 and S is 6.

In some embodiments for method 2000, the first K intra-prediction modes in the second MPM list for non-MIP intra mode is derived to be included in the first MPM list for MIP mode. In some embodiments for method 2000, a first mode listed in the first MPM list for MIP mode is different from a first mode listed in the second MPM list for non-MIP intra mode. In some embodiments for method 2000, the first mode listed in the first MPM list for MIP mode is a first mode, and where the first mode listed in the second MPM list for non-MIP intra mode is a planar mode. In some embodiments for method 2000, the first mode in the first MPM list for MIP mode is converted from the planar mode in the second MPM list for non-MIP intra mode.

In some embodiments for method 2000, the first MPM list for MIP mode includes a first set of stuffing modes that are different from a second set of stuffing modes included in the second MPM list for non-MIP intra mode. In some embodiments for method 2000, the first set of stuffing modes include a first mode, a second mode, and a third mode, and where the second set of stuffing modes include a direct current (DC) mode, a vertical mode, and a horizontal mode. In some embodiments for method 2000, the first mode, the second mode, and the third mode are included in the first set of stuffing modes based on a size of the current video block. In some embodiments for method 2000, the first MPM list for MIP mode includes a first set of intra-prediction modes of neighboring video blocks of the current video block, the second MPM list for non-MIP intra mode includes a second set of intra-prediction modes of the neighboring video blocks of the current video block, and the first set of intra-prediction modes are different from the second set of intra-prediction modes.

In some embodiments for method 2000, the second set of intra-prediction modes include intra-prediction modes that are converted to MIP modes that are included in the first set of intra-prediction modes. In some embodiments for method 2000, the first MPM list for MIP mode includes a first set of shifted intra-prediction modes, the second MPM list for non-MIP intra mode includes a second set of shifted intra-prediction modes, and the first set of shifted intra-prediction modes are different from the second set of shifted intra-prediction modes. In some embodiments for method 2000, the first set of shifted intra-prediction modes includes an MIP mode (Y) shifted by K1 according to a first formula Y+K1, the second set of shifted intra-prediction modes includes a non-MIP intra mode (X) shifted by K0 according to a second formula X+K0, and K1 is different from K0. In some embodiments for method 2000, K1 depends on a width and a height of the current video block.

In some embodiments, the method 2000 further includes performing a first determination that a neighboring video block of the current video block is coded with a non-MIP intra mode; and performing a second determination, in response to the first determination, that the neighboring video block is unavailable for the constructing of the first MPM list for the MIP mode.

In some embodiments, the method 2000 further includes performing a first determination that a neighboring video block of the current video block is coded with a non-MIP intra mode; and performing, in response to the first determination, a second determination that the neighboring video block is coded with a pre-defined MIP intra-prediction mode, where the first MPM list for the MIP mode is constructed using the pre-defined MIP intra-prediction mode. In some embodiments for method 2000, the pre-defined MIP intra-prediction mode depends on a width and/or a height of the current video block.

Figure 21:
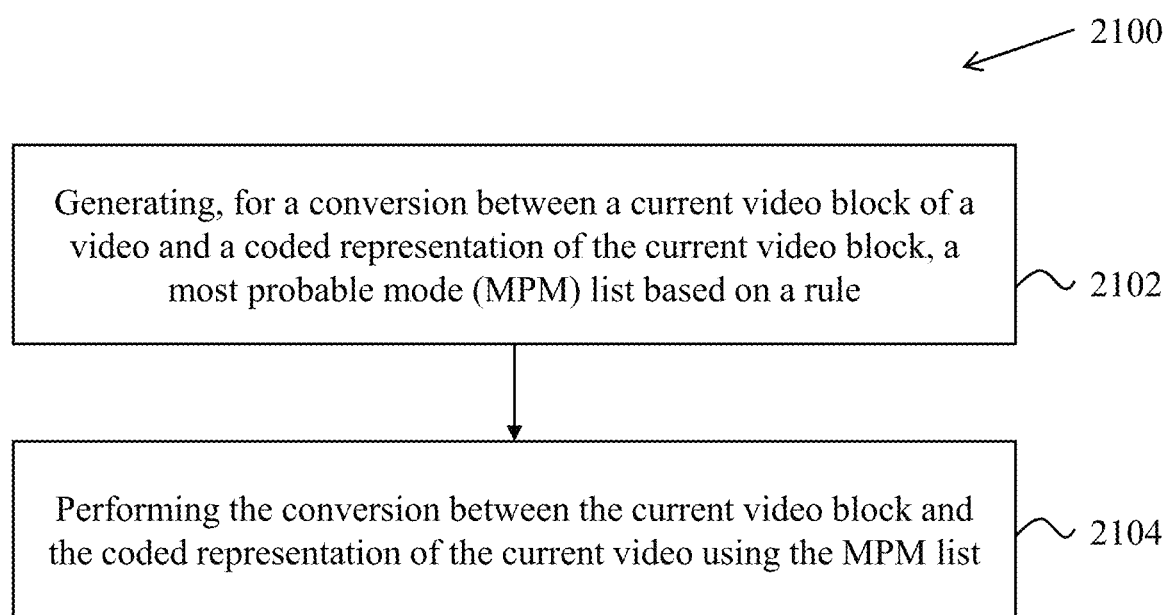

FIG. 21 shows an example flowchart of an example method 2100 for matrix-based intra prediction. Operation 2100 includes generating, for a conversion between a current video block of a video and a coded representation of the current video block, a most probable mode (MPM) list based on a rule, where the rule is based on whether a neighboring video block of the current video block is coded with a matrix based intra prediction (MIP) mode in which a prediction block of the neighboring video block is determined by performing, on previously coded samples of the video, a boundary downsampling operation, followed by a matrix vector multiplication operation, and selectively followed by an upsampling operation. Operation 2104 includes performing the conversion between the current video block and the coded representation of the current video block using the MPM list, where the conversion applies a non-MIP mode to the current video block, and where the non-MIP mode is different from the MIP mode.

In some embodiments for method 2100, the rule specifies that the neighboring video block coded with the MIP mode is treated as unavailable for generating the MPM list for the non-MIP coded current video block. In some embodiments for method 2100, the rule specifies that the neighboring video block coded with the MIP mode is determined to be coded with a pre-defined intra-prediction mode. In some embodiments for method 2100, the rule specifies that the pre-defined intra-prediction mode includes a planar mode.

Figure 22:
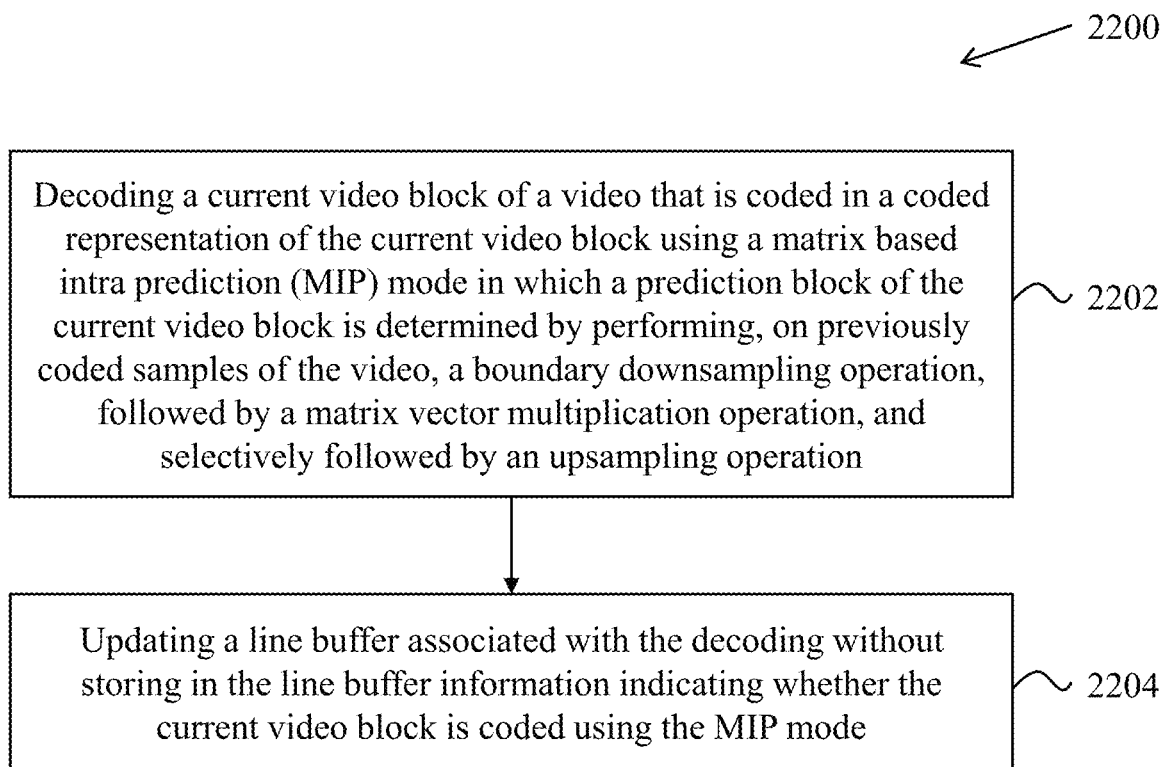

FIG. 22 shows an example flowchart of an example method 2200 for matrix-based intra prediction. Operation 2202 includes decoding a current video block of a video that is coded in a coded representation of the current video block using a matrix based intra prediction (MIP) mode in which a prediction block of the current video block is determined by performing, on previously coded samples of the video, a boundary downsampling operation, followed by a matrix vector multiplication operation, and selectively followed by an upsampling operation. Operation 2204 includes updating a line buffer associated with the decoding without storing in the line buffer information indicating whether the current video block is coded using the MIP mode.

In some embodiments, the method 2200 further includes accessing a second video block of the video, where the second video block is decoded before the decoding the current video block, where the second video block is located at a different Largest Coding Unit (LCU) or Coding Tree Unit (CTU) row or CTU region compared to that of the current video block, and where the current video block is decoded without determining whether the second video block is coded using the MIP mode. In some embodiments, the method 2200 further includes accessing a second video block by determining that the second video block is coded using a non-MIP intra mode without determining whether the second video block is coded using the MIP mode, where the second video located at a different Largest Coding Unit (LCU) or Coding Tree Unit (CTU) row or CTU region compared to that of the current video block; and decoding, based on the accessing the second video block, the current video block.

Figure 23:
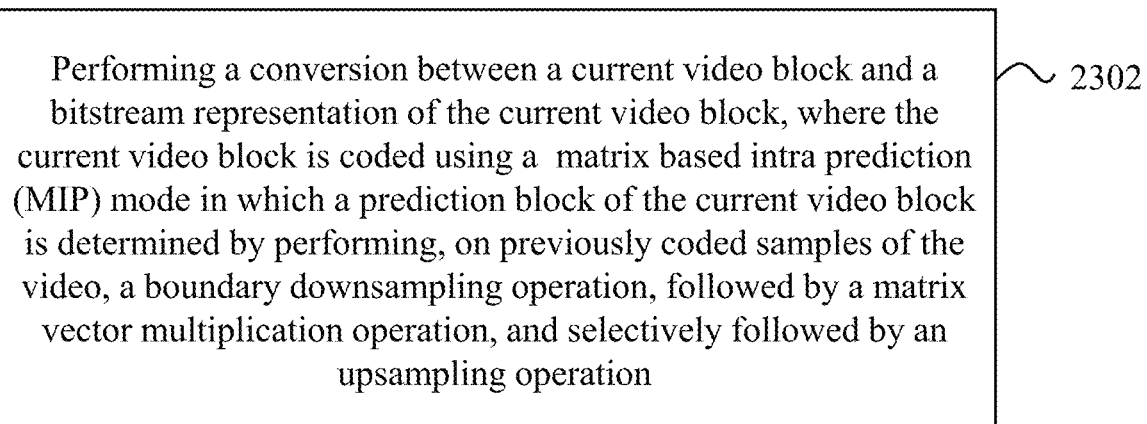

FIG. 23 shows an example flowchart of an example method 2300 for matrix-based intra prediction. Operation 2302 includes performing a conversion between a current video block and a bitstream representation of the current video block, where the current video block is coded using a matrix based intra prediction (MIP) mode in which a prediction block of the current video block is determined by performing, on previously coded samples of the video, a boundary downsampling operation, followed by a matrix vector multiplication operation, and selectively followed by an upsampling operation, where a flag is coded in the bitstream presentation using at most K contexts in an arithmetic coding or a decoding process, where the flag indicates whether the current video block is coded using the MIP mode, and where K is greater than or equal to zero. In some embodiments for method 2300, K is 1. In some embodiments for method 2300, K is 4.

Figure 24:
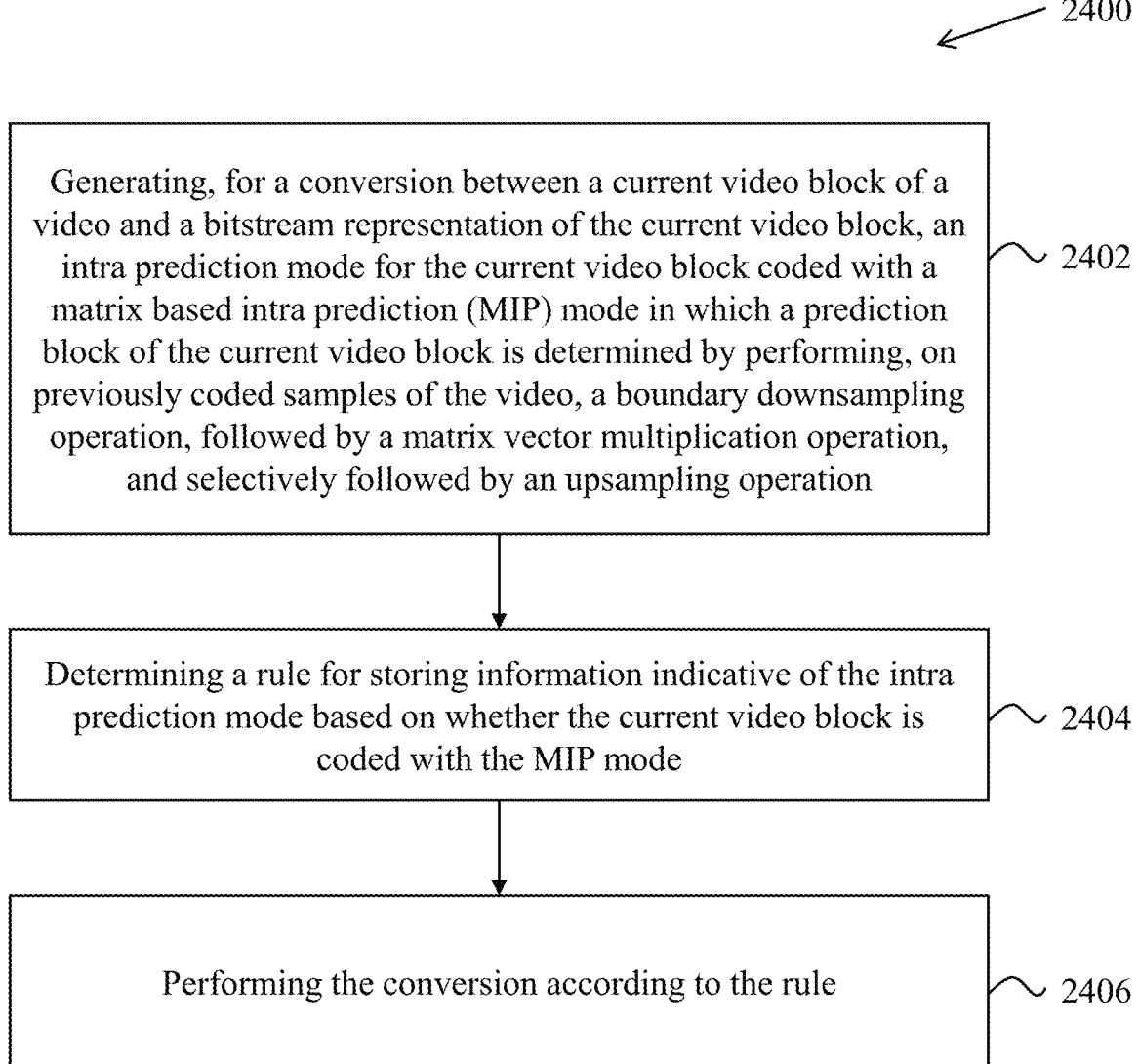

FIG. 24 shows an example flowchart of an example method 2400 for matrix-based intra prediction. Operation 2402 includes generating, for a conversion between a current video block of a video and a bitstream representation of the current video block, an intra prediction mode for the current video block coded with a matrix based intra prediction (MIP) mode in which a prediction block of the current video block is determined by performing, on previously coded samples of the video, a boundary downsampling operation, followed by a matrix vector multiplication operation, and selectively followed by an upsampling operation. Operation 2404 includes determining a rule for storing information indicative of the intra prediction mode based on whether the current video block is coded with the MIP mode. Operation 2406 includes performing the conversion according to the rule, where the rule defines that a syntax element for the intra prediction mode is stored in the bitstream representation for the current video block, and where the rule defines that a mode index for the MIP mode for the current video block is not stored in the bitstream representation.

In some embodiments for method 2400, the mode index for the MIP mode is associated with the intra prediction mode. In some embodiments for method 2400, the rule defines that the bitstream representation excludes a flag that indicates that the current video block is coded with the MIP mode. In some embodiments for method 2400, the rule defines that the bitstream representation excludes a storage of information indicative of the MIP mode associated with the current video block. In some embodiments, the method 2400 further includes performing, after the conversion, a second conversion between a second video block of the video and the bitstream representation of the second video block, where the second video block is a neighboring video block of the current video block, and where the second conversion is performed without determining whether the second video block is coded using the MIP mode.

Figure 25:
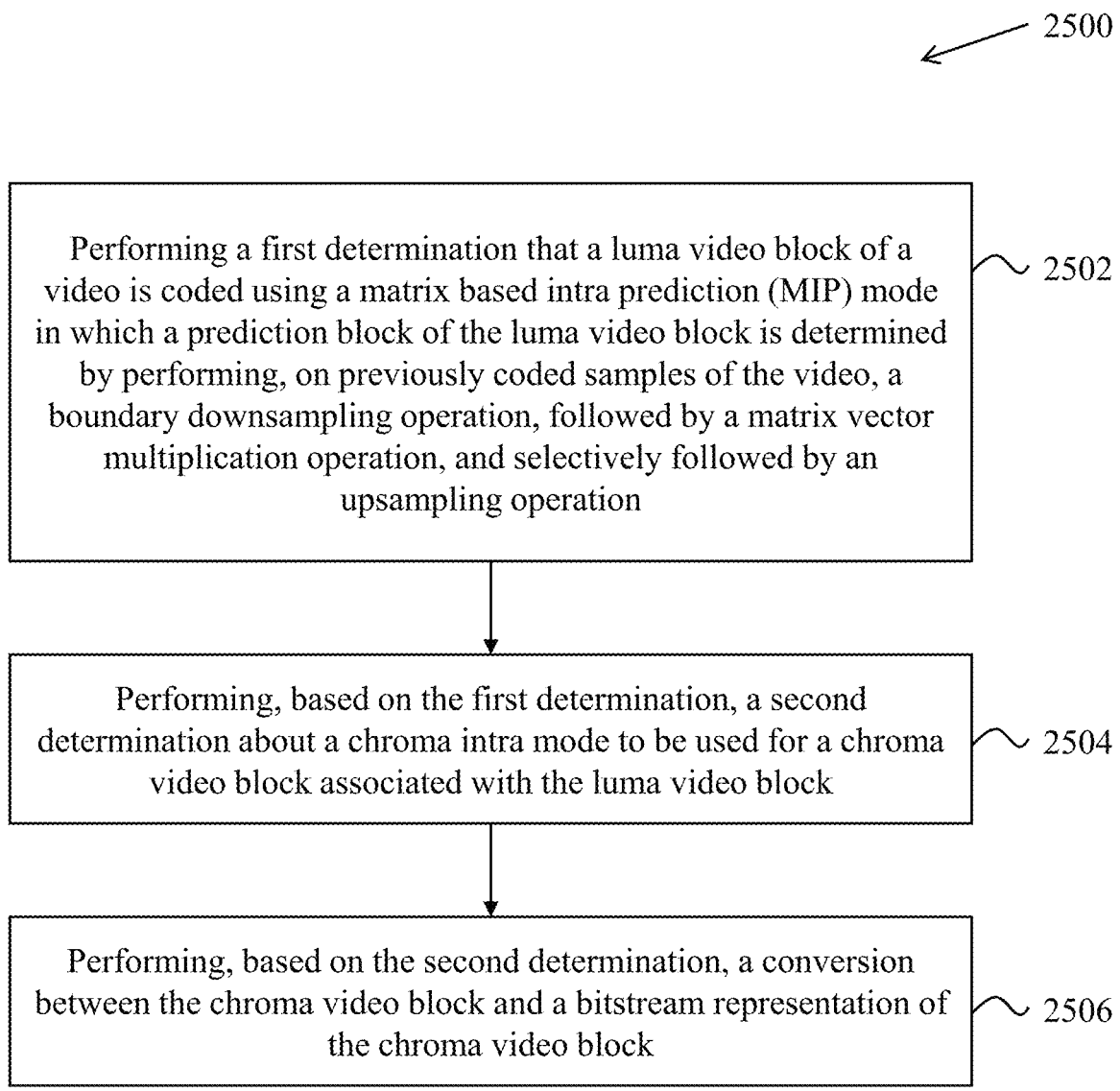

FIG. 25 shows an example flowchart of an example method 2500 for matrix-based intra prediction. Operation 2502 includes performing a first determination that a luma video block of a video is coded using a matrix based intra prediction (MIP) mode in which a prediction block of the luma video block is determined by performing, on previously coded samples of the video, a boundary downsampling operation, followed by a matrix vector multiplication operation, and selectively followed by an upsampling operation. Operation 2504 includes performing, based on the first determination, a second determination about a chroma intra mode to be used for a chroma video block associated with the luma video block. Operation 2506 includes performing, based on the second determination, a conversion between the chroma video block and a bitstream representation of the chroma video block.

In some embodiments for method 2500, the performing the second determination includes determining that the chroma intra mode is a Derived Mode (DM) without depending on a signaling. In some embodiments for method 2500, the luma video block covers a predetermined corresponding chroma sample of the chroma video block. In some embodiments for method 2500, the predetermined corresponding chroma sample is a top-left sample or a center sample of the chroma video block. In some embodiments for method 2500, the chroma intra mode includes a Derived Mode (DM). In some embodiments for method 2500, the DM is used to derive a first intra prediction mode for the chroma video block from a second intra prediction mode of the luma video block. In some embodiments for method 2500, the MIP mode associated with the luma video block is mapped to a pre-defined intra mode.

In some embodiments for method 2500, a plurality of Derived Modes (DMs) are derived in response to the first determination that the luma video block is coded with the MIP mode. In some embodiments for method 2500, the chroma intra mode includes a specified intra prediction mode. In some embodiments for method 2500, the pre-defined intra mode or the specified intra mode is a Planar mode. In some embodiments for method 2500, the chroma video block is coded using the MIP mode. In some embodiments for method 2500, the chroma video block is coded using a first matrix or a first bias vector that are different from a second matrix or a second bias vector of a second chroma video block. In some embodiments for method 2500, the chroma video block is a blue color component, where the first matrix or the first bias vector is predefined for the blue color component, where the second chroma video block is a red color component, where the second matrix or the second bias vector is predefined for the red color component.

In some embodiments for method 2500, the blue color component and the red color component are concatenated. In some embodiments for method 2500, the blue color component and the red color component are interleaved. In some embodiments for method 2500, the chroma video block is coded using the MIP mode that is same as the MIP mode used for the luma video block. In some embodiments for method 2500, the chroma video block is coded using a Derived Mode (DM). In some embodiments for method 2500, the upsampling operation (or a linear interpolation technique) is skipped after the chroma video block is coded using the MIP mode. In some embodiments for method 2500, the chroma video block is coded using the MIP mode with a subsampled matrix and/or a bias vector. In some embodiments for method 2500, a number of MIP modes for the luma video block and the chroma video block are different. In some embodiments for method 2500, the chroma video block is associated with a first number of MIP modes, the luma video block is associated with a second number of MIP modes, and the first number of MIP modes is less than the second number of MIP modes. In some embodiments for method 2500, the chroma video block and the luma video block have a same size.

FIG. 26 shows an example flowchart of an example method 2600 for matrix-based intra prediction. Operation 2602 includes performing a conversion between a current video block of a video and a coded representation of the current video block, where the conversion is based on a determination (or based on determining) whether to code the current video block using a matrix based intra prediction (MIP) mode in which a prediction block of the current video block is determined by performing, on previously coded samples of the video, a boundary downsampling operation, followed by a matrix vector multiplication operation, and selectively followed by an upsampling operation.

In some embodiments of method 2600, a syntax element is included in the coded representation in response to the determination that the current video block is to be coded with the MIP mode, and the syntax element indicates the use the MIP mode for coding the current video block. In some embodiments of method 2600, the coded representation includes a syntax element that indicates that the MIP mode is enabled or disabled for the current video block, and where the syntax element indicates that the MIP mode is allowed or disallowed for coding the current video block. In some embodiments of method 2600, a syntax element is not included in the coded representation in response to the determination that the current video block is not to be coded with the MIP mode, and the syntax element indicates whether the MIP mode is used for the current video block. In some embodiments of method 2600, a second syntax element indicating enabling of the MIP mode is further included in a sequence parameter set (SPS), a picture parameter set (PPS), a slice header, a tile group header, a tile header, a coding tree unit (CTU) row or a CTU region. In some embodiments of method 2600, the determination whether to use the MIP mode for the conversion is based on a height (H) and/or a width (W) of the current video block. In some embodiments of method 2600, the current video block is determined not to be coded using the MIP mode in response to $W \geq T1$ and $H \geq T2$. In some embodiments of method 2600, the current video block is determined not to be coded using the MIP mode in response to $W \leq T1$ and $H \leq T2$. In some embodiments of method 2600, the current video block is determined not to be coded using the MIP mode in response to $W \geq T1$ or $H \geq T2$. In some embodiments of method 2600, the current video block is determined not to be coded using the MIP mode in response to $W \leq T1$ or $H \leq T2$. In some embodiments of method 2600, T1=32 and T2=32. In some embodiments of method 2600, the current video block is determined not to be coded using the MIP mode in response to $W+H \geq T$. In some embodiments of method 2600, the current video block is determined not to be coded using the MIP mode in response to $W+H \leq T$. In some embodiments of method 2600, the current video block is determined not to be coded using the MIP mode in response to $W \times H \geq T$. In some embodiments of method 2600, the current video block is determined not to be coded using the MIP mode in response to $W \times H \leq T$. In some embodiments of method 2600, T=256.

Figure 27A:
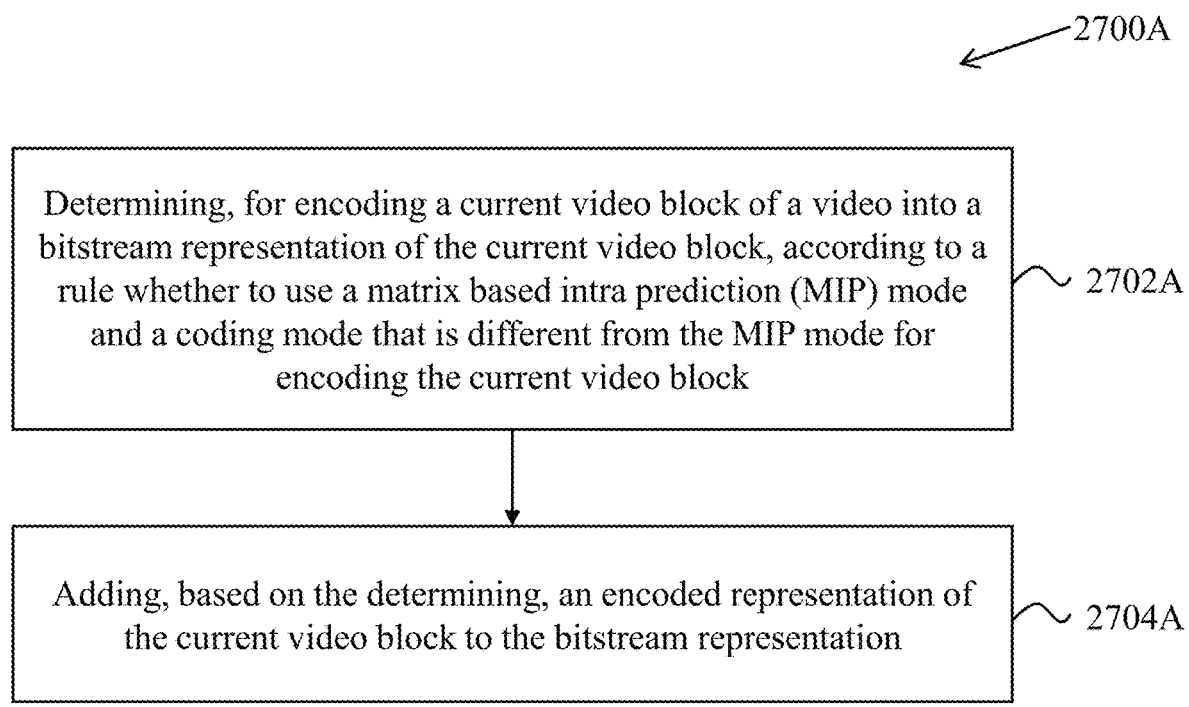

FIG. 27A shows an example flowchart of an example video encoding method 2700A for matrix-based intra prediction. Operation 2702A includes determining, for encoding a current video block of a video into a bitstream representation of the current video block, according to a rule whether to use a matrix based intra prediction (MIP) mode and a coding mode that is different from the MIP mode for encoding the current video block, where the MIP mode includes determining a prediction block of the current video block by performing, on previously coded samples of the video, a boundary downsampling operation, followed by a matrix vector multiplication operation, and selectively followed by an upsampling operation. Operation 2704A includes adding, based on the determining, an encoded representation of the current video block to the bitstream representation.

Figure 27B:
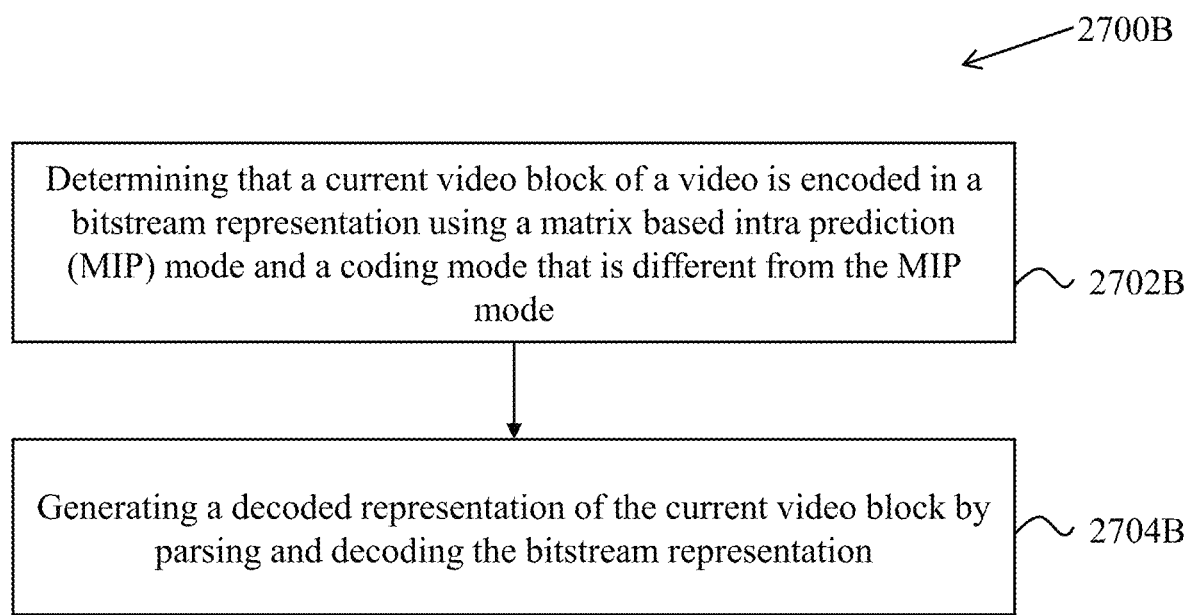

FIG. 27B shows an example flowchart of an example video decoding method 2700B for matrix-based intra prediction. Operation 2702B includes determining that a current video block of a video is encoded in a bitstream representation using a matrix based intra prediction (MIP) mode and a coding mode that is different from the MIP mode, where the MIP mode includes determining a prediction block of the current video block by performing, on previously coded samples of the video, a boundary downsampling operation, followed by a matrix vector multiplication operation, and selectively followed by an upsampling operation. Operation 2704B includes generating a decoded representation of the current video block by parsing and decoding the bitstream representation.

In some embodiments for methods 2700A and/or 2700B, the coding mode is a combined intra and inter prediction (CIIP) mode, and where the method further comprises generating an intra prediction signal for the current video block by performing a selection between the MIP mode and an intra prediction mode. In some embodiments for methods 2700A and/or 2700B, the performing the selection is based on a signaling in the bitstream representation of the current video block. In some embodiments for methods 2700A and/or 2700B, the performing the selection is based on a predetermined rule. In some embodiments for methods 2700A and/or 2700B, the predetermined rule selects the MIP mode in response to the current video block being coded using the CIIP mode. In some embodiments for methods 2700A and/or 2700B, the predetermined rule selects the intra prediction mode in response to the current video block being coded using the CIIP mode. In some embodiments for method 2700A and/or 2700B, the predetermined rule selects a Planar mode in response to the current video block being coded using the CIIP mode. In some embodiments for methods 2700A and/or 2700B, the performing the selection is based on information associated with neighboring video blocks of the current video block.

In some embodiments for methods 2700A and/or 2700B, the coding mode is a cross-component linear model (CCLM) prediction mode. In some embodiments for methods 2700A and/or 2700B, a first downsampling procedure for downsampling a neighboring sample of the current video block in the MIP mode uses at least some of a second downsampling procedure for the CCLM prediction mode in which neighboring luma samples of the current video block are downsampled. In some embodiments for methods 2700A and/or 2700B, a first downsampling procedure for downsampling a neighboring sample of the current video block in the CCLM prediction mode uses at least some of a second downsampling procedure for the MIP prediction mode in which neighboring luma samples of the current video block are downsampled. In some embodiments for methods 2700A and/or 2700B, the first downsampling procedure for the MIP mode is based on a first set of parameters, and the first downsampling procedure for the CCLM prediction mode is based on a second set of parameters different from the first set of parameters.

In some embodiments for methods 2700A and/or 2700B, the first downsampling procedure for the MIP mode and the second downsampling procedure for the CCLM prediction mode include selection of neighboring luma locations or selection of downsampling filter. In some embodiments for methods 2700A and/or 2700B, the neighboring luma samples are downsampled using at least one of a selection of downsampled positions, a selection of downsampling filters, a rounding operation or a clipping operation. In some embodiments for methods 2700A and/or 2700B, the rule defines that a block-based differential pulse coded modulation (BDPCM) or a residual DPCM is not applied to the current video block coded with the MIP mode. In some embodiments for methods 2700A and/or 2700B, the rule defines that the MIP mode is disallowed for applying to the current video block in response to applying a block-based differential pulse-coded modulation (BDPCM) or a residual DPCM.

Figure 28:
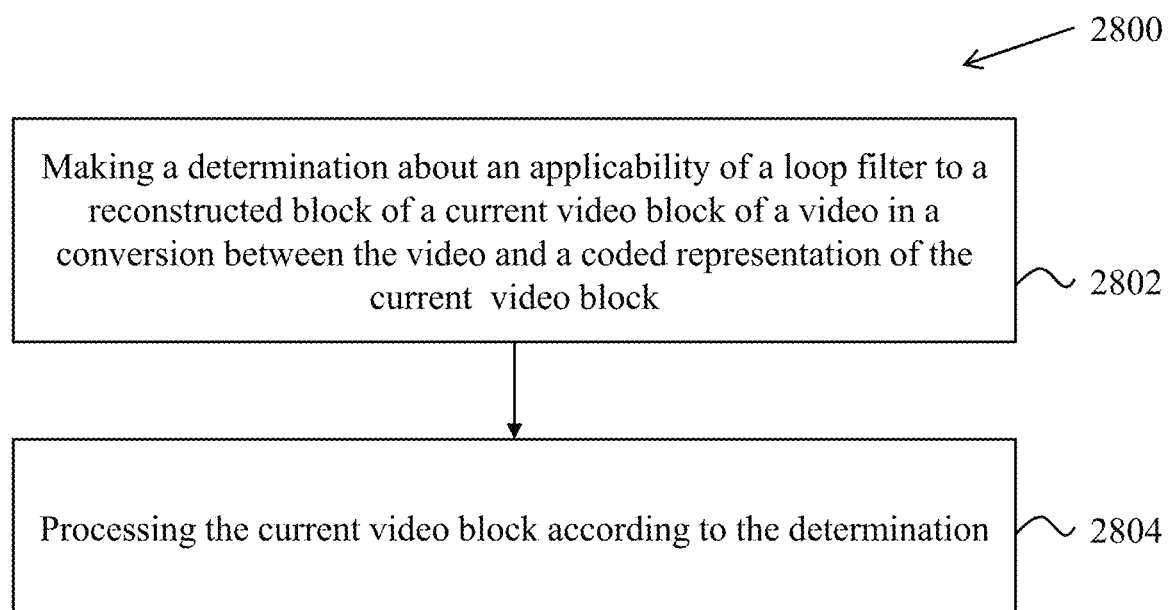

FIG. 28 shows an example flowchart of an example method 2800 for matrix-based intra prediction. Operation 2802 includes making a determination about an applicability of a loop filter to a reconstructed block of a current video block of a video in a conversion between the video and a coded representation of the current video block, where the current video block is coded using a matrix based intra prediction (MIP) mode in which a prediction block of the current video block is determined by performing, on previously coded samples of the video, a boundary downsampling operation, followed by a matrix vector multiplication operation, and selectively followed by an upsampling operation. Operation 2804 includes processing the current video block according to the determination.

In some embodiments for method 2800, the loop filter includes a deblocking filter. In some embodiments for method 2800, the loop filter includes a sample adaptive offset (SAO). In some embodiments for method 2800, the loop filter includes an adaptive loop filter (ALF).

Figure 29A:
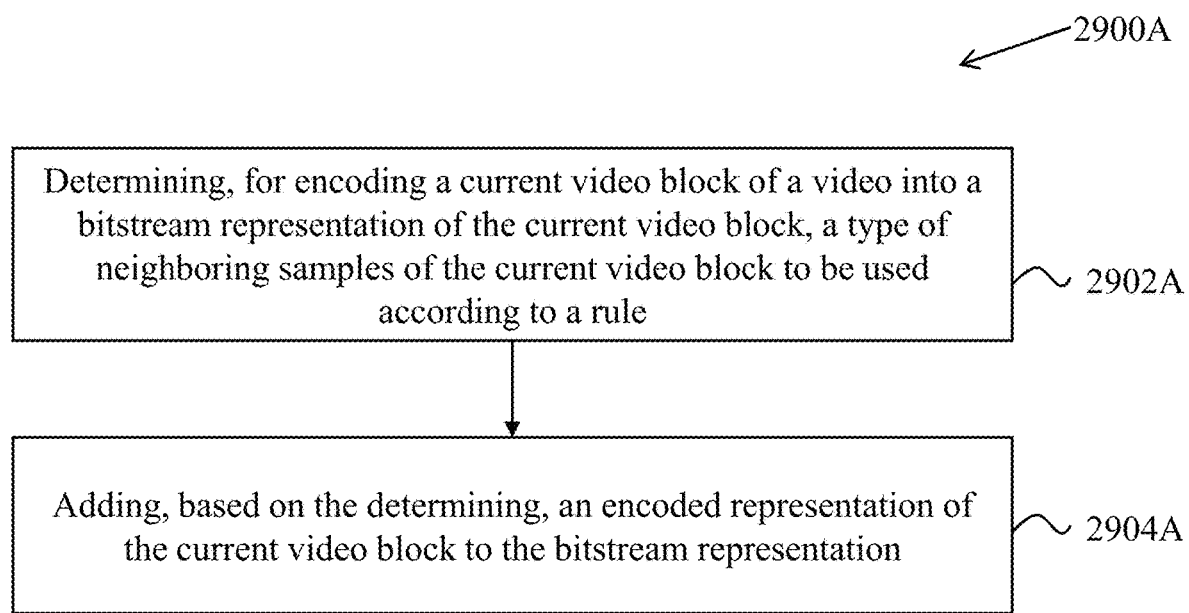

FIG. 29A shows an example flowchart of an example video encoding method 2900A for matrix-based intra prediction. Operation 2902A includes determining, for encoding a current video block of a video into a bitstream representation of the current video block, a type of neighboring samples of the current video block to be used according to a rule. Operation 2904A includes adding, based on the determining, an encoded representation of the current video block to the bitstream representation, where the current video block is encoded using a matrix based intra prediction (MIP) mode in which a prediction block of the current video block is determined by performing, on previously coded samples of the video, a boundary downsampling operation, followed by a matrix vector multiplication operation, and selectively followed by an upsampling operation.

Figure 29B:
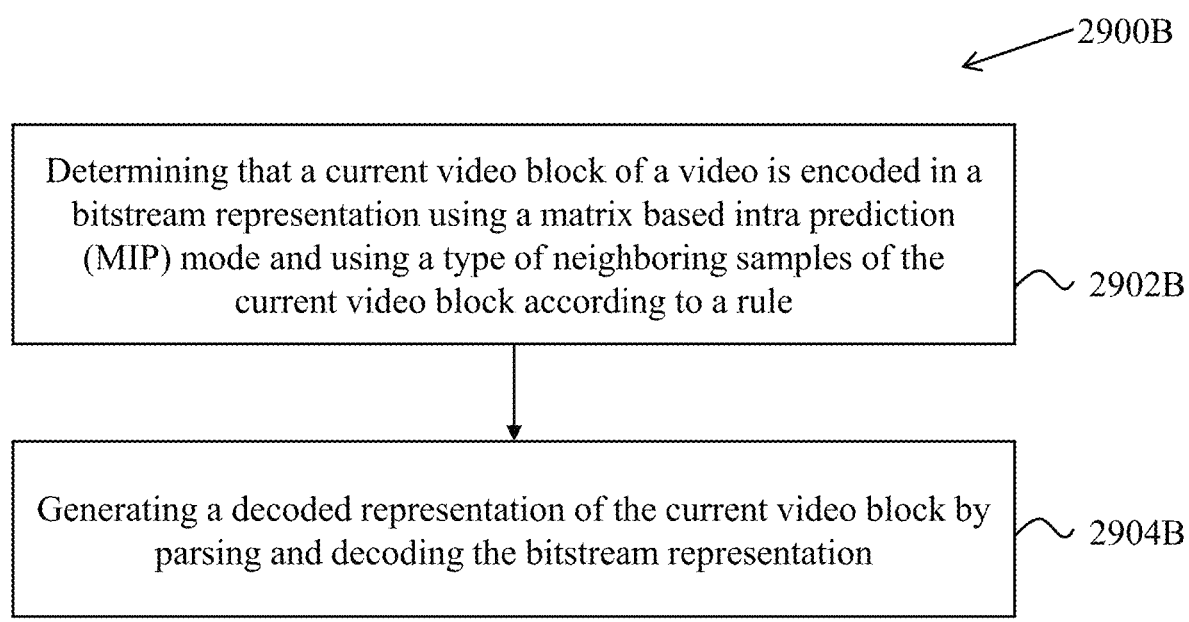

FIG. 29B shows an example flowchart of an example video decoding method 2900B for matrix-based intra prediction. Operation 2902B includes determining that a current video block of a video is encoded in a bitstream representation using a matrix based intra prediction (MIP) mode and using a type of neighboring samples of the current video block according to a rule, where the MIP mode includes determining a prediction block of the current video block by performing, on previously coded samples of the video, a boundary downsampling operation, followed by a matrix vector multiplication operation, and selectively followed by an upsampling operation. Operation 2904B includes generating a decoded representation of the current video block by parsing and decoding the bitstream representation.

In some embodiments for methods 2900A and/or 2900B, the rule defines that the type of neighboring samples are unfiltered neighboring samples. In some embodiments for methods 2900A and/or 2900B, the rule defines that the type of neighboring samples that include the unfiltered neighboring samples are used for an upsampling process, the rule defines that the type of neighboring samples that include the unfiltered neighboring samples are used for a downsampling process, and the rule defines that the type of neighboring samples that include the unfiltered neighboring samples are used for the matrix vector multiplication operation. In some embodiments for methods 2900A and/or 2900B, the rule defines that the type of neighboring samples are filtered neighboring samples. In some embodiments for methods 2900A and/or 2900B, the rule defines that the type of neighboring samples that include unfiltered neighboring samples are used for an upsampling technique, and the rule defines that the type of neighboring samples that include filtered neighboring samples are used for a downsampling technique.

In some embodiments for methods 2900A and/or 2900B, the rule defines that the type of neighboring samples that include unfiltered neighboring samples are used for a downsampling technique, and the rule defines that the type of neighboring samples that include filtered neighboring samples are used for an upsampling technique. In some embodiments for methods 2900A and/or 2900B, the rule defines that the type of neighboring samples that include unfiltered above neighboring samples are used for an upsampling technique, and the rule defines that the type of neighboring samples that include filtered left neighboring samples are used for an upsampling technique. In some embodiments for methods 2900A and/or 2900B, the rule defines that the type of neighboring samples that include unfiltered left neighboring samples are used for an upsampling technique, and the rule defines that the type of neighboring samples that include filtered above neighboring samples are used for an upsampling technique.

In some embodiments for methods 2900A and/or 2900B, the type of neighboring samples include unfiltered neighboring samples or filtered neighboring samples, and the rule defines that whether the unfiltered neighboring samples or the filtered neighboring samples are used is based on the MIP mode of the current video block.

In some embodiments, methods 2900A and/or 2900B further comprise converting the MIP mode to an intra prediction mode, where the type of neighboring samples include unfiltered neighboring samples or filtered neighboring samples, and where the rule defines that whether the unfiltered neighboring samples or the filtered neighboring samples are used is based on the intra prediction mode. In some embodiments for methods 2900A and/or 2900B, the type of neighboring samples includes unfiltered neighboring samples or filtered neighboring samples, and the rule defines that whether the unfiltered neighboring samples or the filtered neighboring samples are used is based on a syntax element or signaling. In some embodiments for methods 2900A and/or 2900B, the filtered neighboring samples or the filtered left neighboring samples or the filtered above neighboring samples are generated using an intra prediction mode.

FIG. 30 shows an example flowchart of an example method 3000 for matrix-based intra prediction. Operation 3002 includes performing a conversion between a current video block of a video and a bitstream representation of the current video block, where the conversion includes generating, by using a matrix based intra prediction (MIP) mode, a prediction block for the current video block by selecting and applying matrix multiplication using matrices of samples and/or by selecting and adding an offset using offset vectors for the current video block, where the samples are obtained from a row and column wise averaging of previously coded samples of the video, and where the selecting is based on reshaping information associated with applying a luma mapping with chroma scaling (LMCS) technique on a reference picture of the current video block. In some embodiments for method 3000, when a reshaping technique is enabled for the reference picture, the reshaping information is associated with the matrices and/or the offset vectors that are different from those associated with the reshaping information when the reshaping technique is disabled for the reference picture. In some embodiments for method 3000, different matrices and/or the offset vectors are used for different reshaping parameters of the reshaping information. In some embodiments for method 3000, the performing the conversion includes performing intra prediction on the current video block using the MIP mode in an original domain. In some embodiments for method 3000, neighboring samples of the current video block are mapped to the original domain in response to applying the reshaping information, and where the neighboring samples are mapped to the original domain before being used in MIP mode.

Figure 31:
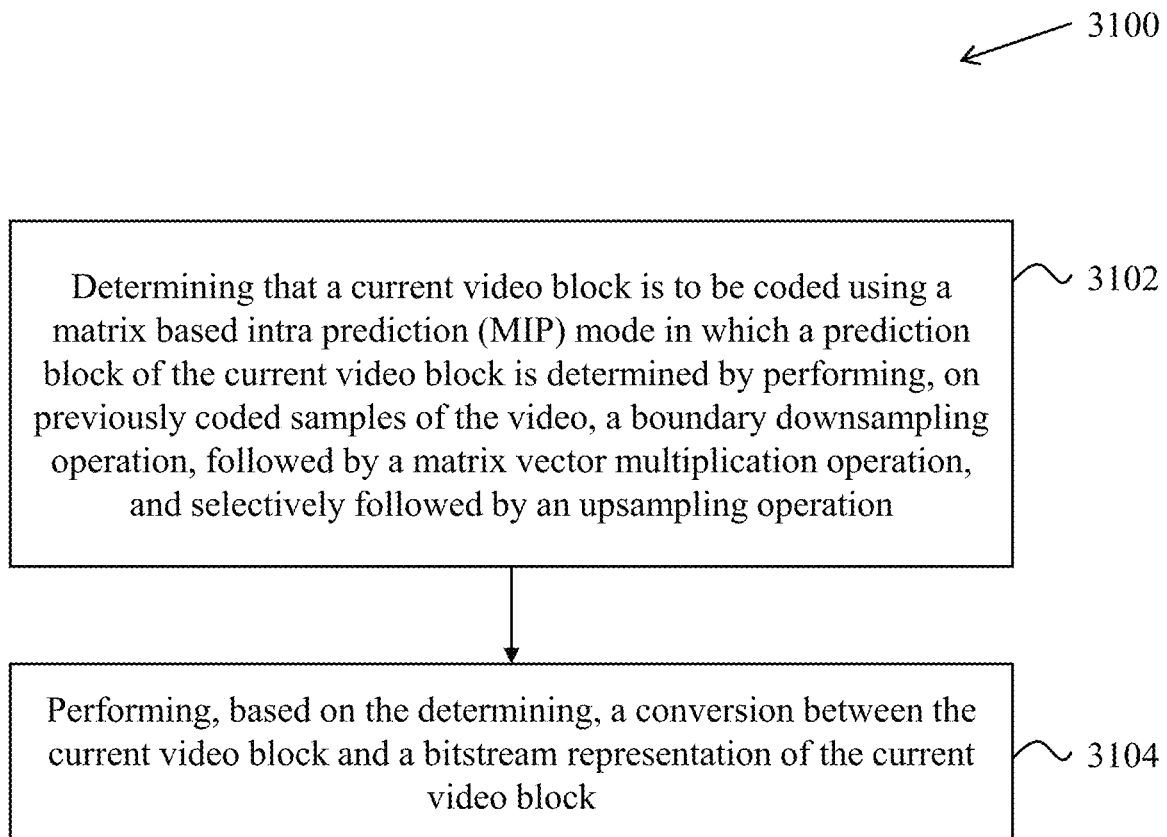

FIG. 31 shows an example flowchart of an example method 3100 for matrix-based intra prediction. Operation 3102 includes determining that a current video block is to be coded using a matrix based intra prediction (MIP) mode in which a prediction block of the current video block is determined by performing, on previously coded samples of the video, a boundary downsampling operation, followed by a matrix vector multiplication operation, and selectively followed by an upsampling operation. Operation 3104 includes performing, based on the determining, a conversion between the current video block and a bitstream representation of the current video block, where the performing the conversion is based on a rule of co-application of the MIP mode and another coding technique.

In some embodiments for method 3100, the rule specifies that the MIP mode and the another coding technique are used mutually exclusively. In some embodiments for method 3100, the rule specifies that the another coding technique is high dynamic range (HDR) technique or a reshaping technique.

FIG. 32 shows an example flowchart of an example method 3200 for matrix-based intra prediction. Operation 3202 includes performing a conversion between a current video block of a video and a bitstream representation of the current video block using a matrix based intra prediction (MIP) mode, where the performing the conversion using the MIP mode includes generating a prediction block by applying matrix multiplication using matrices of samples obtained from a row and column wise averaging of previously coded samples of the video, and where the matrices depend on a bit-depth of a sample.

Figure 33:
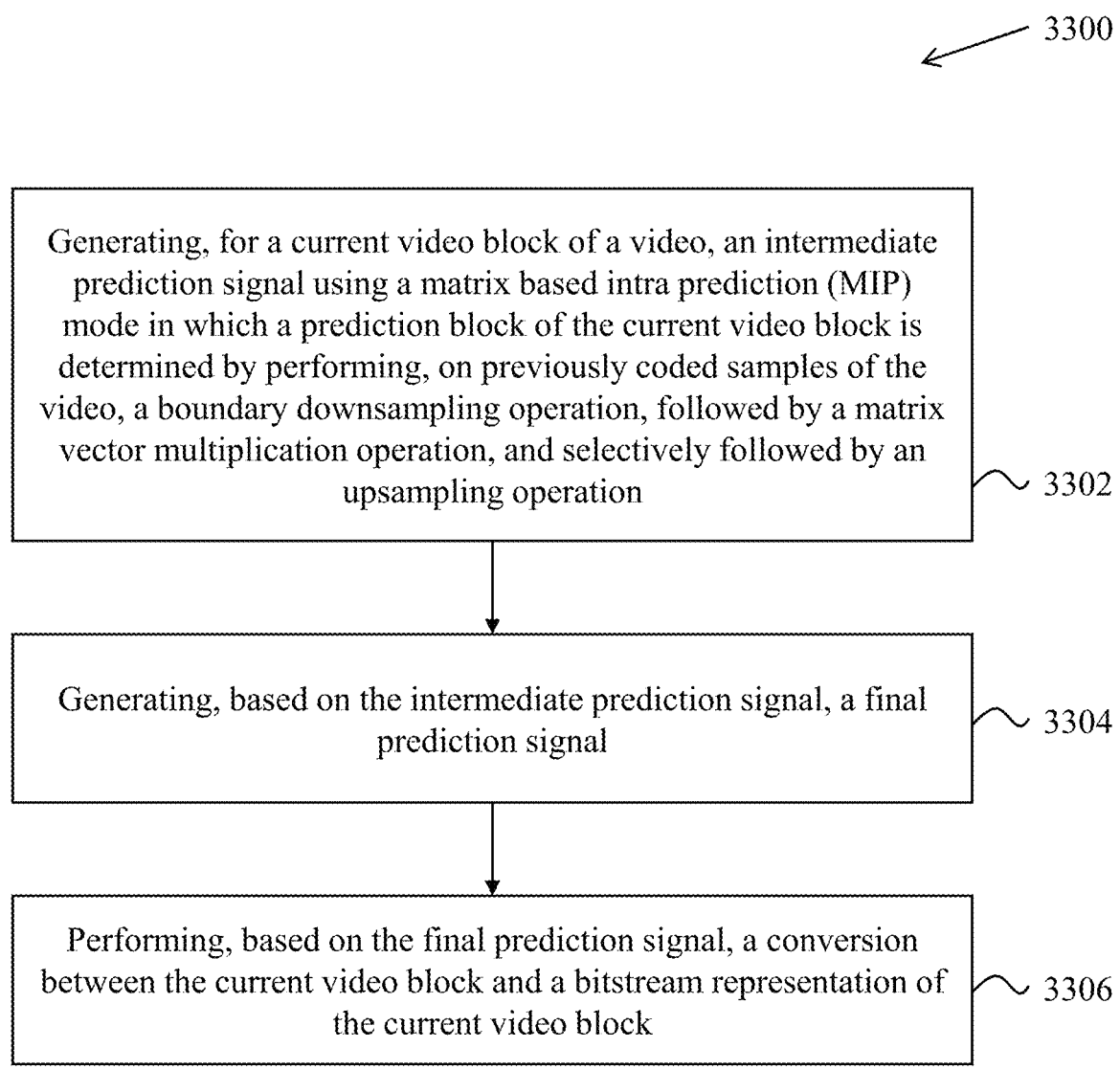

FIG. 33 shows an example flowchart of an example method 3300 for matrix-based intra prediction. Operation 3302 includes generating, for a current video block of a video, an intermediate prediction signal using a matrix based intra prediction (MIP) mode in which a prediction block of the current video block is determined by performing, on previously coded samples of the video, a boundary downsampling operation, followed by a matrix vector multiplication operation, and selectively followed by an upsampling operation. Operation 3304 includes generating, based on the intermediate prediction signal, a final prediction signal. Operation 3306 includes performing, based on the final prediction signal, a conversion between the current video block and a bitstream representation of the current video block.

In some embodiments for method 3300, the generating the final prediction signal is performed by applying a Position Dependent Intra Prediction Combination (PDPC) to the intermediate prediction signal. In some embodiments for method 3300, the generating the final prediction signal is performed by generating the previously coded samples of the video with the MIP mode and by filtering the previously coded samples with neighboring samples of the current video block.

FIG. 34 shows an example flowchart of an example method 3400 for matrix-based intra prediction. Operation 3402 includes performing a conversion between a current video block of a video and a bitstream representation of the current video block using a matrix based intra prediction (MIP) mode, where the performing the conversion includes using an interpolation filter in an upsampling process for the MIP mode, where, in the MIP mode, a matrix multiplication is applied to a first set of samples obtained from a row and column wise averaging of previously coded samples of the video, and the interpolation filter is applied to a second set of samples obtained from the matrix multiplication, and where interpolation filter excludes a bilinear interpolation filter.

In some embodiments for method 3400, the interpolation filter includes a 4-tap interpolation filter. In some embodiments for method 3400, a motion compensation for chroma components of the current video block is performed using the 4-tap interpolation filter. In some embodiments for method 3400, an angular intra-prediction of the current video block is performed using the 4-tap interpolation filter. In some embodiments for method 3400, the interpolation filter includes an 8-tap interpolation filter, and a motion compensation for luma component of the current video block is performed using the 8-tap interpolation filter.

FIG. 35 shows an example flowchart of an example method 3500 for matrix-based intra prediction. Operation 3502 includes performing a conversion between a current video block of a video and a bitstream representation of the current video block according to a rule, where the rule specifies a relationship between applicability of a matrix based intra prediction (MIP) mode or a transform mode during the conversion, where the MIP mode includes determining a prediction block of the current video block by performing, on previously coded samples of the video, a boundary downsampling operation, followed by a matrix vector multiplication operation, and selectively followed by an upsampling operation, and where the transform mode specifies use of a transform operation for the determining the prediction block for the current video block.

In some embodiments for method 3500, the transform mode includes a Reduced Secondary Transform (RST), a secondary transform, a rotation transforms or a Non-Separable Secondary Transform (NSST). In some embodiments for method 3500, the rule indicates that the transform operation using the transform mode is not to be applied in response to the MIP mode being applied to the current video block. In some embodiments for method 3500, the rule indicates whether to apply the transform operation using the transform mode based on a height (H) or a width (W) of the current video block. In some embodiments for method 3500, the rule indicates that the transform operation using the transform mode is not applied to the current video block in response to W≥T1 and H≥T2. In some embodiments for method 3500, the rule indicates that the transform operation using the transform mode is not applied to the current video block in response to W≤T1 and H≤T2. In some embodiments for method 3500, the rule indicates that the transform operation using the transform mode is not applied to the current video block in response to W≥T1 or H≥T2. In some embodiments for method 3500, the rule indicates that the transform operation using the transform mode is not applied to the current video block in response to W≤T1 or H≤T2. In some embodiments for method 3500, where T1=32 and T2=32. In some embodiments for method 3500, the rule indicates that the transform operation using the transform mode is not applied to the current video block in response to W+H≥T. In some embodiments for method 3500, the rule indicates that the transform operation using the transform mode is not applied to the current video block in response to W+H≤T. In some embodiments for method 3500, the rule indicates that the transform operation using the transform mode is not applied to the current video block in response to W×H≥T. In some embodiments for method 3500, the rule indicates that the transform operation using the transform mode is not applied to the current video block in response to W×H≤T. In some embodiments for method 3500, T=256.

In some embodiments for method 3500, the rule indicates that the transform operation using the transform mode is to be applied in response to the current video block being coded with MIP mode. In some embodiments for method 3500, a selection of a transform matrix or kernel for the transform operation is based on the current video block being coded with the MIP mode. In some embodiments, the method 3500 further includes converting the MIP mode to an intra prediction mode; and selecting a transform matrix or kernel based on the converted intra prediction mode. In some embodiments, the method 3500 further includes converting the MIP mode to an intra prediction mode; and selecting a transform matrix or kernel based on a classification of the converted intra prediction mode. In some embodiments for method 3500, the converted intra prediction mode includes a planar mode.

In some embodiments for method 3500, the rule indicates that the transform operation using the transform mode is applied to the current video block when the MIP mode is disallowed from being applied to the current video block. In some embodiments for method 3500, the rule indicates that a Discrete Cosine Transform Type II (DCT-II) transform coding technique is applied to the current video block coded using the MIP mode. In some embodiments for method 3500, the bitstream representation of the current video block excludes signaling of transform matrix indexes for the DCT-II transform coding technique. In some embodiments for method 3500, the performing the conversion includes deriving a transform matrix to be used by the DCT-II transform coding technique. In some embodiments for method 3500, the bitstream representation includes information related to the MIP mode that is signaled after an indication of a transform matrix.

In some embodiments for method 3500, the bitstream representation includes an indication of the MIP mode for the transform matrix. In some embodiments for method 3500, the rule indicates that the bitstream representation excludes an indication of the MIP mode for pre-defined transform matrices. In some embodiments for method 3500, the rule indicates that the transform operation using a transform skip technique is applied to the current video block in response to the current video block being coded with the MIP mode. In some embodiments for method 3500, the bitstream representation of the current video block excludes signaling of the transform skip technique when the current video block is coded with the MIP mode. In some embodiments for method 3500, the rule indicates that, for the current video block coded with the MIP mode, the MIP mode is converted to a pre-defined intra prediction mode when the transform operation is performed by selecting a mode dependent transform matrix or kernel. In some embodiments for method 3500, the rule indicates that the transform operation using a transform skip technique is disallowed for the current video block that is coded with the MIP mode. In some embodiments for method 3500, the bitstream representation excludes a signaling that indicates a usage of the transform skip technique. In some embodiments for method 3500, the rule indicates that the transform operation using a transform skip technique is allowed for the current video block that is not coded with the MIP mode. In some embodiments for method 3500, the bitstream representation excludes a signaling that indicates using the MIP mode.

FIG. 36 shows an example flowchart of an example method 3600 for matrix-based intra prediction. Operation 3602 includes performing a conversion between a current video block of a video and a bitstream representation of the current video block using a matrix based intra prediction (MIP) mode in which a prediction block of the current video block is determined by performing, on previously coded samples of the video, a boundary downsampling operation, followed by a matrix vector multiplication operation, and selectively followed by an upsampling operation, where the performing the conversion includes deriving, according to a rule, boundary samples by applying a left bit shift operation or a right bit shift operation on a sum of at least one reference boundary sample, and where the rule determines whether to apply the left bit shift operation or the right bit shift operation.

In some embodiments for method 3600, the rule defines that the right bit shift operation is applied in response to a number of shifted bits being greater than or equal to zero. In some embodiments for method 3600, the rule defines that the right bit shift operation is applied using a first technique in response to the number of shifted bits being greater than zero, and where the rule defines that the right bit shift operation is applied using a second technique in response to the number of shifted bits being equal to zero, where the first technique is different from the second technique.

In some embodiments for method 3600, the boundary samples upsBdryX[x] are calculated using one of following equations: upsBdryX[x]=$(\Sigma_{i=0}^{uDwn-1}$refX[x*uDwn+i]+(1<<(Log 2 (uDwn)−1)))>>Log 2(uDwn), if uDwn>1, or upsBdryX[x]=refX[x] if uDwn=1, where uDwn is equal to a function of the current video block size and a boundary size, where refX [x] indicates a number of reference samples x, where >> indicates the right bit shift operation, and where << indicates the left bit shift operation. In some embodiments for method 3600, the boundary samples upsBdryX[x] are calculated using following equation: upsBdryX[x]= $(\Sigma_{i=0}^{uDwn-1}$ refX[x*uDwn+i]+(1<<Log 2(uDwn)>>1))>>Log 2(uDwn), where uDwn is equal to a function of the current video block and a boundary size, where refX [x] indicates a number of reference samples x, where >> indicates the right bit shift operation, and where << indicates the left bit shift operation.

In some embodiments for method 3600, the boundary size is predefined based on the current video block size. In some embodiments for method 3600, uDwn is calculated as uDwn=nTbs/boundarySize, wherein nTbs and boundarySize represent the current video block size and the boundary size, respectively. In some embodiments for method 3600, the boundary samples upsBdryX[x] are calculated using one of following equations: upsBdryX[x]=$(\Sigma_{i=0}^{uDwn-1}$refX[x*uDwn+i]+(1<<(Log 2 (uDwn)−1)))>>Log 2(uDwn), if nTbs>boundarySize, or upsBdryX[x]=refX[x] if nTbs=boundarySize.

FIG. 37 shows an example flowchart of an example method 3700 for matrix-based intra prediction. Operation 3702 includes performing a conversion between a current video block of a video and a bitstream representation of the current video block using a matrix based intra prediction (MIP) mode in which a prediction block of the current video block is determined by performing, on previously coded samples of the video, a boundary downsampling operation, followed by a matrix vector multiplication operation, and selectively followed by an upsampling operation, where the prediction samples predSamples[xHor+dX][yHor] are determined according to following formula in the upsampling operation: predSamples[xHor+dX][yHor]=((upHor−dX) *predSamples[xHor][yHor]+dX*predSamples[xHor+upHor][yHor]+offsetHor)/upHor, and predSamples[xVer][yVer+dY]=((upVer−dY)*predSamples[xVer][yVer]+ dY*predSamples[xVer][yVer+upVer]+offsetVer)/upVer, where offsetHor and offsetVer are integers, where upHor is a function of the current video block width and a pre-defined value based on the current video block size, where upVer is a function of the current video block height and the pre-defined value based on the current video block size; where dX is 1 . . . upHor−1, where dY is 1 . . . upVer−1, and where xHor are positions based on the upHor and yHor are positions based on the upVer. In some embodiments for method 3700, offsetHor=upHor/2, and offsetVer=upVer/2.

Figure 38:
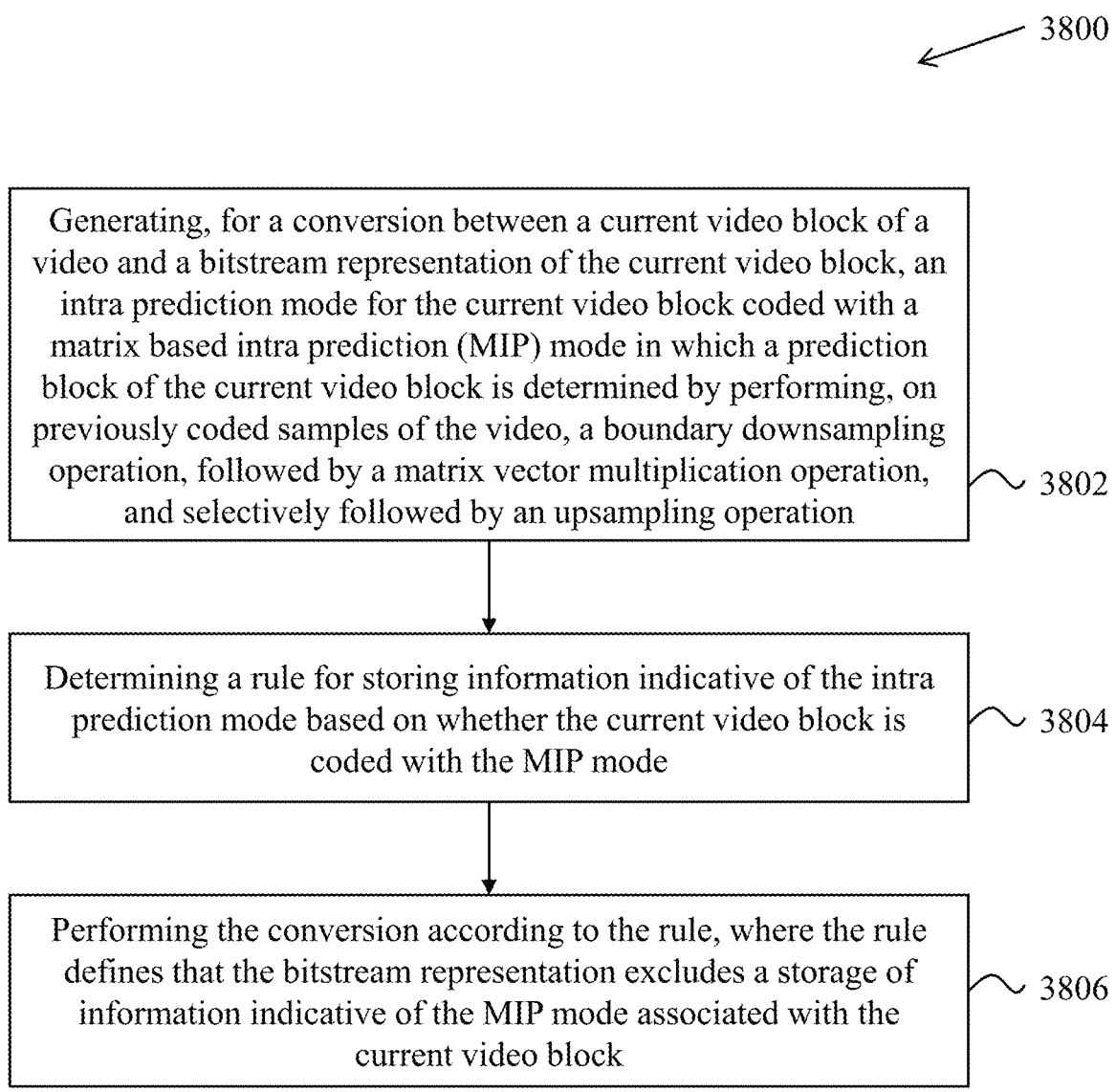

FIG. 38 shows an example flowchart of an example method 3800 for matrix-based intra prediction. Operation 3802 includes generating, for a conversion between a current video block of a video and a bitstream representation of the current video block, an intra prediction mode for the current video block coded with a matrix based intra prediction (MIP) mode in which a prediction block of the current video block is determined by performing, on previously coded samples of the video, a boundary downsampling operation, followed by a matrix vector multiplication operation, and selectively followed by an upsampling operation. Operation 3804 includes determining a rule for storing information indicative of the intra prediction mode based on whether the current video block is coded with the MIP mode. Operation 3806 includes performing the conversion according to the rule, where the rule defines that the bitstream representation excludes a storage of information indicative of the MIP mode associated with the current video block.

This patent document may refer to bitstream representation to mean coded representation and vice versa. From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for video processing, comprising:
   determining, for a conversion between a current video block of a video and a bitstream of the video, a spatial neighboring block of the current video block, wherein the current video block is an intra block, and wherein the spatial neighboring block is applied with a first prediction mode in which prediction samples of the spatial neighboring block are derived by performing a boundary down-sampling operation on reference samples of the spatial neighboring block based on a size of the spatial neighboring block, followed by a matrix vector multiplication operation, and selectively followed by an up-sampling operation;
   converting the first prediction mode to a second prediction mode for the spatial neighboring block, wherein the second prediction mode is different from the first prediction mode;
   constructing, based on the second prediction mode, a mode candidate list for the current video block;
   determining a third prediction mode for the current video block, wherein the third prediction mode is different from the first prediction mode; and
   performing the conversion based on the third prediction mode,
   wherein at least one bin of a second syntax element is context-based coded, and
   wherein in response to a width-height ratio of the spatial neighboring block being greater than 2, a context with a sequence number of 3 is used for a first bin of the second syntax element.

2. The method of claim 1, wherein whether to apply the first prediction mode is specified by multiple syntax elements.

3. The method of claim 2, wherein a first syntax element is included in a sequence parameter set, and the second syntax element is a coding unit level syntax element.

4. The method of claim 3, wherein in response to the second syntax element being not included in the bitstream, the first prediction mode is not applied.

5. The method of claim 1, wherein no more than K contexts is used for the second syntax element.

6. The method of claim 5, wherein K is equal to 4.

7. The method of claim 5, wherein in response to a width-height ratio of the spatial neighboring block being smaller than or equal to 2, a single context selected from contexts with sequence numbers of 0, 1 or 2 is used for a first bin of the second syntax element.

8. The method of claim 1, wherein the first prediction mode includes multiple types, and a type index for the spatial neighboring video block is derived excluding referring to type indices of previous video blocks.

9. The method of claim 8, wherein the type index for the spatial neighboring video block is explicitly included in the bitstream.

10. The method of claim 1, wherein a down-sampling factor derived in the boundary down-sampling operation based on the size of the spatial neighboring block is larger than or equal to 1, and wherein a one-dimensional vector array is further derived based on concatenating down-sampled reference samples derived from the boundary down-sampling operation and the one-dimensional vector array is used as input of the matrix vector multiplication operation.

11. The method of claim 1, wherein in the second prediction mode, distance-based weighted calculations are applied on reference values in vertical direction and horizontal direction to derive prediction values.

12. The method of claim 1, wherein the second prediction mode includes a planar mode.

13. The method of claim 1, wherein the conversion includes encoding the current video block into the bitstream.

14. The method of claim 1, wherein the conversion includes decoding the current video block from the bitstream.

15. An apparatus for processing video data comprising a processor and a non-transitory memory with instructions thereon, wherein the instructions upon execution by the processor, cause the processor to:
   determine, for a conversion between a current video block of a video and a bitstream of the video, a spatial neighboring block of the current video block, wherein the current video block is an intra block, and wherein the spatial neighboring block is applied with a first prediction mode in which prediction samples of the spatial neighboring block are derived by performing a boundary down-sampling operation on reference samples of the spatial neighboring block based on a size of the spatial neighboring block, followed by a matrix vector multiplication operation, and selectively followed by an up-sampling operation;
   convert the first prediction mode to a second prediction mode for the spatial neighboring block, wherein the second prediction mode is different from the first prediction mode;
   construct, based on the second prediction mode, a mode candidate list for the current video block;
   determine a third prediction mode for the current video block, wherein the third prediction mode is different from the first prediction mode; and
   perform the conversion based on the third prediction mode,
   wherein at least one bin of a second syntax element is context-based coded, and
   wherein in response to a width-height ratio of the spatial neighboring block being greater than 2, a context with a sequence number of 3 is used for a first bin of the second syntax element.

16. The apparatus of claim 15, wherein the first prediction mode includes multiple types, and a type index for the neighboring video block is derived excluding referring to type indices of previous video blocks.

17. A non-transitory computer-readable storage medium storing instructions that cause a processor to:
   determine, for a conversion between a current video block of a video and a bitstream of the video, a spatial neighboring block of the current video block, wherein the current video block is an intra block, and wherein the spatial neighboring block is applied with a first prediction mode in which prediction samples of the spatial neighboring block are derived by performing a boundary down-sampling operation on reference samples of the spatial neighboring block based on a size of the spatial neighboring block, followed by a matrix vector multiplication operation, and selectively followed by an up-sampling operation;
   convert the first prediction mode to a second prediction mode for the spatial neighboring block, wherein the second prediction mode is different from the first prediction mode;
   construct, based on the second prediction mode, a mode candidate list for the current video block;
   determine a third prediction mode for the current video block, wherein the third prediction mode is different from the first prediction mode; and
   perform the conversion based on the third prediction mode,
   wherein at least one bin of a second syntax element is context-based coded, and
   wherein in response to a width-height ratio of the spatial neighboring block being greater than 2, a context with a sequence number of 3 is used for a first bin of the second syntax element.

18. A non-transitory computer-readable recording medium storing a bitstream of a video which is generated by a method performed by a video processing apparatus, wherein the method comprises:
   determining a spatial neighboring block of a current video block, wherein the current video block is an intra block, and wherein the spatial neighboring block is applied with a first prediction mode in which prediction samples of the spatial neighboring block are derived by performing a boundary down-sampling operation on reference samples of the spatial neighboring block based on a size of the spatial neighboring block, followed by a matrix vector multiplication operation, and selectively followed by an up-sampling operation;
   converting the first prediction mode to a second prediction mode for the spatial neighboring block, wherein the second prediction mode is different from the first prediction mode;
   constructing, based on the second prediction mode, a mode candidate list for the current video block;
   determining a third prediction mode for the current video block, wherein the third prediction mode is different from the first prediction mode; and
   generating the bitstream from the current video block based on the third prediction mode,
   wherein at least one bin of a second syntax element is context-based coded, and
   wherein in response to a width-height ratio of the spatial neighboring block being greater than 2, a context with a sequence number of 3 is used for a first bin of the second syntax element.

19. The apparatus of claim 15, wherein a down-sampling factor derived in the boundary down-sampling operation based on the size of the spatial neighboring block is larger than or equal to 1, and wherein a one-dimensional vector array is further derived based on concatenating down-sampled reference samples derived from the boundary down-sampling operation and the one-dimensional vector array is used as input of the matrix vector multiplication operation.

20. The apparatus of claim 15, wherein in the second prediction mode, distance-based weighted calculations are applied on reference values in vertical direction and horizontal direction to derive prediction values.

* * * * *